United States Patent
Tonyan et al.

(10) Patent No.: US 7,845,130 B2
(45) Date of Patent: *Dec. 7, 2010

(54) REINFORCED CEMENTITIOUS SHEAR PANELS

(75) Inventors: Timothy D. Tonyan, Wheaton, IL (US); James E. Reicherts, Cary, IL (US)

(73) Assignee: United States Gypsum Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/608,107

(22) Filed: Dec. 7, 2006

(65) Prior Publication Data

US 2007/0175126 A1    Aug. 2, 2007

Related U.S. Application Data

(60) Provisional application No. 60/754,272, filed on Dec. 29, 2005.

(51) Int. Cl.
*E04B 2/30* (2006.01)

(52) U.S. Cl. .................. 52/483.1; 52/309.13; 52/653.1; 428/192; 106/735

(58) Field of Classification Search ................ 52/653.1, 52/232, 309.12, 309.13, 343, 344, 293, 309, 52/414, 474, 483.1, 633; 428/60, 70, 192; 428/325; 106/735; 260/29.6
See application file for complete search history.

(56) References Cited

U.S. PATENT DOCUMENTS

| | | | |
|---|---|---|---|
| 1,684,624 A | | 9/1928 | Hayden |
| 2,230,823 A | * | 2/1941 | Batcheller ............... 428/162 |
| 2,276,237 A | | 3/1942 | Lowry |
| 2,410,922 A | * | 11/1946 | Balduf ..................... 52/275 |
| 2,541,784 A | | 2/1951 | Shannon |

(Continued)

FOREIGN PATENT DOCUMENTS

CL    33183    9/1982

(Continued)

OTHER PUBLICATIONS

Grabberman.com (http://web.archive.org/web/20040111002211/www.grabberman.com/metalscrews.htm) dated Oct. 23, 2003 as taken from archive.org. see p. 3.*

(Continued)

*Primary Examiner*—Richard E Chilcot, Jr.
*Assistant Examiner*—William V Gilbert
(74) *Attorney, Agent, or Firm*—Novak Druce + Quigg LLP; David Janci

(57) ABSTRACT

This invention relates to a structural cementitious panel (SCP) panel able to resist lateral forces imposed by high wind and earthquake loads in regions where they are required by building codes. These panels may be used for shear walls, flooring or roofing or other locations where shear panels are used in residential or commercial construction. The panels employ one or more layers of a continuous phase resulting from the curing of an aqueous mixture of inorganic binder reinforced with glass fibers and containing lightweight filler particles. One or more reinforcement members, such as mesh or plate sheets, are bonded to at least one surface of the panel to provide a completed panel that can breathe and has weather resistant characteristics to be capable of sustaining exposure to the elements during construction, without damage.

25 Claims, 22 Drawing Sheets

U.S. PATENT DOCUMENTS

| | | |
|---|---|---|
| 2,590,687 A | 3/1952 | Crafton |
| 2,856,766 A | 10/1958 | Huntley |
| 2,883,852 A | 4/1959 | Midby |
| 3,216,163 A | 11/1965 | Carew |
| 3,397,497 A | 8/1968 | Shea |
| 3,780,482 A | 12/1973 | De Lange |
| 3,797,179 A | 3/1974 | Jackson |
| 3,826,051 A | 7/1974 | Miller et al. |
| 3,974,607 A | 8/1976 | Balinski |
| 4,016,697 A | 4/1977 | Ericson |
| 4,052,829 A | 10/1977 | Chapman |
| 4,142,340 A | 3/1979 | Howard |
| 4,239,396 A | 12/1980 | Arribau et al. |
| 4,241,555 A * | 12/1980 | Dickens et al. ............... 52/454 |
| 4,276,730 A | 7/1981 | Lewis |
| 4,379,729 A | 4/1983 | Cross |
| 4,435,940 A | 3/1984 | Davenport et al. |
| 4,601,151 A | 7/1986 | Nunley et al. |
| 4,647,496 A | 3/1987 | Lehnert et al. |
| 4,707,961 A | 11/1987 | Nunley et al. |
| 4,736,561 A | 4/1988 | Lehr et al. |
| 4,783,942 A | 11/1988 | Nunley et al. |
| 4,852,316 A | 8/1989 | Webb |
| 4,982,545 A | 1/1991 | Stromback |
| 4,986,051 A | 1/1991 | Meyer et al. |
| 5,100,258 A | 3/1992 | VanWagoner |
| 5,353,560 A | 10/1994 | Heydon |
| 5,463,873 A | 11/1995 | Early et al. |
| 5,507,427 A | 4/1996 | Burgett |
| 5,584,153 A | 12/1996 | Nunly et al. |
| 5,596,860 A | 1/1997 | Hacker |
| 5,609,416 A | 3/1997 | Duckworth |
| 5,657,597 A | 8/1997 | Loftus |
| 5,687,538 A | 11/1997 | Frobosilo et al. |
| 5,743,056 A | 4/1998 | Balla-Goddard et al. |
| 5,768,841 A | 6/1998 | Swartz et al. |
| 5,842,314 A * | 12/1998 | Porter ...................... 52/309.7 |
| 5,913,788 A | 6/1999 | Herren |
| 6,000,194 A | 12/1999 | Nakamura |
| 6,073,410 A | 6/2000 | Schimpf et al. |
| 6,151,855 A | 11/2000 | Campbell |
| 6,187,409 B1 | 2/2001 | Mathieu |
| 6,192,639 B1 | 2/2001 | Germain |
| 6,226,946 B1 | 5/2001 | Stough et al. |
| 6,241,815 B1 | 6/2001 | Bonen |
| 6,260,322 B1 | 7/2001 | Lindsay |
| 6,260,329 B1 | 7/2001 | Mills |
| 6,269,608 B1 * | 8/2001 | Porter ...................... 52/794.1 |
| 6,301,854 B1 | 10/2001 | Daudet et al. |
| 6,412,247 B1 | 7/2002 | Menchetti et al. |
| 6,418,694 B1 | 7/2002 | Daudet et al. |
| 6,421,968 B2 | 7/2002 | Degelsegger |
| 6,488,792 B2 | 12/2002 | Mathieu |
| 6,510,667 B1 | 1/2003 | Cottier et al. |
| 6,536,168 B1 | 3/2003 | Cugini et al. |
| 6,620,487 B1 * | 9/2003 | Tonyan et al. ............... 428/192 |
| 6,691,478 B2 | 2/2004 | Daudet et al. |
| 6,694,695 B2 | 2/2004 | Collins et al. |
| 6,761,001 B2 | 7/2004 | Mueller |
| 6,761,005 B1 | 7/2004 | Daudet et al. |
| 6,799,407 B2 | 10/2004 | Saldana |
| 6,986,812 B2 | 1/2006 | Dubey et al. |
| 2002/0088199 A1 | 7/2002 | Linn |
| 2003/0084637 A1 | 5/2003 | Daudet et al. |
| 2003/0200721 A1 * | 10/2003 | Gleeson et al. ............ 52/746.1 |
| 2004/0050006 A1 | 3/2004 | Park |
| 2004/0074178 A1 | 4/2004 | Daudet et al. |
| 2005/0064055 A1 | 3/2005 | Porter |
| 2005/0064164 A1 | 3/2005 | Dubey et al. |
| 2005/0086905 A1 | 4/2005 | Ralph et al. |
| 2006/0168906 A1 | 8/2006 | Tonyan et al. |
| 2006/0174572 A1 | 8/2006 | Tonyan et al. |

FOREIGN PATENT DOCUMENTS

| | | |
|---|---|---|
| CL | 44335 | 11/1999 |
| CN | 1425836 A | 6/2003 |
| GB | 2334045 | 8/1999 |
| JP | 59000430 | 1/1984 |
| JP | 07259243 | 10/1993 |
| JP | 2001 107488 | 4/2001 |
| JP | 2001 262773 | 9/2001 |
| JP | 2002 180580 | 6/2002 |
| WO | 9708111 | 3/1997 |

OTHER PUBLICATIONS

ICC Evaluation Service, Inc., Legacy Report ER-5762, entitled "Legacy report on the 1997 Uniform Building Code™ the 2000 International Building Code®, and the 2000 International Residential Code®", pp. 1-2 Reissued Jul. 1, 2003.

Saruh Mazure editor/publisher, "Walls & Ceilings, Higher Value" Posted on Sep. 27, 2001 on http://www.wconline.com/CDA/ArticleInformation/features/BNP by BNP Media, pp. 1-4, copyright 2004.BNP Media.

"How Do I Design the Best Shear Wall/", http://www.sureboard.com pp. 1-2 printed on Sep. 16, 2005, last modified Nov. 6, 2004 at 6:52 PM.

Saruh Mazure editor/publisher, "Walls & Ceilings,Higher Value" Posted on Sep. 27, 2001 on http://www.wconline.com/CDA/ArticleInformation/features/BNP by BNP Media, pp. 1-5, copyright 2005 BNP Media.

"Differences in Drywall", Construction Dimensions p. 27-29 (Sep. 1983).

Submittal Sheet 09210, Imperial Brand Gypsum Base (Firecode and Firecode C Core), USG (1999).

Proprietary Gypsum Panel Products for Use in UL Classified Systems, Gypsum Association, GA-605 (Rev. Aug. 1, 2008).

Russian Office Action of Dec. 25, 2009, for RU 2007132186/03 (corresponding to U.S. Appl. No. 11/321,069) with concise statement of relevance.

Brick Industry Association, Technical Notes 16 "Fire Resistance", Technical Notes on Brick Construction, Apr. 2002, pp. 1-12, [online], [retrieved on Jan. 11, 2005]. Retrieved from the Internet <URL: http://www..bia.org/BIA/technotes/t16.htm>.

Brick Industry Association, Technical Notes 16B "Calculated Fire Resistance", Technical Notes on Brick Construction, [Jun. 1991] (Reissued Aug. 1991), pp. 1-13, [online], [retrieved on Jan. 11, 2005]. Retrieved from the Internet <URL: http://www.bia.org/BIA/technotes/t16.htm>.

Brick Industry Association, Technical Notes 21 "Brick Masonry Cavity Walls", Technical Notes on Brick Construction, Aug. 1998, pp. 1-16, [online], [retrieved on Jan. 11, 2005]. Retrieved from the Internet <URL: http://www.bia.org/BIA/technotes/t21.htm>.

Greenwell et al., Moisture Movement (Wicking) within Gypsum Wallboard, AWMA Control# 05-A-580-AWMA Abstract Submitted Sep. 17, 2004; URL:< oaspub.epa.gov/eims/eimscomm.getfile?p_download_id=446305>, retrieved from the internet Apr. 11, 2010.

ConcreteNetwork.com, Sheet Membranes, [online], [retrieved on May 15, 2007]. Retrieved from the Internet: < URL: http://www.concretenetwork.com/concrete/waterproofing_concrete_foundations/sheet_membranes.htm >.

ConcreteNetwork.com, Liquid Membranes, [online], [retrieved on May 15, 2007]. Retrieved from the Internet: < URL: http://www.concretenetwork.com/concrete/waterproofing_concrete_foundations/liquid_membranes.htm >.

TREMCO Global Sealants Division, [online], May 23, 2007 [retrieved on May 23, 2007]. Retrieved from the Internet: < http://www.tremcosealants.com/pressroom/kits.asp?id=4 >.

Applied Technologies, "Why Use a Polymer-modified Foundation Waterproofing Membrane?", [online], May 15, 2007 [retrieved on May 15, 2007]. Retrieved from the Internet: < http://www.appliedtechnologies.com/pages_blocks_v3_exp/index.cgi?Key=570 &Field=ke... >.

Hydra-Guard Waterproofing System, published on or before May 19, 2007.

Hydra-Guard Waterproofing Membrane, published on or before May 19, 2007.

Protective Coatings, Poly Wall Crack Guard Systems, Dec. 9, 2005.

TREMCO Global Sealants Division, Fight Basement Moisture three ways, published on or before May 19, 2007.

Gyptek, "Glass Microspheres", pp. 1-3, [online], [retrieved on Dec. 14, 2004]. Retrieved from the Internet <URL: http://www.gyptek.com/new_page_5.htm>.

Wood Floors OnLine.com, "Wood Floor Installation and Finishing Procedures", pp. 1-3, [online], [retrieved on Dec. 15, 2004]. Retrieved from the Internet <URL: http://www.woodfloorsonline.com/techtalk/installfin.html>.

Nofma The Wood Flooring Manufacturers Association, Est. 1909, "Laying and Fastening the Flooring", pp. 1-3, [online], [retrieved on Dec. 15, 2004]. Retrieved from the Internet <URL: http://www.nofma.org/installation2.htm>.

Cem-Steel, pp. 1-2, [online], [retrieved on Dec. 15, 2004]. Retrieved from the Internet <URL: http://www.architecturalproducts.com/cemsteel.htm>.

USG, "Fiberock Brand Underlayment—Aqua—Tough", pp. 1-2, [online], [retrieved on Dec. 15, 2004]. Retrieved from the Internet.

Underwriters Laboratories Inc. (UL), "Fire Tests of Building Construction and Materials", UL Standard for Safety, Dated Jun. 2, 1998, pp. tr1-tr4, 1-26 and A1-C2, Twelfth Edition, Northbrook, IL, United States.

Underwriters Laboratories Inc. (UL), Fire Resistance Ratings—ANSI/UL 263, Dec. 17, 2005, pp. 1-7, [online], [retrieved on Jan. 14, 2005]. Retrieved from the Internet <URL: http://database.ul.com/cgi-bin/XYV/template/LISEXT/1FRAME/showpage2.html?...>.

USG, "Important Fire Safety Information", pp. 1-5, [online], [retrieved on Jan. 14, 2005]. Retrieved from the Internet <URL: http://www.usg.com/Design_Solutions/2_2_13_typeXstdstestcerts.asp>.

USG, "How to Select the Best Residential Fire Separation Walls", 1990, pp. 1-6, [online], [retrieved on Jan. 14, 2005]. Retrieved from the Internet <URL: http://www.usg.com/Design_Solutions/2_2_8_separationwall.asp>.

USG, "Specifying the Most Important Walls in Your Building", 1991, pp. 1-8, [online], [retrieved on Jan. 14, 2005]. Retrieved from the Internet <URL: http://www.usg.com/Design_Solutions/2_2_7_importantwall.asp>.

USG, "Fire Wall Stands Up to Ultimate Test", 1995, pp. 1-3, [online], [retrieved on Jan. 14, 2005]. Retrieved from the Internet <URL: http://www.usg.com/Design_Solutions/2_2_4_ultimatetest.asp>.

USG, "Fire Resistance", pp. 1-5, [online], [retrieved on Jan. 14, 2005]. Retrieved from the Internet <URL: http://www.usg.com/Design_Solutions/2_2_10_fire_endure.asp>.

Gypsum Association, "Fire Resistance Design Manual", Apr. 2003, 17th Edition GA-600-2003, pp. 1-19 and 71-84, Washington D.C., United States.

* cited by examiner

FIG. 32
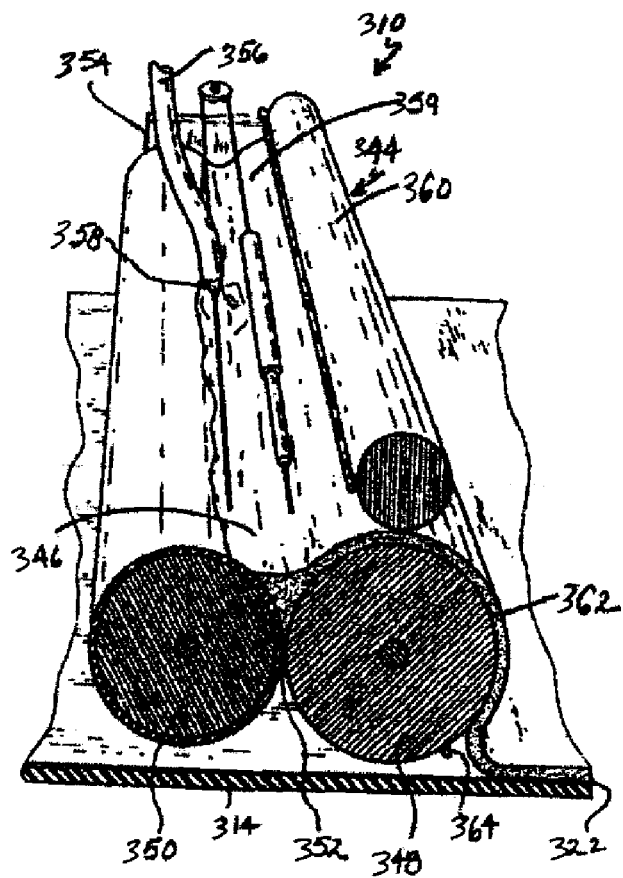
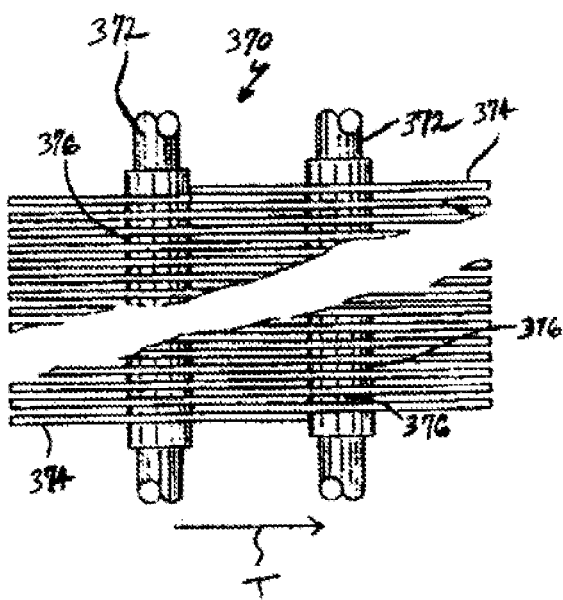
FIG. 33

REINFORCED CEMENTITIOUS SHEAR PANELS

CROSS REFERENCE TO RELATED APPLICATION

This claims the benefit under 35 USC 119 of U.S. provisional patent application No. 60/754,272 filed Dec. 29, 2005, incorporated herein by reference in its entirety.

FIELD OF THE INVENTION

This invention relates generally to shear panels that are applied to framing in residential and other types of light construction. More particularly, the invention relates to panels that are able to resist lateral forces imposed by high wind and earthquake loads in regions where they are required by building codes. Such panels, commonly known as shear walls or diaphragms, must demonstrate shear resistance as shown in recognized tests, such as ASTM E72. These panels may also be used for flooring or roofing or other locations where shear panels are used in residential or commercial construction. The shear panels include one or more reinforcement members bonded to a structural cementitious panel (SCP) to provide a completed panel that can breathe and has weather resistant characteristics to be capable of sustaining exposure to the elements during construction, without damage. The SCP material (continuous phase) of the SCP panel is made from a mixture of inorganic binder and lightweight fillers.

BACKGROUND OF THE INVENTION

Interior residential and light commercial wall and flooring systems commonly include plywood or oriented strand board (OSB) nailed to a wooden frame or mechanically fastened to a metal frame. OSB consists of pieces of wood glued together. Regardless of whether the frame of a building is constructed from wood and/or steel, such frame structures are commonly subjected to a variety of forces. Among the most significant of such forces are gravity, wind, and seismic forces. Gravity is a vertically acting force while wind and seismic forces are primarily laterally acting. Not all sheathing panels are capable of resisting such forces, nor are they very resilient, and some will fail, particularly at points where the panel is fastened to the framing. Where it is necessary to demonstrate shear resistance, the sheathing panels are measured to determine the load which the panel can resist within the allowed deflection without failure.

The shear rating is generally based on testing of three identical 8×8 feet (2.44×2.44 m) assemblies, i.e., panels fastened to framing. One edge is fixed in place while a lateral force is applied to a free end of the assembly until the load is no longer carried and the assembly fails. The measured shear strength will vary, depending upon the thickness of the panel and the size and spacing of the nails or mechanical fasteners used in the assembly. The measured strength will vary as the nail or mechanical fastener size and spacing is changed, as the ASTM E72 test provides. This ultimate strength will be reduced by a safety factor, e.g., typically a factor of two to three, to set the design shear strength for the panel.

As the thickness of the board affects its physical and mechanical properties, e.g., weight, load carrying capacity, racking strength and the like, the desired properties vary according to the thickness of the board.

U.S. Pat. No. 6,620,487 to Tonyan et al., incorporated herein by reference in its entirety, discloses a reinforced, lightweight, dimensionally stable structural cement panel (SCP) capable of resisting shear loads when fastened to framing equal to or exceeding shear loads provided by plywood or oriented strand board panels. The panels employ a core of a continuous phase resulting from the curing of an aqueous mixture of calcium sulfate alpha hemihydrate, hydraulic cement, an active pozzolan and lime, the continuous phase being reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the panels may include a cured continuous phase reinforced with glass fibers and containing sufficient polymer spheres to improve nailability or made with a water-to-reactive powders ratio to provide an effect similar to polymer spheres, or a combination thereof.

U.S. Pat. No. 6,241,815 to Bonen, incorporated herein by reference in its entirety, also discloses formulations useful for SCP panels.

One form of wallboard structure purportedly for metal construction applications is disclosed in U.S. Pat. No. 5,768,841 to Swartz et al. That wallboard structure has a metal sheet attached to an entire side of a gypsum panel with an adhesive. Another wallboard panel is disclosed in U.S. Pat. No. 6,412,247 to Menchetti et al. The International Building Code in its "Steel" section also references the use of shear walls utilizing panel type members, i.e., drywall, steel plates and plywood, etc.

US patent application publication no. 2005/0086905 A1 to Ralph et al. discloses shear wall panels and methods of manufacturing shear wall panels. Various embodiments comprise wallboard material employed with a sheet stiffener in the form of a plate to form a wall panel that may be used in applications wherein shear panels are desired.

SUMMARY OF THE INVENTION

The present invention relates to one or more reinforcement members bonded to an SCP panel to provide a completed panel that can breathe and has weather resistant characteristics to be capable of sustaining exposure to the elements during construction, without damage. The SCP material (continuous phase) of the SCP panel is made from a mixture of inorganic binder and lightweight fillers.

In particular, the present invention relates to a panel for resisting shear loads when fastened to framing, comprising: a panel of a continuous phase resulting from the curing of an aqueous mixture comprising, on a dry basis, 35 to 70 weight % reactive powder, 20 to 50 weight % lightweight filler, and 5 to 20 weight % glass fibers, the continuous phase being reinforced with glass fibers and containing the lightweight filler particles, the lightweight filler particles having a particle specific gravity of from 0.02 to 1.00 and an average particle size of about 10 to 500 microns (micrometers); and at least one reinforcing member selected from the group consisting of plate and a mesh sheet attached to a first surface of the continuous phase panel, wherein the at least one reinforcing member covers 5 to 90%, typically 10 to 80%, of the first surface of the continuous phase panel.

Typically, a high strength adhesive such as an epoxy or urethane is applied to a reinforcement member or to indentations on the embossed side of a weather durable SCP panel such sheet of mesh or metal. The reinforcement member is then placed into the indentations on the embossed side of a weather durable SCP panel and then held in a press until the adhesive has cured sufficiently to permit handling the panel without debonding. The finished panel can then be placed on steel or wood framing and attached with either screws or nails. Shear capacity will be determined by the gage of the laminated sheet, size spacing of the fasteners, and the gage and size of the framing members. Typically about 5 to 90%, typically about 10 to 80%, or about 20 to 50% of the embossed side is covered with one or more reinforcement members. If desired the embossing can be omitted such that the reinforcement members protrude from the surface of the SCP panel.

In a first embodiment, a fiber reinforced SCP panel is reinforced with horizontal metal strips 8-12 inches wide laminated along the length of the panel at the edges and mid point of the panel. This reduces the weight of the panel compared to a panel covered with a full sheet of metal. At 12 inches wide the panel typically has about half the steel of a fully laminated panel. The strips allow the panel to breathe and the spacing allows the panel to be adequately supported between the strips. The shear capacity is a function of the gage of metal and width of the strips.

In a second embodiment, the edges of the SCP panel are stiffened by placing metal along the SCP panel edges and bending the metal, e.g., ⅜ inch of metal edge, approximately 90 degrees to form a shallow tray to protect the edges of the SCP panel and add to the lateral fastener pullout strength to resist tear out along edges when the panel is loaded in shear. The term "tear out" means where the fastener tears out a portion of the SCP panel as the panel is racked.

In another embodiment, a reinforced SCP panel is reinforced with diagonal metal plates at the corners to carry the shear and rectangular plates in the field to laterally support the panel against bending out of plane when attached to framing. This embodiment also allows the panel to breathe and reduces the weight of the steel. This embodiment typically has about ⅓ the amount of steel as a fully laminated sheet.

The reinforcement members are typically metal, polymer or mesh. Typical metal sheets are about 0.02 to about 0.07 inches (about 0.05 to about 0.2 cm) thick. The metal is typically steel or aluminum. For example, steel sheets about 25 to 14 gauge, e.g., 22 gauge. The metal can be replaced by one or more about 1/32 to ¼ inch (about 0.08 to about 0.6 cm) thick sheets of polymer, e.g., thermoplastic polymer or thermosetting polymer, or mesh, e.g. fiber glass mesh or carbon fiber mesh.

The present invention also relates to floor or wall systems for residential and light commercial construction including a wooden or metal frame and the reinforced SCP shear panels. Employing a metal frame provides a fully non-combustible system in which all elements pass ASTM E-136. For example, the system may include the reinforced SCP panels employed with a metal framing system employing any standard light-gauge steel C-channels, U-channels, 1-beams, square tubing, corrugated metal sheet, and light-gauge prefabricated building sections, such as floor trusses or open web bar joists. The composite SCP panel may be fastened to framing members with either pneumatically driven nails or conventional self-drilling screws.

A wall of reinforced SCP shear panel may have a higher specific racking strength in a shear wall compared to a reinforced concrete masonry shear wall. Specific racking strength is the ultimate racking strength (in pounds per lineal foot) divided by the weight of the wall assembly (in pounds per lineal foot) for a constant wall height. For a given racking strength the present inventive wall is lighter within a practical range of racking strengths than the respective masonry wall of the same racking strength.

The present system having a shear diaphragm on light gauge cold rolled metal frame also is typically water durable. Preferably when testing the system with the SCP panels laid oriented horizontally, the horizontal shear diaphragm load carrying capacity of a system of the present invention will not be lessened by more than 25% (more preferably will not be lessened by more than 20%) when exposed to water in a test wherein a 2 inch head of water is maintained over ¾ inch thick reinforced SCP panels fastened on a 10 foot by 20 foot metal frame for a period of 24 hours. In this test, the 2 inch head is maintained by checking, and replenishing water, at 15 minute intervals.

Preferably the system of the present invention will not absorb more than 0.7 pounds per square foot of water when exposed to water in a test wherein a 2 inch head of water is maintained over ¾ inch thick reinforced SCP panels fastened on a 10 foot by 20 foot metal frame for a period of 24 hours. In this test, the 2 inch head is maintained by checking, and replenishing water, at 15 minute intervals.

Also, the system of the present invention resists swelling due to moisture. Preferably, in the system of the present invention a system of a oriented horizontally 10 foot wide by 20 foot long by ¾ inch thick diaphragm of the reinforced SCP panels attached to a 10 foot by 20 foot metal frame will not swell more than 5% when exposed to a 2 inch head of water maintained over the SCP panels fastened on the metal frame for a period of 24 hours. In this test, the 2 inch head is maintained by checking, and replenishing water, at 15 minute intervals.

Also, the system of the present invention leads to a mold and mildew resistant floor, wall or roof system. Preferably every component of the system of the present invention meets ASTM G-21 in which the system achieves approximately a rating of 1 and meets ASTM D-3273 in which the system achieves approximately a rating of 10. Preferably the system of the present invention supports substantially zero bacteria growth when clean.

A potential advantage of the present system is that, due to its high strength it is better able to provide an earthquake resistant structure.

As the thickness of the board affects its physical and mechanical properties, e.g., weight, load carrying capacity, racking strength and the like, the desired properties vary according to the thickness of the board. Thus, for example, the desired properties which a shear rated panel with a nominal thickness of 0.75 inches (19.1 mm) should meet include the following.

A 4×8 ft, ¾ inch thick panel (1.22×2.44 m, 19.1 mm thick) typically weighs no more than 156 lbs (71 kg) and preferably no more than 144 lbs (65.5 kg). Thinner panels are proportionally lighter.

The present invention provides a method of making the reinforced SCP panel. The present invention provides a method of making systems comprising placing the reinforced SCP panel on one or both sides of metal framing members. The reinforced SCP panels may float on the framing members, for example, joists, or be connected to the framing members mechanically or by adhesive. Connecting the reinforced SCP panels directly or indirectly to the metal framing members may achieve a composite action such that the metal framing and panels work together to carry greater loads.

The present invention also encompasses a non-combustible building system, such as a floor, wall or roof system, including a reinforced SCP panel of the present invention attached to one or both sides of a metal frame to increase the shear capacity of the framed wall.

BRIEF DESCRIPTION OF THE DRAWINGS

FIG. 32 is a perspective view of a slurry feed station of the type used in the present process.

FIG. 33 is a fragmentary overhead plan view of an embedment device suitable for use with the present process to embed lightweight filler.

DETAILED DESCRIPTION OF THE INVENTION

Figure 1:
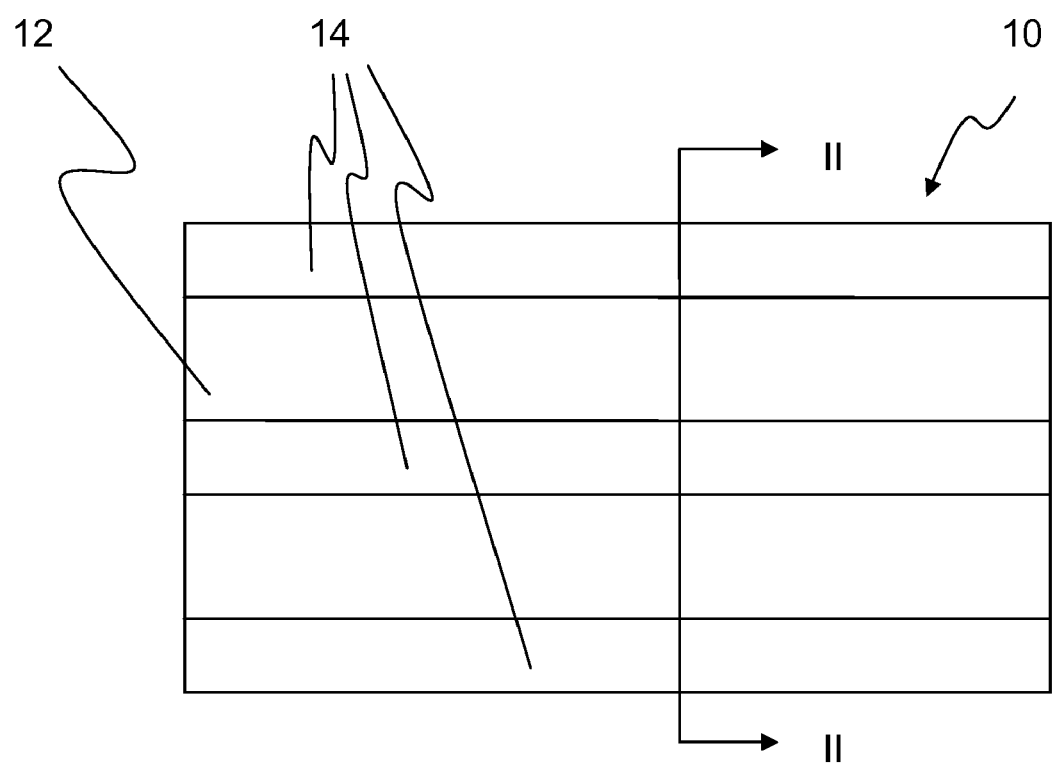
FIG. 1 is a top view of a first embodiment of a reinforced structural cementitious panel (SCP) panel of the present invention employing strips of reinforcing sheets inserted in indentations on the SCP material of the panel.

The present invention may employ single layer or multi-layer SCP panels reinforced with reinforcement members such as sheets of metal, polymer or mesh placed on the panel surface. The reinforcement members are typically metal, polymer or mesh, e.g. fiber glass mesh or carbon fiber mesh.

Typical SCP panel material (discussed in more detail elsewhere in this specification) is made from a mixture of water and inorganic binder (examples—gypsum-cement, Portland cement or other hydraulic cements) with the selected lightweight fillers (examples glass fibers, hollow glass microspheres, hollow ceramic microspheres and/or perlite uniformly), and superplasticizer/high-range water reducing admixtures (examples—polynapthalene sulfonates, poly acrylates, etc.) distributed throughout the mixture. Other additives such as accelerating and retarding admixtures, viscosity control additives may optionally be added to the mixture to meet the demands of the manufacturing process involved. The glass fibers can be used alone or in combination with other types of non-combustible fibers such as steel fibers. This results in panels of the present invention which comprise inorganic binder having the selected lightweight fillers distributed throughout the full thickness of the panel.

In the multi-layer SCP panel the layers may be the same or different. For example, the SCP panel may have an inner layer of a continuous phase and at least one outer layer of a continuous phase on each opposed side of the inner layer, wherein at least one outer layer on each opposed side of the inner layer has a higher percentage of glass fibers than the inner layer. This has the ability to stiffen, strengthen and toughen the panel. In another embodiment, a multi-layer panel structure may be created to contain at least one outer layer having improved nailability and cutability by using a higher water-to-reactive powder (defined below) ratio in making the outer layer(s) relative to the core of the panel. A small thickness of the skin coupled with a small dosage of polymer content may improve the nailability without necessarily failing the non-combustibility test. Of course, high dosages of polymer content would lead to failure of the product in the non-combustibility test.

Calcium Sulfate Hemihydrate

Calcium sulfate hemihydrate, which may be used in panels of the invention, is made from gypsum ore, a naturally occurring mineral, (calcium sulfate dihydrate $CaSO_4.2H_2O$). Unless otherwise indicated, "gypsum" will refer to the dihydrate form of calcium sulfate. After being mined, the raw gypsum is thermally processed to form a settable calcium sulfate, which may be anhydrous, but more typically is the hemihydrate, $CaSO_4.\frac{1}{2}H_2O$. For the familiar end uses, the settable calcium sulfate reacts with water to solidify by forming the dihydrate (gypsum). The hemihydrate has two recognized morphologies, termed alpha hemihydrate and beta hemihydrate. These are selected for various applications based on their physical properties and cost. Both forms react with water to form the dihydrate of calcium sulfate. Upon hydration, alpha hemihydrate is characterized by giving rise to rectangular-sided crystals of gypsum, while beta hemihydrate is characterized by hydrating to produce needle-shaped crystals of gypsum, typically with large aspect ratio. In the present invention either or both of the alpha or beta forms may be used depending on the mechanical performance desired. The beta hemihydrate forms less dense microstructures and is preferred for low density products. The alpha hemihydrate forms more dense microstructures having higher strength and density than those formed by the beta hemihydrate. Thus, the alpha hemihydrate could be substituted for beta hemihydrate to increase strength and density or they could be combined to adjust the properties.

A typical embodiment for the inorganic binder used to make panels of the present invention comprises hydraulic cement such as Portland cement, high alumina cement, pozzolan-blended Portland cement, or mixtures thereof.

Another typical embodiment for the inorganic binder used to make panels of the present invention comprises a blend containing calcium sulfate alpha hemihydrate, hydraulic cement, pozzolan, and lime.

Hydraulic Cement

ASTM defines "hydraulic cement" as follows: a cement that sets and hardens by chemical interaction with water and is capable of doing so under water. There are several types of hydraulic cements that are used in the construction and building industries. Examples of hydraulic cements include Portland cement, slag cements such as blast-furnace slag cement and super-sulfated cements, calcium sulfoaluminate cement, high-alumina cement, expansive cements, white cement, and rapid setting and hardening cements. While calcium sulfate hemihydrate does set and harden by chemical interaction with water, it is not included within the broad definition of hydraulic cements in the context of this invention. All of the aforementioned hydraulic cements can be used to make the panels of the invention.

The most popular and widely used family of closely related hydraulic cements is known as Portland cement. ASTM defines "Portland cement" as a hydraulic cement produced by pulverizing clinker consisting essentially of hydraulic calcium silicates, usually containing one or more of the forms of calcium sulfate as an interground addition. To manufacture Portland cement, an intimate mixture of limestone, argallicious rocks and clay is ignited in a kiln to produce the clinker, which is then further processed. As a result, the following four main phases of Portland cement are produced: tricalcium silicate ($3CaO.SiO_2$, also referred to as $C_3S$), dicalcium silicate ($2CaO.SiO_2$, called $C_2S$), tricalcium aluminate ($3CaO.Al_2O_3$ or $C_3A$), and tetracalcium aluminoferrite ($4CaO.Al_2O_3.Fe_2O_3$ or $C_4AF$). Other compounds present in minor amounts in Portland cement include calcium sulfate and other double salts of alkaline sulfates, calcium oxide, and magnesium oxide. Of the various recognized classes of Portland cement, Type III Portland cement (ASTM classification) is preferred for making the panels of the invention, because of its fineness it has been found to provide greater strength. The other recognized classes of hydraulic cements including slag cements such as blast-furnace slag cement and super-sulfated cements, calcium sulfoaluminate cement, high-alumina cement, expansive cements, white cement, rapidly setting and hardening cements such as regulated set cement and VHE cement, and the other Portland cement types can also be successfully used to make the panels of the present invention. The slag cements and the calcium sulfoaluminate cement have low alkalinity and are also suitable to make the panels of the present invention.

Fibers

Glass fibers are commonly used as insulating material, but they have also been used as reinforcing materials with various matrices. The fibers themselves provide tensile strength to materials that may otherwise be subject to brittle failure. The fibers may break when loaded, but the usual mode of failure of composites containing glass fibers occurs from degradation and failure of the bond between the fibers and the continuous phase material. Thus, such bonds are important if the reinforcing fibers are to retain the ability to increase ductility and strengthen the composite over time. It has been found that glass fiber reinforced cements do lose strength as time passes, which has been attributed to attack on the glass by the lime which is produced when cement is cured. One possible way to overcome such attack is to cover the glass fibers with a protective layer, such as a polymer layer. In general, such protective layers may resist attack by lime, but it has been found that the strength is reduced in panels of the invention and, thus, protective layers are not preferred. A more expensive way to limit lime attack is to use special alkali-resistant glass fibers (AR glass fibers), such as Nippon Electric Glass (NEG) 350Y. Such fibers have been found to provide superior bonding strength to the matrix and are, thus, preferred for panels of the invention. The glass fibers are monofilaments that have a diameter from about 5 to 25 microns (micrometers) and typically about 10 to 15 microns (micrometers). The filaments generally are combined into 100 filament strands, which may be bundled into rovings containing about 50 strands. The strands or rovings will generally be chopped into suitable filaments and bundles of filaments, for example, about 0.25 to 3 inches (6.3 to 76 mm) long, typically 1 to 2 inches (25 to 50 mm).

It is also possible to include other non-combustible fibers in the panels of the invention, for example, steel fibers are also potential additives.

Pozzolanic Materials

As has been mentioned, most Portland and other hydraulic cements produce lime during hydration (curing). It is desirable to react the lime to reduce attack on glass fibers. It is also known that when calcium sulfate hemihydrate is present, it reacts with tricalcium aluminate in the cement to form ettringite, which can result in undesirable cracking of the cured product. This is often referred to in the art as "sulfate attack." Such reactions may be prevented by adding "pozzolanic" materials, which are defined in ASTM C618-97 as " . . . siliceous or siliceous and aluminous materials which in themselves possess little or no cementitious value, but will, in finely divided form and in the presence of moisture, chemically react with calcium hydroxide at ordinary temperatures to form compounds possessing cementitious properties." One often used pozzolanic material is silica fume, a finely divided amorphous silica which is the product of silicon metal and ferro-silicon alloy manufacture. Characteristically, it has a high silica content and a low alumina content. Various natural and man-made materials have been referred to as having pozzolanic properties, including pumice, perlite, diatomaceous earth, tuff, trass, metakaolin, microsilica, ground granulated blast furnace slag, and fly ash. While silica fume is a particularly convenient pozzolan for use in the panels of the invention, other pozzolanic materials may be used. In contrast to silica fume, metakaolin, ground granulated blast furnace slag, and pulverized fly ash have a much lower silica content and large amounts of alumina, but can be effective pozzolanic materials. When silica fume is used, it will constitute about 5 to 20 wt. %, preferably 10 to 15 wt. %, of the reactive powders (i.e., hydraulic cement, calcium sulfate alpha hemihydrate, silica fume, and lime). If other pozzolans are substituted, the amounts used will be chosen to provide chemical performance similar to silica fume.

Lightweight Fillers/Microspheres

The lightweight panels employed in systems of the present invention typically have a density of 65 to 90 pounds per cubic foot, preferably 65 to 85 pounds per cubic foot, more preferably 72 to 80 pounds per cubic foot. In contrast, typical Portland cement based panels without wood fiber will have densities in the 95 to 110 pcf range, while the Portland Cement based panels with wood fibers will be about the same as SCP (about 65 to 85 pcf).

To assist in achieving these low densities the panels are provided with lightweight filler particles. Such particles typically have an average diameter (average particle size) of about 10 to 500 microns (micrometers). More typically they have a mean particle diameter (mean particle size) from 50 to 250 microns (micrometers) and/or fall within a particle diameter (size) range of 10 to 500 microns. They also typically have a particle density (specific gravity) in the range from 0.02 to 1.00. Microspheres or other lightweight filler particles serve an important purpose in the panels of the invention, which would otherwise be heavier than is desirable for building panels. Used as lightweight fillers, the microspheres help to lower the average density of the product. When the microspheres are hollow, they are sometimes referred to as microballoons.

When the microspheres are hollow, they are sometimes referred to as microballoons.

The microspheres are either non-combustible themselves or, if combustible, added in sufficiently small amounts to not make the SCP panel combustible. Typical lightweight fillers for including in mixtures employed to make panels of the present invention are selected from the group consisting of ceramic microspheres, polymer microspheres, perlite, glass microspheres, and/or fly ash cenospheres.

Ceramic microspheres can be manufactured from a variety of materials and using different manufacturing processes. Although a variety of ceramic microspheres can be utilized as a filler component in the panels of the invention, the preferred ceramic microspheres of the invention are produced as a coal combustion by-product and are a component of the fly ash found at coal fired utilities, for example, EXTENDOSPHERES-SG made by Kish Company Inc., Mentor, Ohio or FILLITE® Brand ceramic microspheres made by Trelleborg Fillite Inc., Norcross, Ga. USA. The chemistry of the preferred ceramic microspheres of the invention is predominantly silica ($SiO_2$) in the range of about 50 to 75 wt. % and alumina ($Al_2O_3$) in the range of about 15 to 40 wt. %, with up to 35 wt. % of other materials. The preferred ceramic microspheres of the invention are hollow spherical particles with diameters in the range of 10 to 500 microns (micrometers), a shell thickness typically about 10% of the sphere diameter, and a particle density preferably about 0.50 to 0.80 g/mL. The crushing strength of the preferred ceramic microspheres of the invention is greater than 1500 psi (10.3 MPa) and is preferably greater than 2500 psi (17.2 MPa).

Preference for ceramic microspheres in the panels of the invention primarily stems from the fact that they are about three to ten times stronger than most synthetic glass microspheres. In addition, the preferred ceramic microspheres of invention are thermally stable and provide enhanced dimensional stability to the panel of invention. Ceramic microspheres find use in an array of other applications such as adhesives, sealants, caulks, roofing compounds, PVC flooring, paints, industrial coatings, and high temperature-resistant plastic composites. Although they are preferred, it should be understood that it is not essential that the microspheres be hollow and spherical, since it is the particle density and compressive strength which provide the panel of the invention with its low weight and important physical properties. Alternatively, porous irregular particles may be substituted, provided that the resulting panels meet the desired performance.

The polymer microspheres, if present, are typically hollow spheres with a shell made of polymeric materials such as polyacrylonitrile, polymethacrylonitrile, polyvinyl chloride or polyvinylidine chloride, or mixtures thereof. The shell may enclose a gas used to expand the polymeric shell during manufacture. The outer surface of the polymer microspheres may have some type of an inert coating such as calcium carbonate, titanium oxides, mica, silica, and talc. The polymer microspheres have a particle density preferably about 0.02 to 0.15 g/mL and have diameters in the range 10 to 350 microns (micrometers). The presence of polymer microspheres may facilitate simultaneous attainment of low panel density and enhanced cutability and nailability.

Other lightweight fillers, for example glass microspheres, perlite or hollow alumino-silicate cenospheres or microspheres derived from fly ash, are also suitable for including in mixtures in combination with or in place of ceramic microspheres employed to make panels of the present invention.

The glass microspheres typically are made of alkali resistant glass materials and may be hollow. Typical glass microspheres are available from GYPTEK INC., Suite 135, 16 Midlake Blvd SE, Calgary, AB, T2X 2X7, CANADA.

In a first embodiment of the invention, only ceramic microspheres are used throughout the full thickness of the panel.

The panel typically contains about 35 to 42 weight % of ceramic microspheres uniformly distributed throughout the thickness of the panel.

In a second embodiment of the invention, a blend of lightweight ceramic and glass microspheres is used throughout the full thickness of the panel. The volume fraction of the glass microspheres in the panel of the second embodiment of the invention will typically be in the range of 0 to 15% of the total volume of the dry ingredients, where the dry ingredients of the composition are the reactive powders (examples of reactive powders: hydraulic cement only; blend of hydraulic cement and pozzolan; or blend of hydraulic cement, calcium sulfate alpha hemihydrate, pozzolan, and lime), ceramic microspheres, polymer microspheres, and alkali-resistant glass fibers. A typical aqueous mixture has a ratio of water-to-reactive powders from greater than 0.3/1 to 0.7/1.

Figure 29:
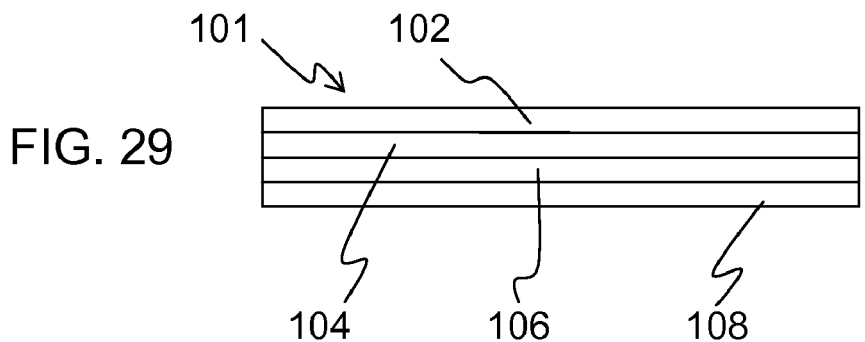
FIG. 29 is a side view of a multi-layer SCP panel of the present invention with the reinforcement omitted for clarity.

As mentioned above, if desired the panel may have a single layer or multiple layers of SCP material. Typically, the panel is made by a process which applies multiple layers which, depending upon how the layers are applied and cured as well as whether the layers have the same or different compositions, may or may not in the final panel product retain distinct layers. FIG. 29 shows a multi-layer structure of a panel 101 having layers 102, 104, 106 and 108. In the multi-layer structure the composition of the layers may be the same or different. The typical thickness of the layer(s) ranges between about 1/32 to 1.0 inches (about 0.75 to 25.4 mm). Where only one outer layer is used, it typically will be less than 3/8 of the total panel thickness.

Typical Configurations of Reinforced SCP Panels of the Present Invention

FIG. 1 is a top view of a first embodiment of a metal reinforced structural cementitious panel (SCP) panel 10 of the present invention employing strips 14 of reinforcing sheets attached to the SCP material 12 of the panel 10. The strips 14 are implanted in cavities on the surface of the panel such that the upper surface of the strips 14 is flush with the uppermost surface of the SCP material 12. The reinforcing strips 14 are typically metal, polymer or mesh having a thickness "A". Typical metal reinforcing strips 14 have a thickness "A" of about 0.02 to about 0.07 inches (about 0.05 to about 0.2 cm) thick. The metal is typically steel or aluminum. For example, steel sheets about 25 to 14 gauge, e.g., 22 gauge. The metal can be replaced by one or more sheets of polymer, e.g., thermoplastic polymer or thermosetting polymer, or mesh, e.g. fiber glass mesh or carbon fiber mesh having a thickness "A" of about 1/32 to 1/4 inch (about 0.08 to about 0.6 cm).

Figure 2:
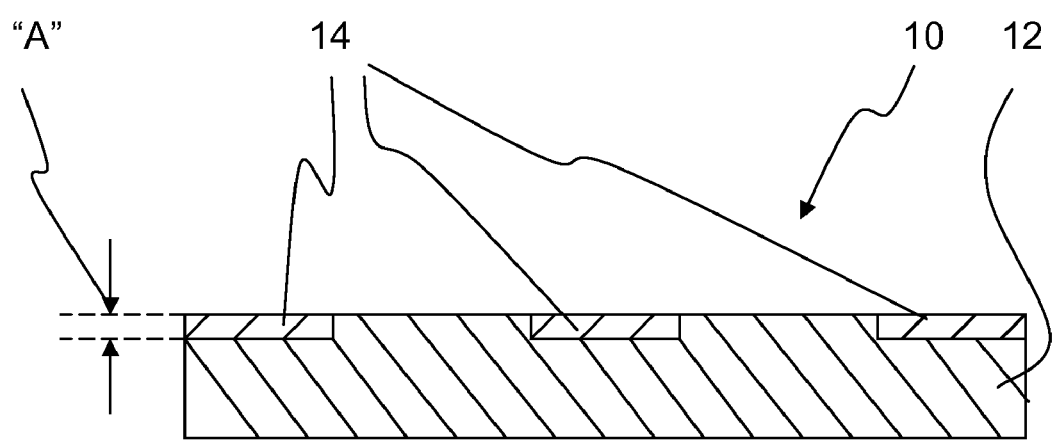
FIG. 2 is a cross-sectional view along view II-II of the panel of FIG. 1.

FIG. 2 is a cross-sectional view along view II-II of the panel 10 of FIG. 1.

Figure 3:
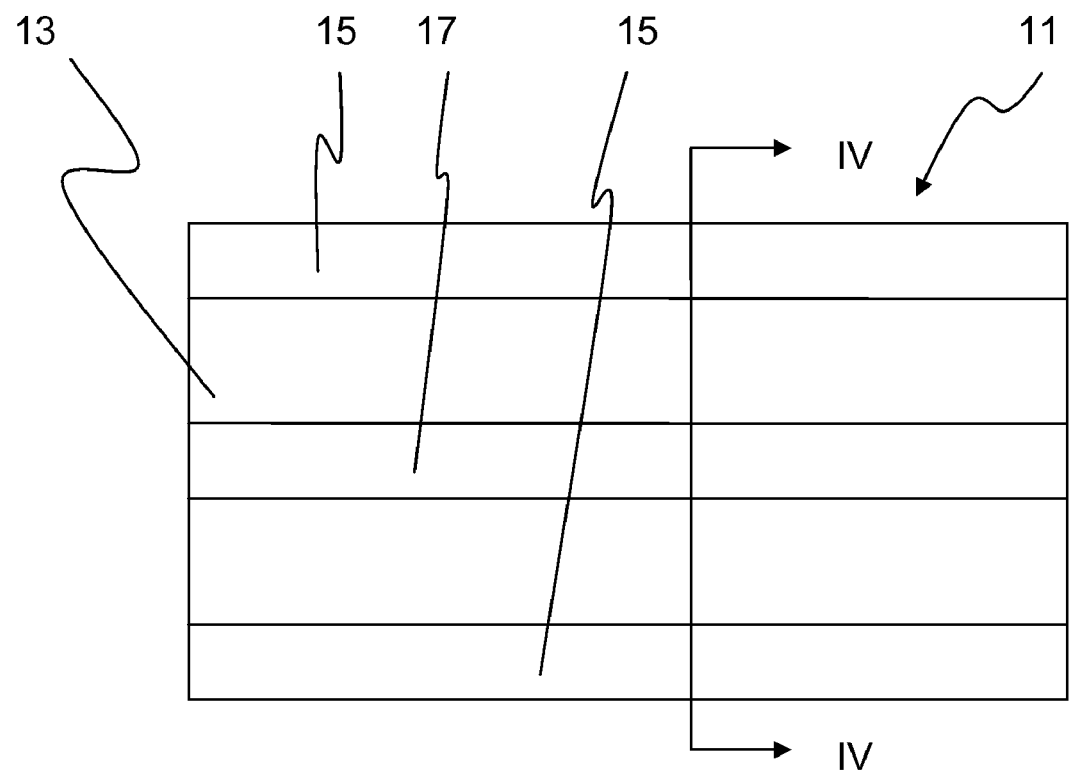
FIG. 3 is a top view of a second embodiment of a reinforced SCP panel of the present invention employing strips of reinforcing sheets, including strips which wrap around opposed edges of the panel.

FIG. 3 is a top view of a second embodiment of a metal reinforced SCP panel 11 of the present invention employing strips 15, 17 of reinforcing sheets embedded in the SCP material 13 of the panel 10. The strips include strips 15 which wrap around opposed edges of the panel. In a second embodiment, the edges of the SCP panel are stiffened by placing metal along the SCP panel edges and bending the metal, e.g., 3/8 inch of metal edge, approximately 90 degrees to form a shallow tray to protect the edges of the SCP panel and add to the lateral fastener tear out along edges when the panel is loaded in shear.

Figure 4:
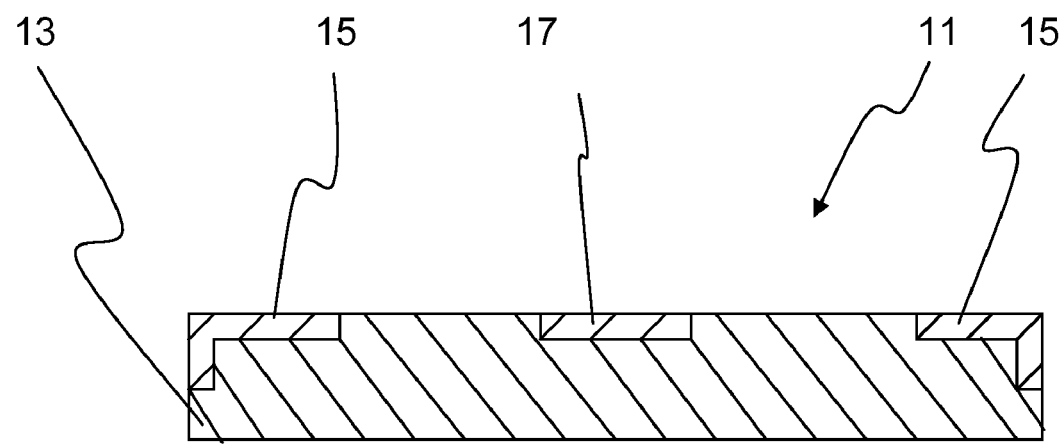
FIG. 4 is a cross-sectional view along view IV-IV of the panel of FIG. 3.

FIG. 4 is a cross-sectional view along view IV-IV of the panel 11 of FIG. 3.

Figure 5:
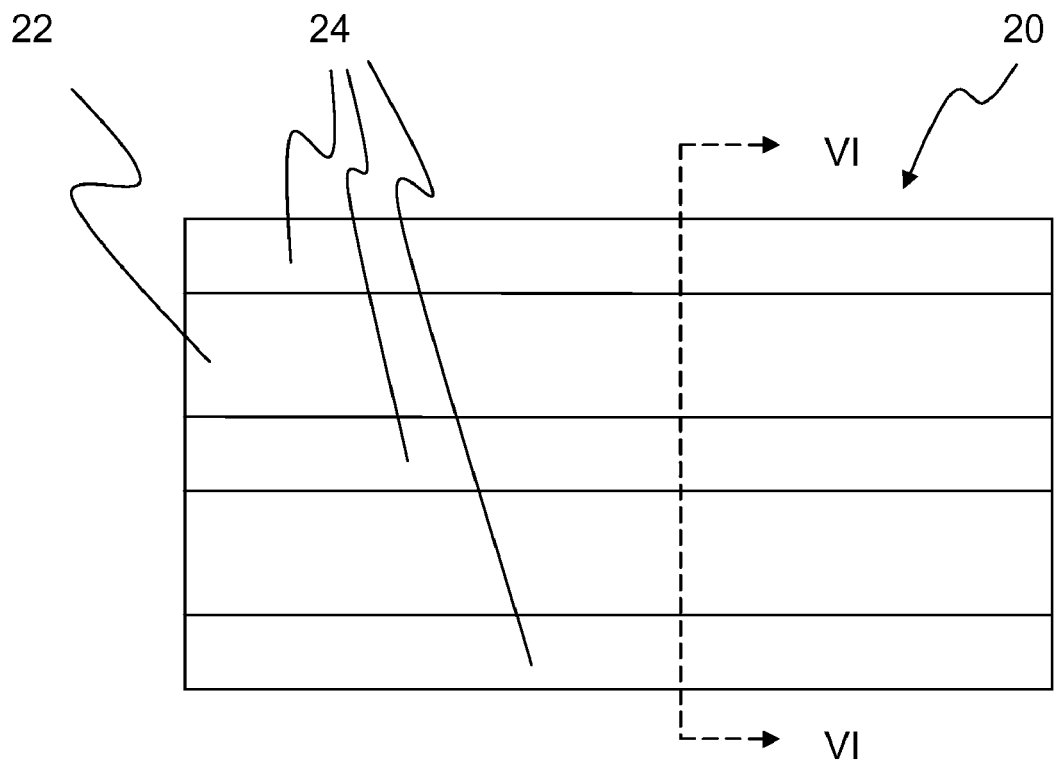
FIG. 5 is a top view of a third embodiment of a reinforced SCP panel of the present invention wherein the reinforcement strips protrude from a surface of the panel.

FIG. 5 is a top view of a third embodiment of a reinforced SCP panel 20 of the present invention having reinforcement strips 24 which protrude from a surface of the SCP material 22 of the panel 20.

Figure 6:
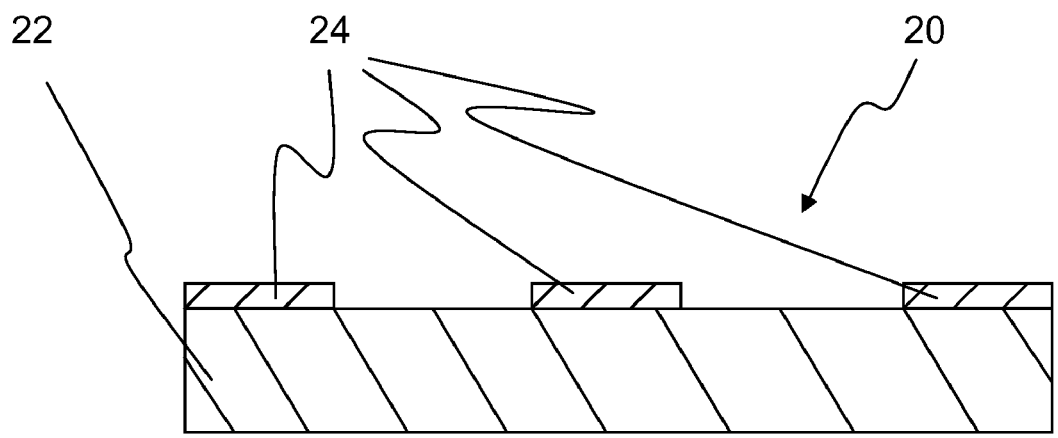
FIG. 6 is a cross-sectional view along view VI-VI of the panel of FIG. 5.

FIG. 6 is a cross-sectional view along view VI-VI of the panel 20 of FIG. 5.

Figure 7:
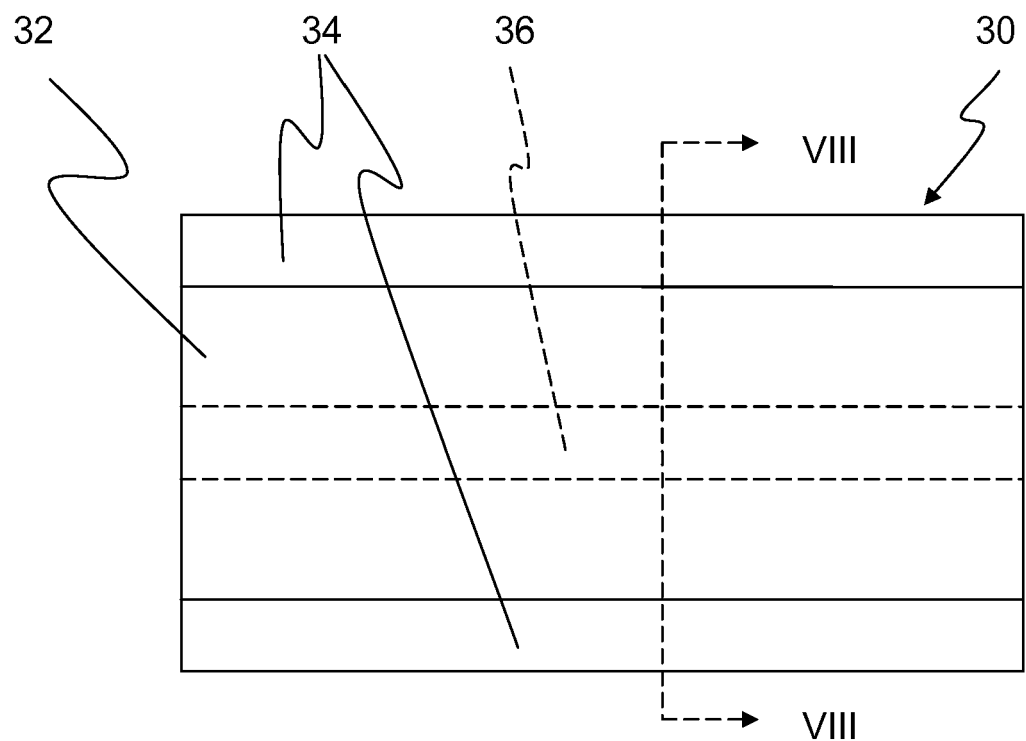
FIG. 7 is a top view of a fourth embodiment of a reinforced SCP panel of the present invention including reinforcing strips which wrap around opposed sidewalls of the panel.

FIG. 7 is a top view of a fourth embodiment of a reinforced SCP panel 30 of the present invention including reinforcing strips 34 which wrap around opposed sidewalls of the SCP material 32 of the panel 30. Optionally, a reinforcing strip 36 is also attached to the SCP material 32.

Figure 8:
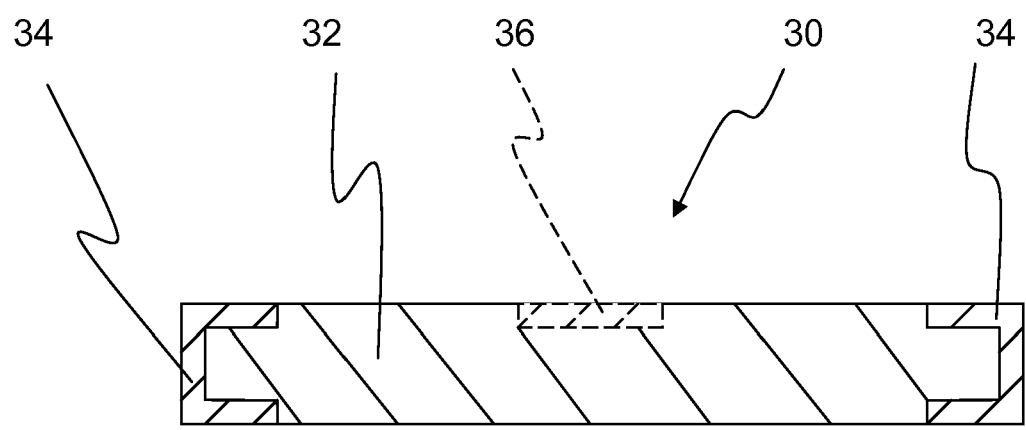
FIG. 8 is a cross-sectional view along view VIII-VIII of the panel of FIG. 7.

FIG. 8 is a cross-sectional view along view VIII-VIII of the panel 30 of FIG. 7.

Figure 9:
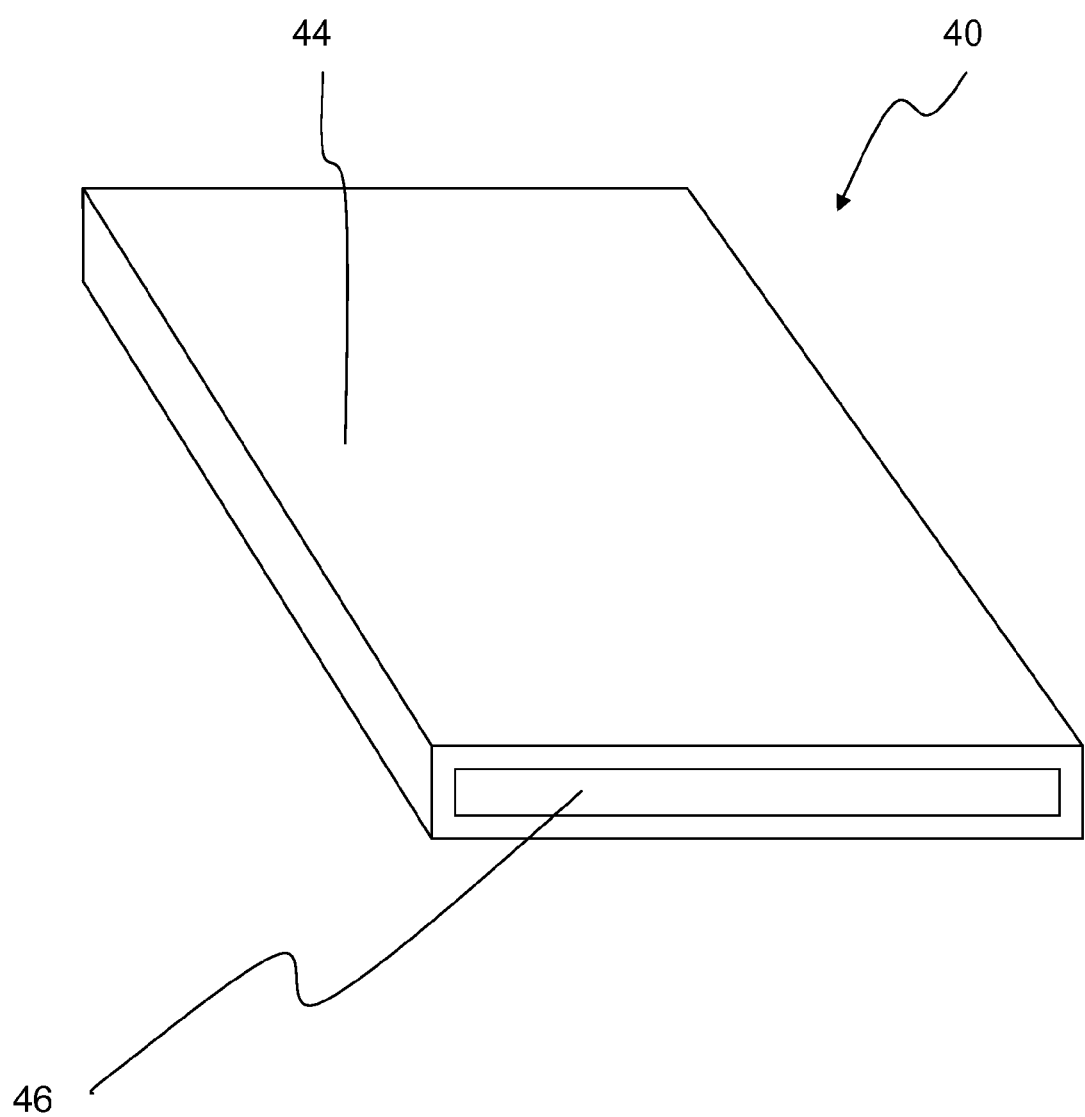
FIG. 9 is a perspective view of a fifth embodiment of a reinforced SCP panel of the present invention including reinforcing mesh which wrap around opposed walls of the panel.

FIG. 9 is a perspective view of a fifth embodiment of a reinforced SCP panel 40 of the present invention including reinforcing mesh 44 which wraps around opposed walls of the SCP material 46 of the panel 40.

Figure 10:
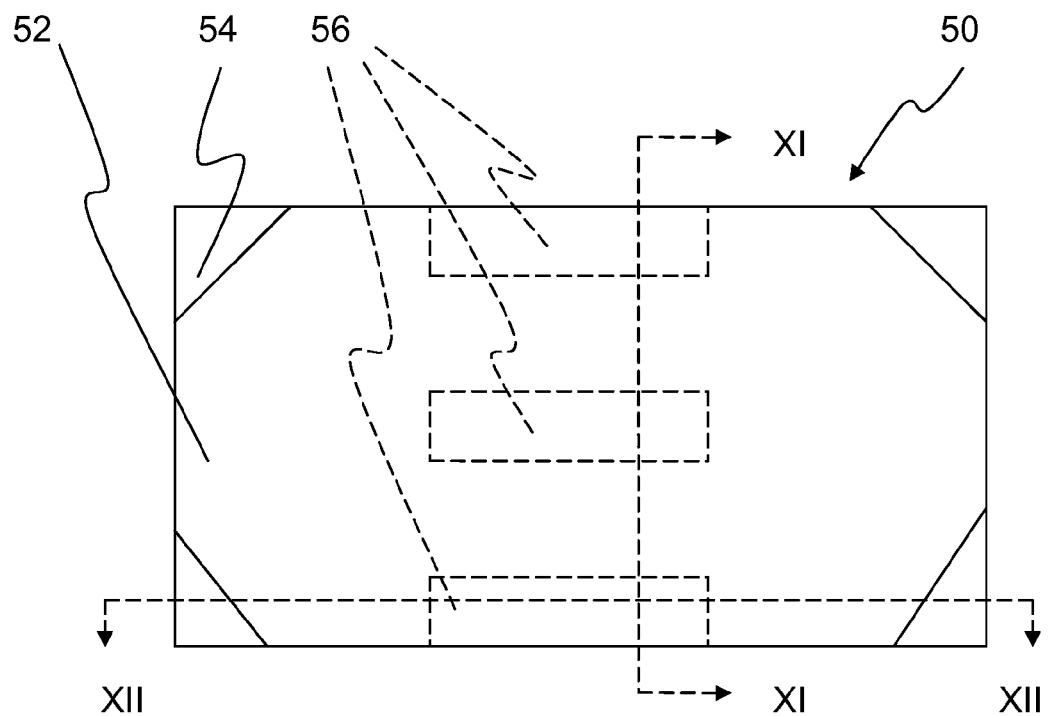
FIG. 10 is a top view of a sixth embodiment of a reinforced SCP panel of the present invention including reinforcing corner pieces and separate optional reinforcing strips.

FIG. 10 is a top view of a sixth embodiment of a reinforced SCP panel 50 of the present invention including separate reinforcing corner pieces 54 and optional reinforcing strips 56 attached to the SCP material 52 of the panel 50.

Figure 11:
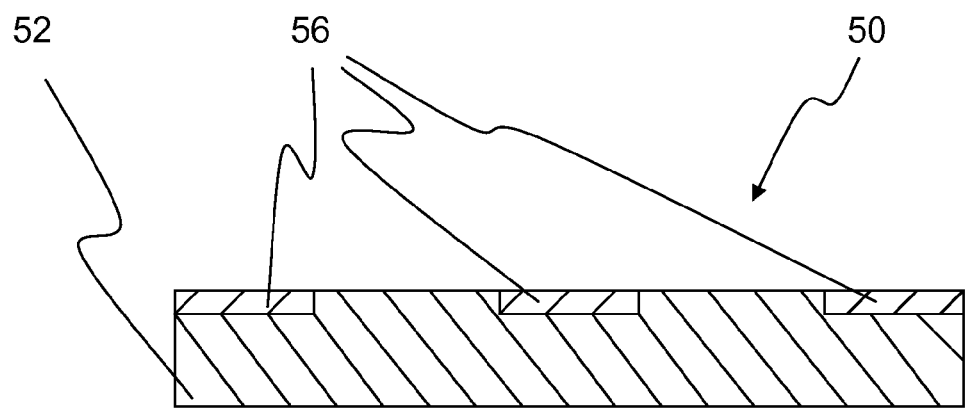
FIG. 11 is a cross-sectional view along view XI-XI of the panel of FIG. 10.

FIG. 11 is a cross-sectional view along view XI-XI of the panel 50 of FIG. 10.

Figure 12:
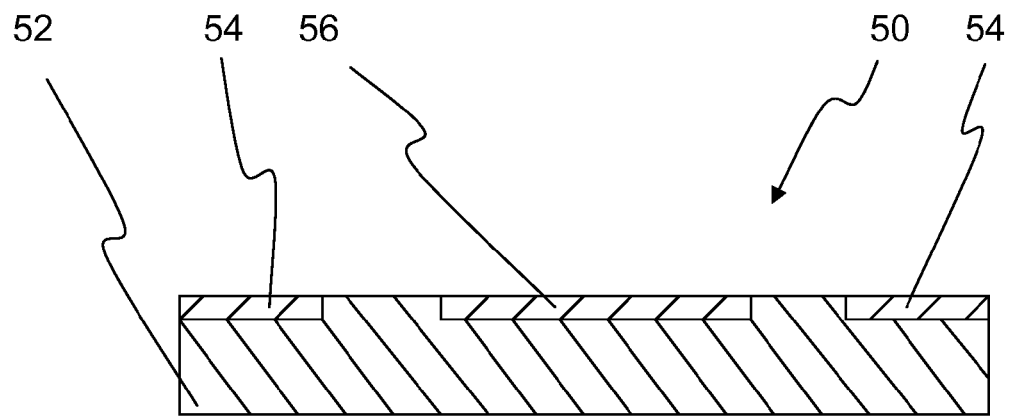
FIG. 12 is a cross-sectional view along view XII-XII of the panel of FIG. 10.

FIG. 12 is a cross-sectional view along view XII-XII of the panel 50 of FIG. 10.

Figure 13:
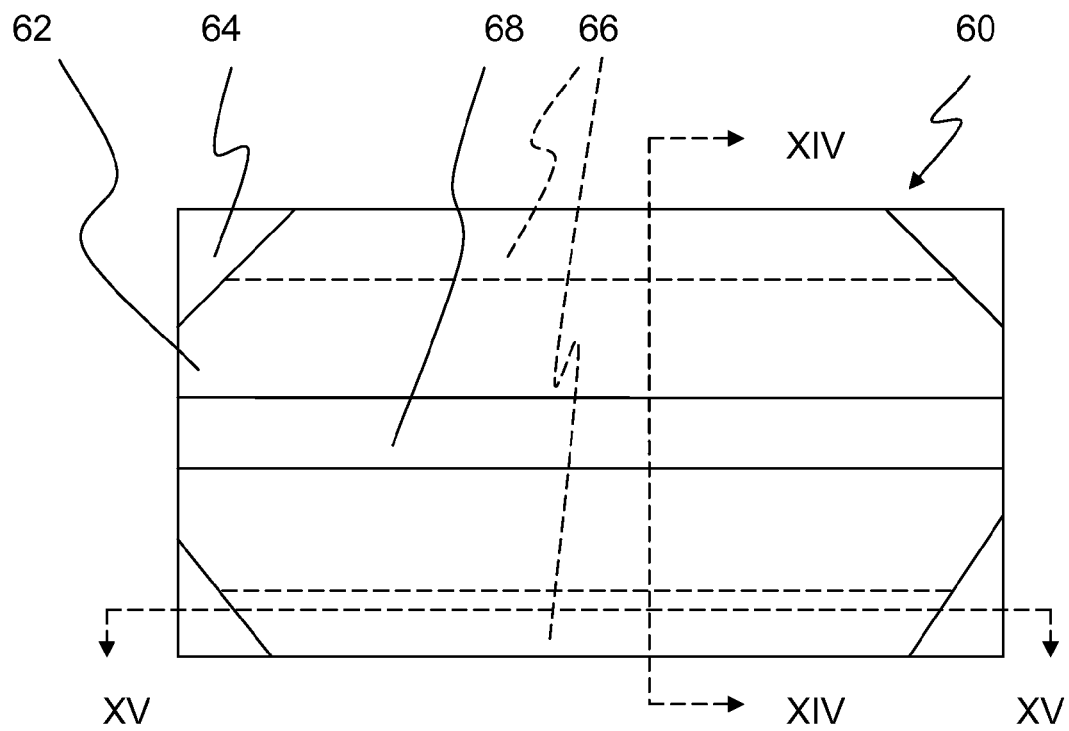
FIG. 13 is a top view of a seventh embodiment of a reinforced SCP panel of the present invention including reinforcing strips and separate reinforcing corner pieces. Optionally, two of the reinforcing strips contact the corner pieces.

FIG. 13 is a top view of a seventh embodiment of a reinforced SCP panel 60 of the present invention including a central reinforcing strip 68 and separate reinforcing corner pieces 64. Optionally, the panel 60 is further provided with two reinforcing strips 66 which contact the corner pieces 64.

Figure 14:
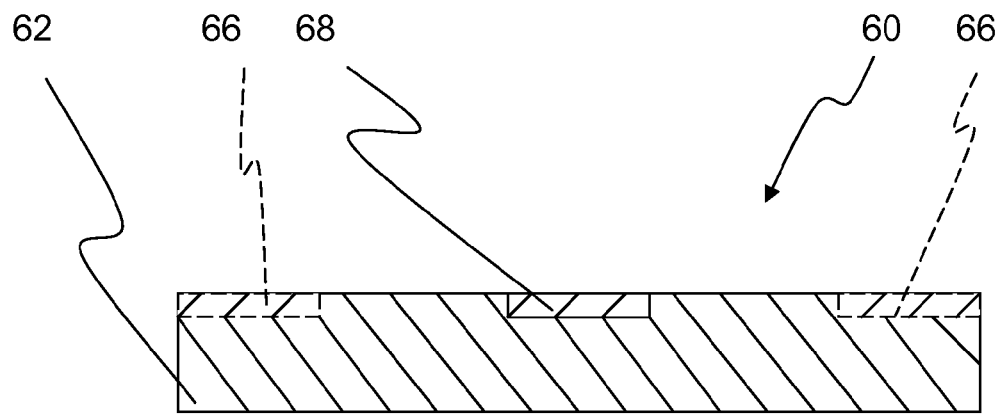
FIG. 14 is a cross-sectional view along view XIV-XIV of the panel of FIG. 13.

FIG. 14 is a cross-sectional view along view XIV-XIV of the panel 60 of FIG. 13.

Figure 15:
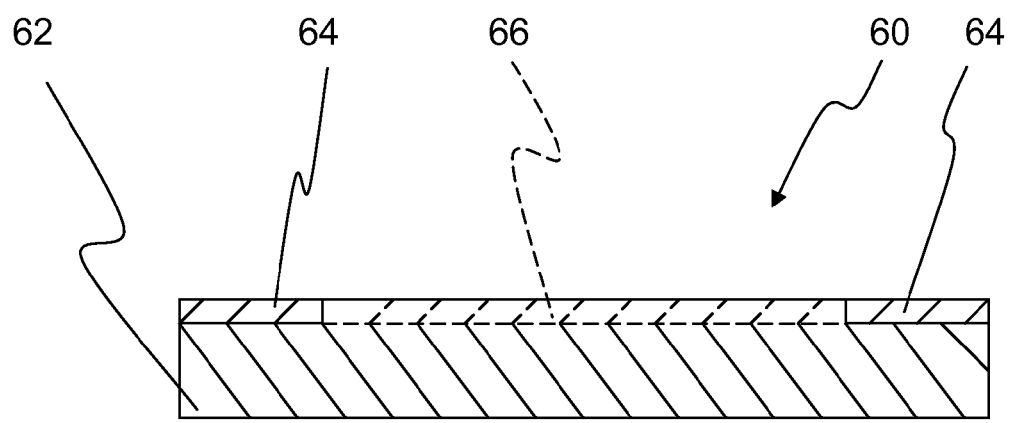
FIG. 15 is a cross-sectional view along view XV-XV of the panel of FIG. 13.

FIG. 15 is a cross-sectional view along view XV-XV of the panel 60 of FIG. 13.

Figure 16:
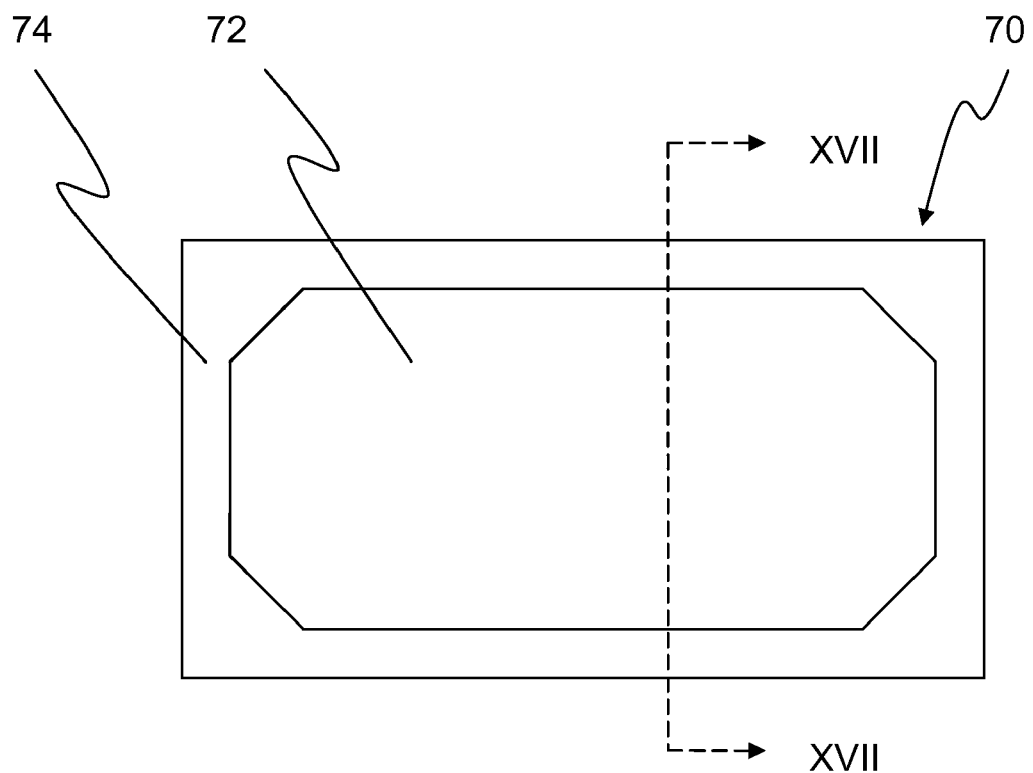
FIG. 16 is a top view of an eighth embodiment of a reinforced SCP panel of the present invention employing a one piece reinforced border on one of its surfaces.

FIG. 16 is a top view of a eighth embodiment of a reinforced SCP panel 70 of the present invention employing an one piece reinforced border 74 placed into a notched area along the perimeter of one of the surfaces of the SCP material 72. The outer perimeter of the border 74 overlaps the outer perimeter of the surface of the SCP material 72 to which the border 74 is attached.

Figure 17:
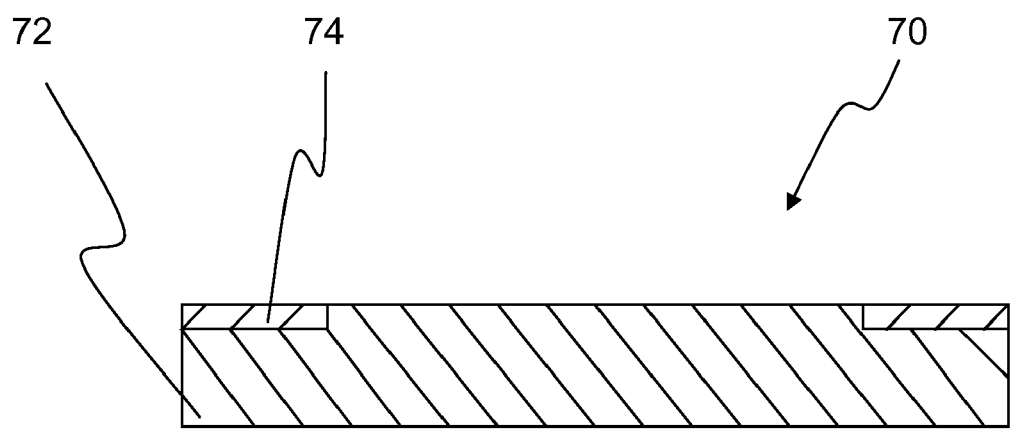
FIG. 17 is a cross-sectional view along view XVII-XVII of the panel of FIG. 16.

FIG. 17 is a cross-sectional view along view XVII-XVII of the panel 70 of FIG. 16.

Figure 18:
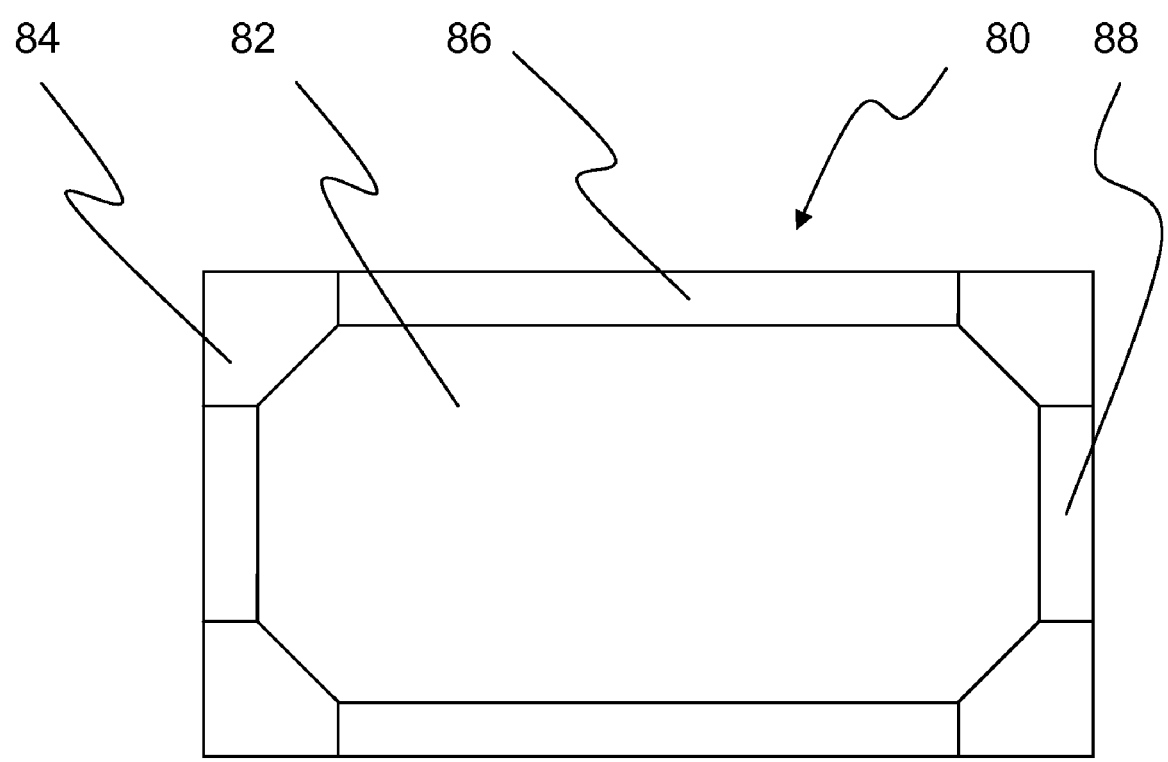
FIG. 18 is a top view of a ninth embodiment of a reinforced SCP panel of the present invention employing a multi-piece reinforced border on one of its surfaces.

FIG. 18 is a top view of a ninth embodiment of a reinforced SCP panel 80 of the present invention which is the same as the embodiment of FIG. 16, but for employing a multi-piece reinforced border on one of the surfaces of the SCP material 82. The border including corner pieces 84, longitudinal side pieces 86 and transverse side pieces 88.

Figure 19:
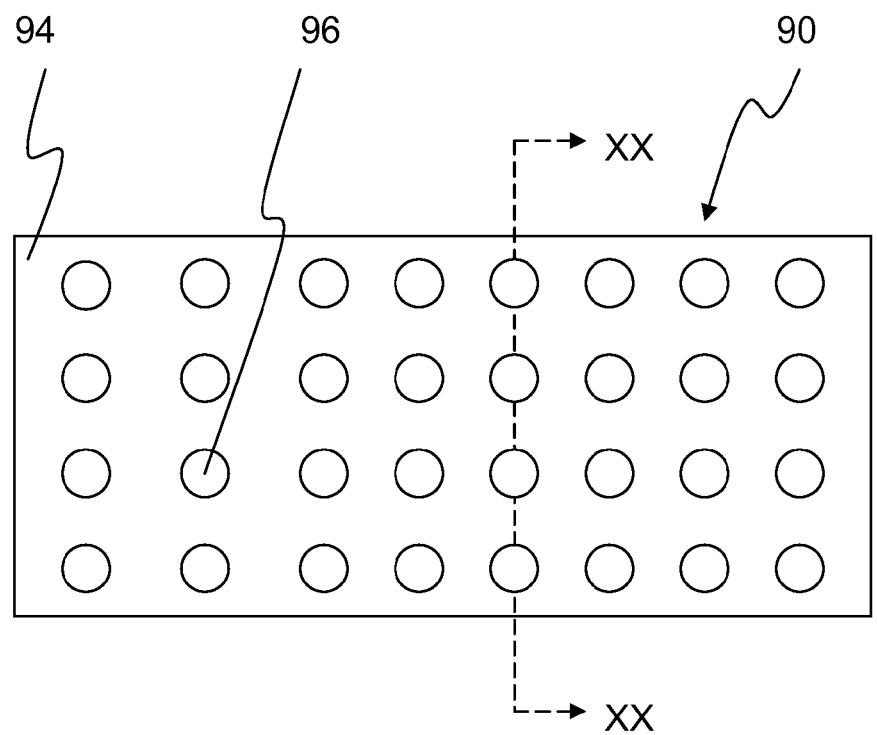
FIG. 19 is a top view of a tenth embodiment of a reinforced SCP panel of the present invention employing a perforated panel.

FIG. 19 is a top view of a tenth embodiment of a reinforced SCP panel 90 of the present invention employing a panel 94, having perforations 96, attached to SCP material 92.

Figure 20:
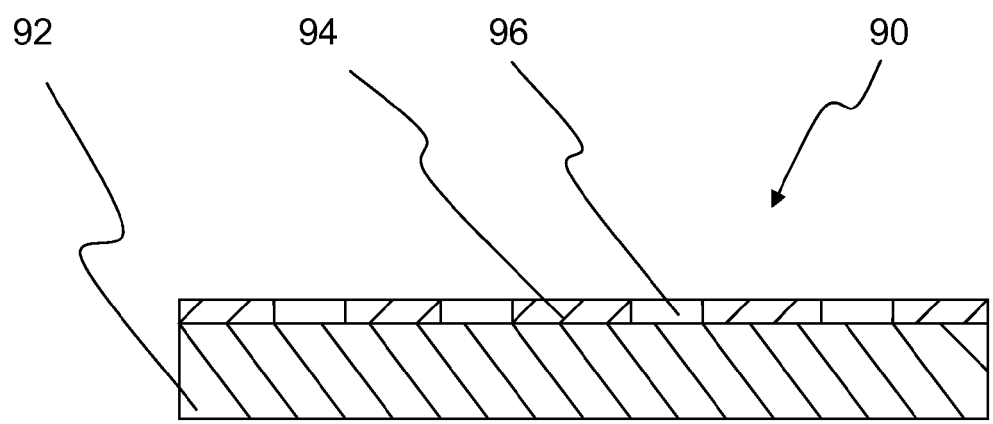
FIG. 20 is a cross-sectional view along view XX-XX of the panel of FIG. 19.

FIG. 20 is a cross-sectional view along view XX-XX of the panel 90 of FIG. 19.

Figure 21:
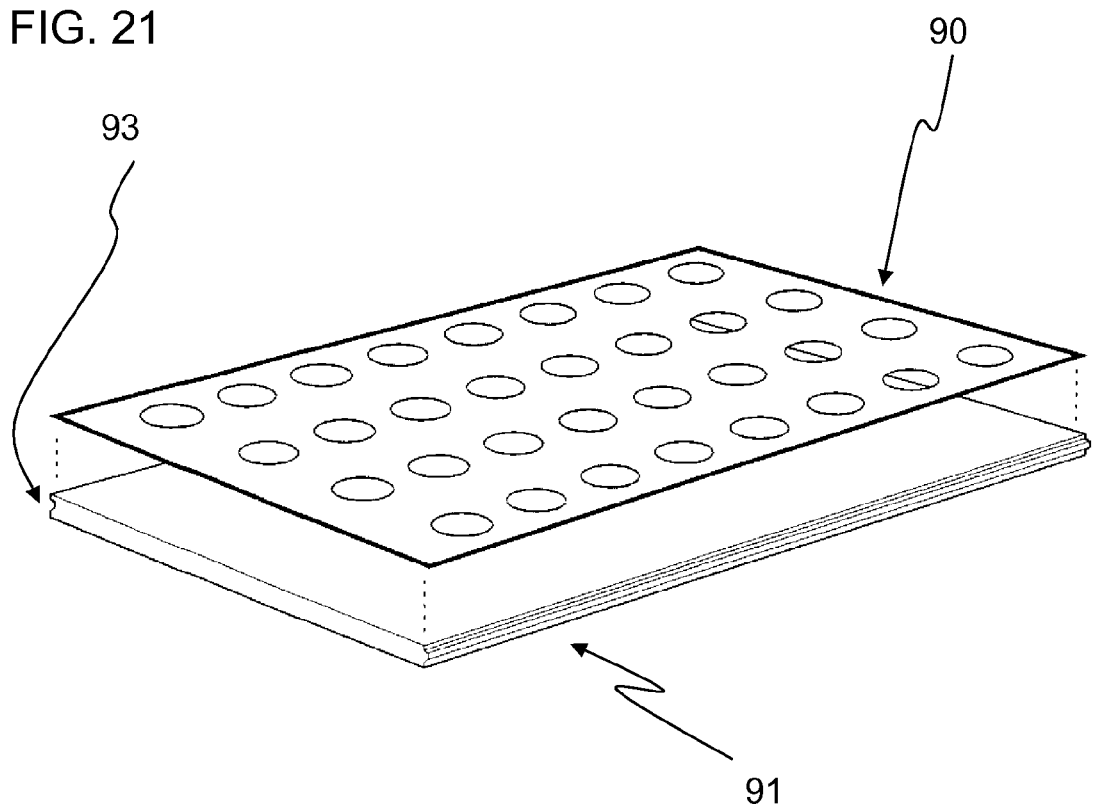
FIG. 21 is a perspective view of the panel of FIG. 19.

FIG. 21 is a perspective view of the panel 90 of FIG. 19. FIG. 21 shows the panel 90 has a tongue 91 and a groove 93. The other embodiments of the present invention also optionally have a tongue and groove on opposed sidewalls.

Figure 22:
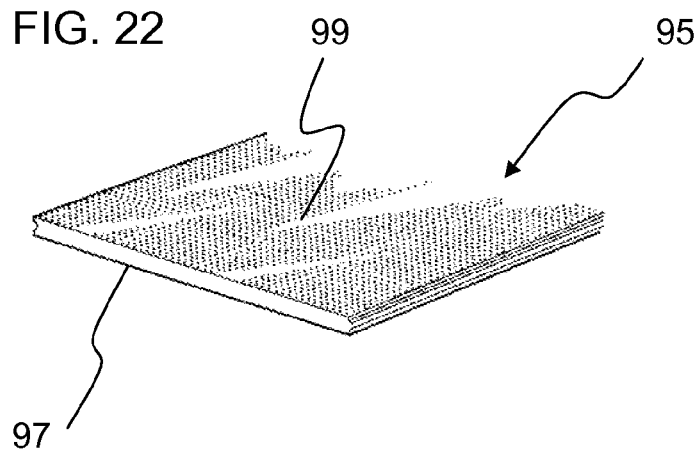
FIG. 22 is a perspective view of a portion of an eleventh embodiment of a reinforced SCP panel of the present invention employing a panel with small perforations.

FIG. 22 is a perspective view of a portion of an eleventh embodiment of a reinforced SCP panel 95 of the present invention employing a panel 99, with small perforations, attached to the SCP material 97. Typical ranges for holes/perforations of FIGS. 19 and 22 are as follows:

Range of hole size: 1/32" diameter to 12" diameter
Range of Hole density per square foot: 0.5 to 20,000

Surface area of reinforcement coverage range: 5% to 90% (this is different than the 10-80% reinforcement coverage range for the other reinforcement members).

Figure 23:
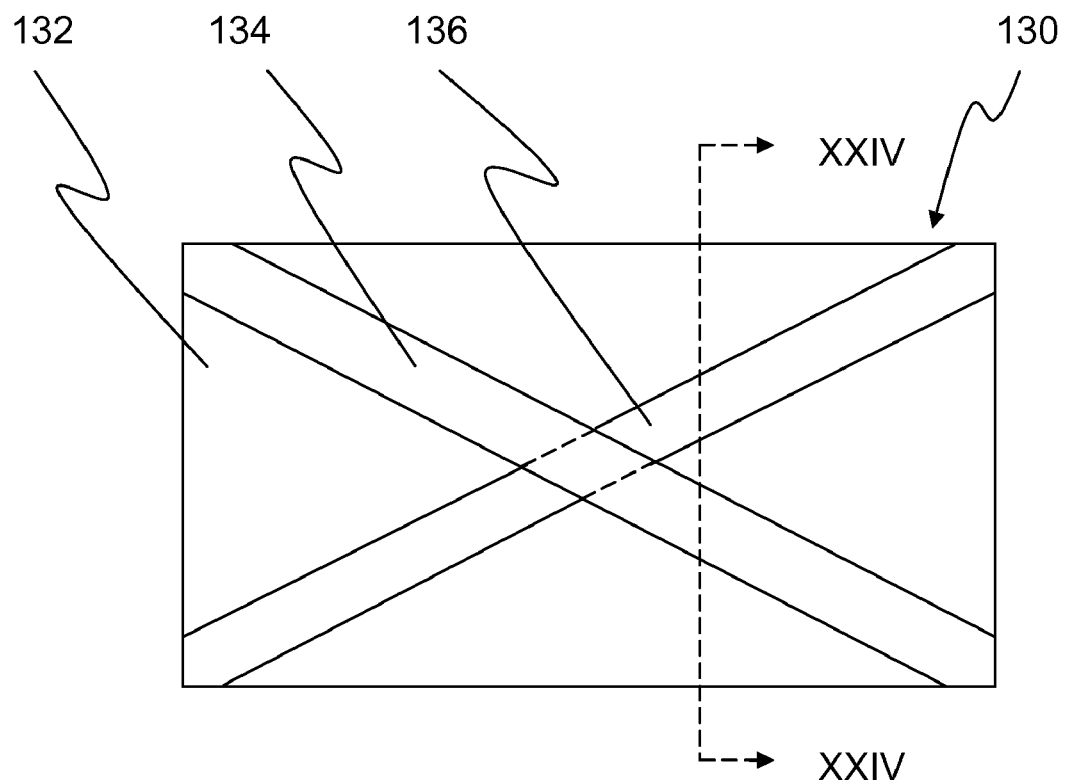
FIG. 23 is a top view of a portion of a twelfth embodiment of a reinforced SCP panel of the present invention employing a panel with small perforations.

FIG. 23 is a top view of a portion of a twelfth embodiment of a reinforced SCP panel 130 of the present invention employing a crossed pair of reinforcing members 134, 136, attached to SCP material 132. The crossed pair of reinforcing members 134, 136 overlap where they cross.

Figure 24:
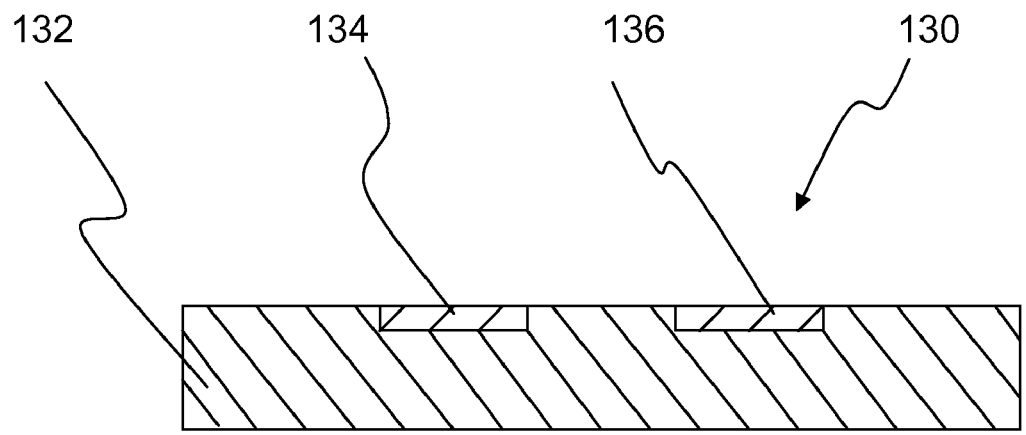
FIG. 24 is a cross-sectional view along view XXIV-XXIV of the panel of FIG. 23.

FIG. 24 is a cross-sectional view along view XXIV-XXIV of the reinforced SCP panel 130 of FIG. 23.

Figure 25:
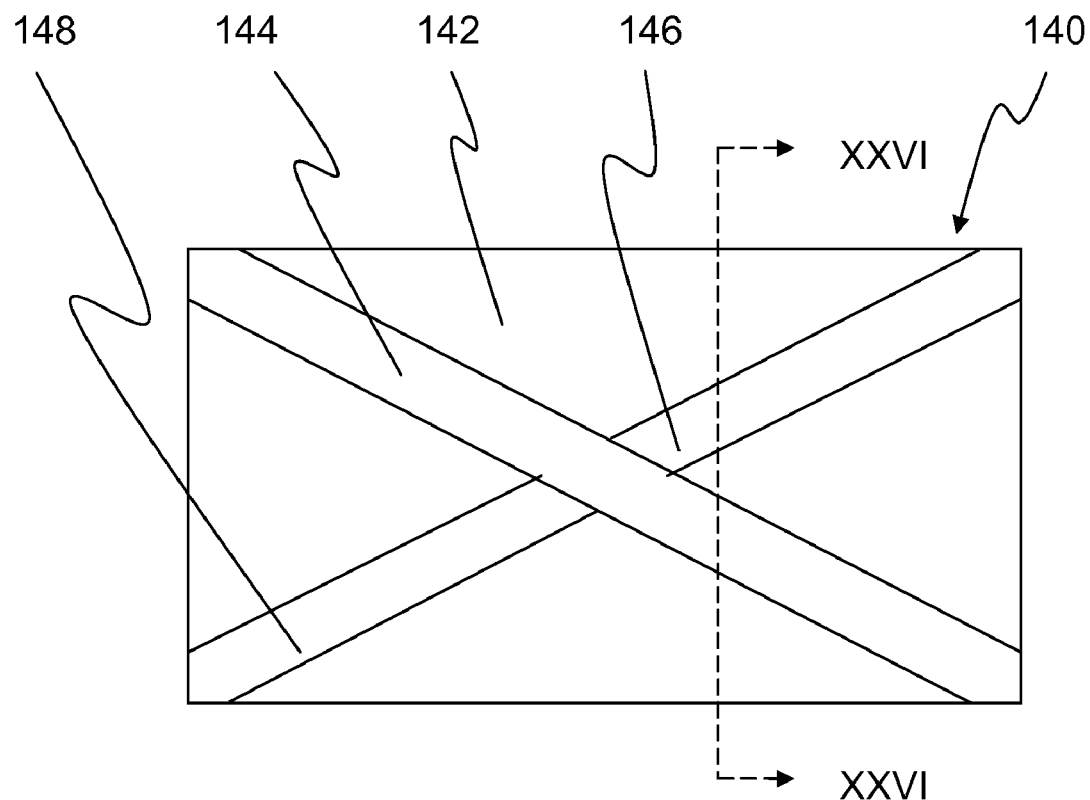
FIG. 25 is a top view of a portion of a thirteenth embodiment of a reinforced SCP panel of the present invention.

FIG. 25 is a top view of a portion of a thirteenth embodiment of a reinforced SCP panel 140 of the present invention employing three reinforcing members 144, 146, 148 attached to SCP material 142 to form a cross-shaped pattern.

Figure 26:
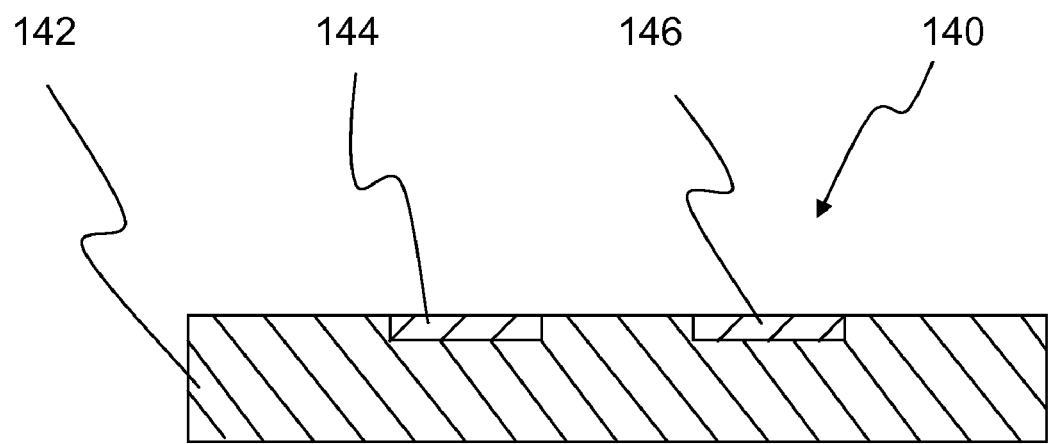
FIG. 26 is a cross-sectional view along view XXVI-XXVI of the panel of FIG. 25.

FIG. 26 is a cross-sectional view along view XXVI-XXVI of the panel 140 of FIG. 25.

Figure 27:
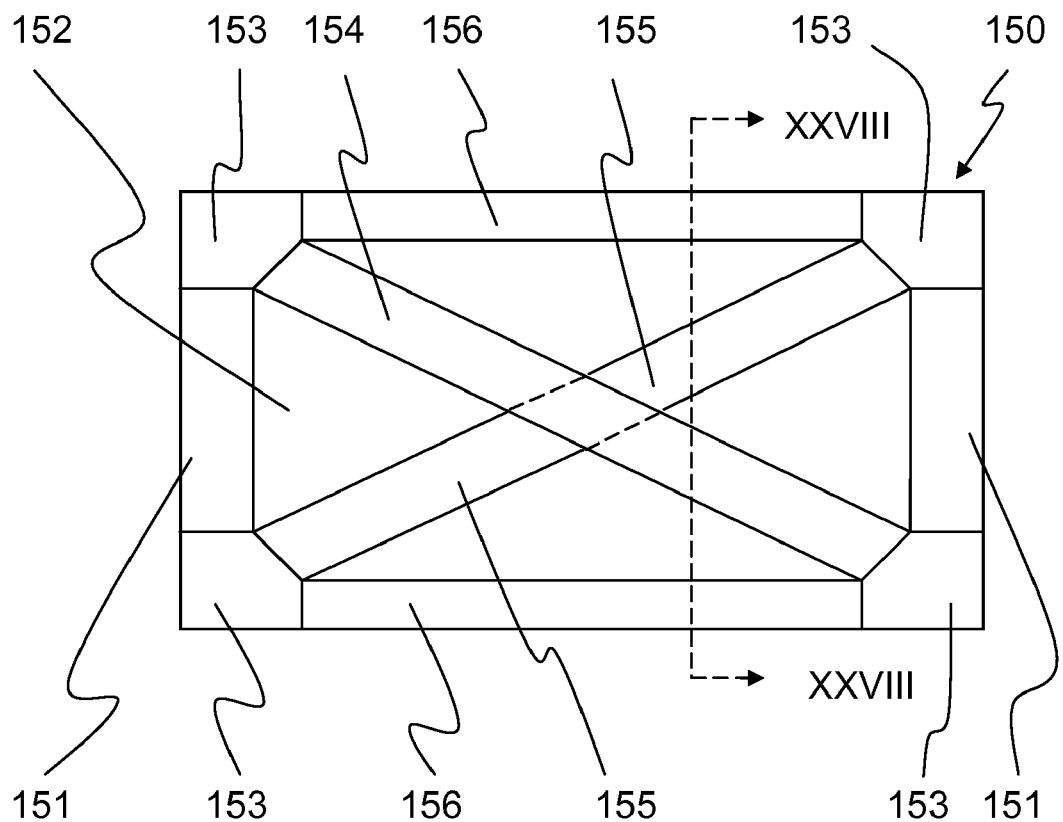
FIG. 27 is a top view of a portion of a fourteenth embodiment of a reinforced SCP panel of the present invention.

FIG. 27 is a top view of a portion of a fourteenth embodiment of a reinforced SCP panel of the present invention a crossed pair of reinforcing members 154, 155 attached to SCP material 152 to form a cross-shaped pattern and framed by a multi-piece reinforced border on one of the surfaces of the SCP material 152. The border including corner pieces 153, longitudinal side pieces 156 and transverse side pieces 151.

Figure 28:
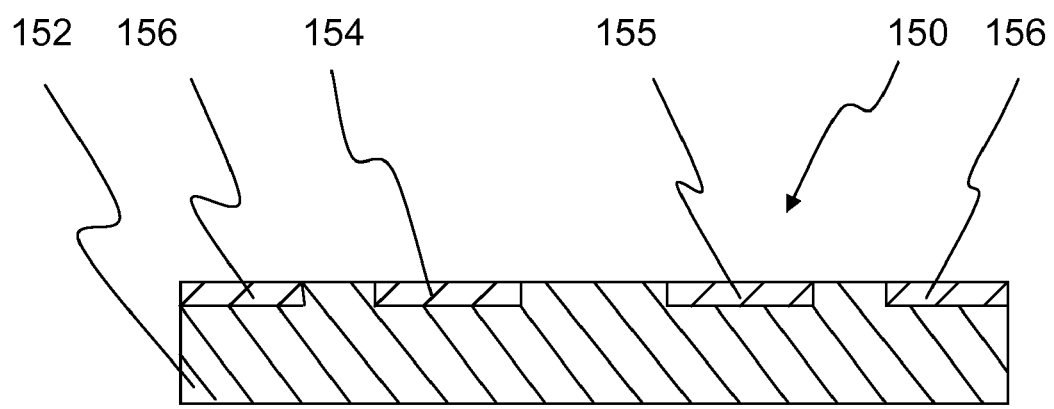
FIG. 28 is a cross-sectional view along view XXVIII-XXVIII of the panel of FIG. 27.

FIG. 28 is a cross-sectional view along view XXVIII-XXVIII of the panel 150 of FIG. 27.

FIG. 29 is a side view of a multi-layer SCP panel 101 of the present invention having layers 102, 104, 106, 108, with the reinforcement omitted for clarity.

Use of the Panels on Framing

Figure 30:
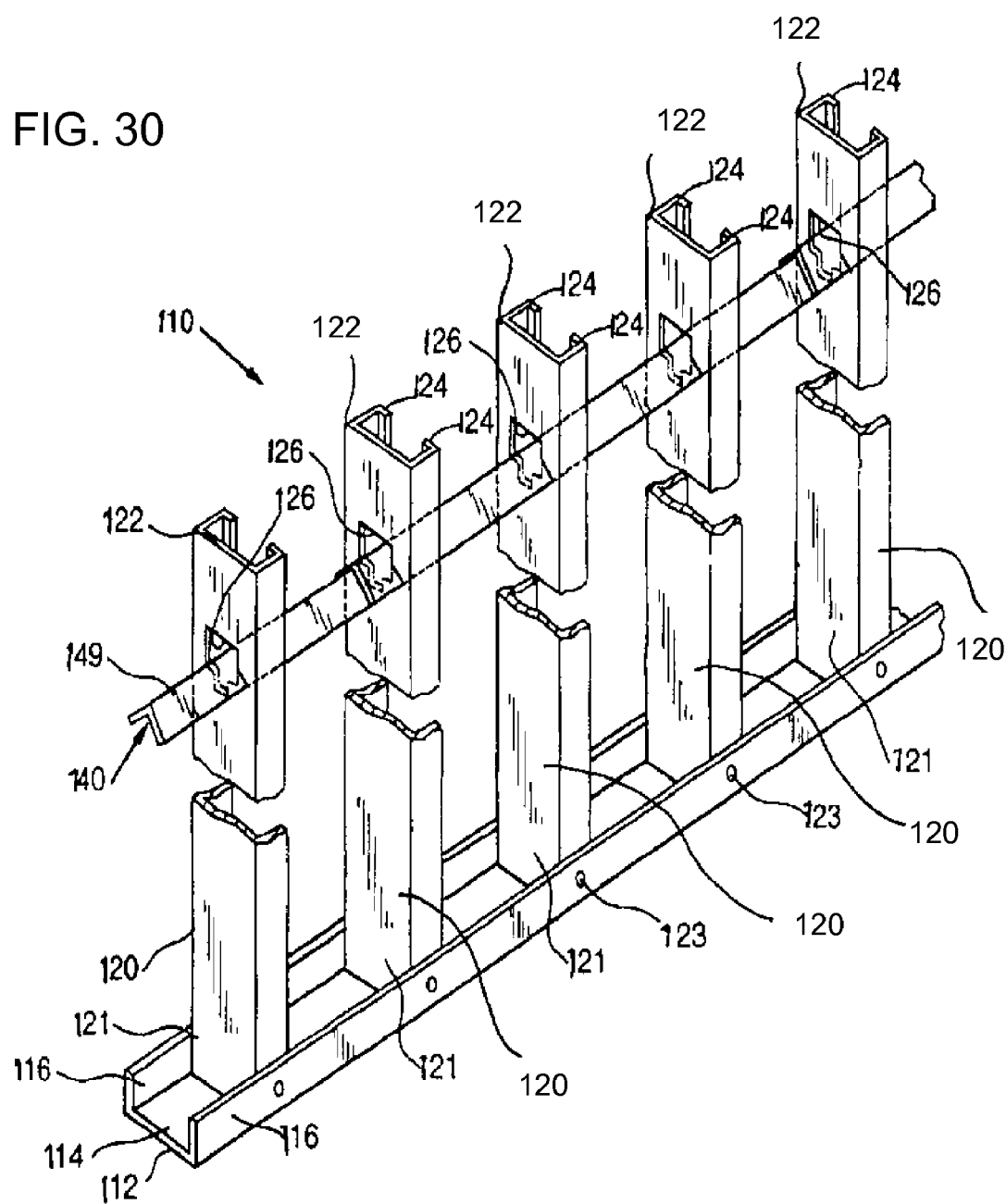
FIG. 30 is a schematic side view of a metal frame wall suitable for employing with a reinforced structural cementitious panel (SCP) panel of the present invention.

FIG. 30 is a perspective view of a typical metal wall frame suitable for use with the reinforced SCP panels of the present invention. As shown in FIG. 30, a frame 110 for supporting the walls of the foundation 2 includes a lower track 112, a plurality of metal studs 120, and an optional spacer member 140. SCP panels 101 (FIG. 29) may be secured in any known manner to the outer side, and if desired the inner side, of the metal wall frame 110 to close the wall and form the exterior surface or surfaces of the wall. U.S. Pat. No. 6,694,695 to Collins et al., incorporated herein by reference, more fully describes the arrangement of this metal wall frame.

The studs 120 are generally C-shaped. More particularly, the studs 120 have a web 122 and a pair of L-shaped flanges 124 perpendicular to the web 122. There are also one or more openings 126 in the web 122. The openings 126 permit electrical conduit and plumbing to be run within the stud wall. The metal studs 120 are secured at one end 121 to lower track 112 by conventional fasteners 123 such as, for example, screws, rivets, etc. The lower track 112 is also C-shaped with a central web portion 114 and two legs 116 protruding from web 114. In the present foundation system, the web 114 of the bottom track 112 is typically affixed to a floor (not shown) with conventional fasteners such as screws, bolts, rivets, etc.

An optional V-shaped stud spacer member 140 having a crease 149 is inserted through the aligned openings 126 provided through the webs 122 of the respective studs 120 such that notches 142 in the stud spacer member 140 engage the stud openings 126 of the web 122 of respective studs 120.

Figure 35:
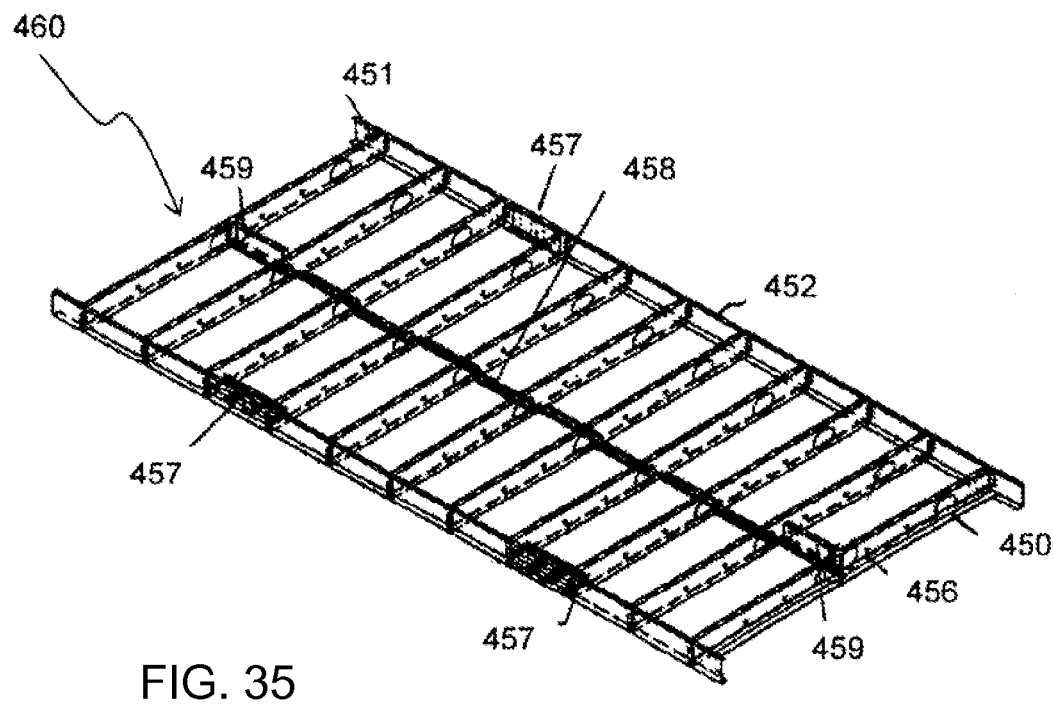
FIG. 35 is a perspective view of a typical metal floor frame 160 suitable for use with the reinforced SCP panels of the present invention.

FIG. 35 is a perspective view of a typical metal floor frame 460 suitable for use with the reinforced SCP panels of the present invention. The metal frame 460 has C-joist framing 450 supported on a header or longitudinal rim track 452. In practice, the reinforced SCP panels may be mechanically or adhesively attached to the C-joists 450 or be not attached to the C-joists (i.e., be floating).

The joists were attached to the rim track 452 using screws into the side of the joist through a pre-bent tab and screws through the top of rim track into the joist 450, at each end. Steel angles 451 were also fastened with screws to the respective joist 450 and to the rim track 452. KATZ blocking 458 was fastened to the bottom of the joists 450 across the center line of the floor. The blocking 458 was attached using a screw through the end of each Katz blocking member 458. In particular, the Katz blocking 458 is located between transverse joints 450 by being positioned staggered on either side of the midpoint and attached by screws. Additional horizontal blocking may be added to the rim track 452 on the load side to strengthen the rim track 452 for point loading purposes. Namely, blocking 457 for load support is provided along the longitudinal rim track between a number of transverse joists 450. 20 inch long blocking 459 is fixed between each transverse end joist and the respective penultimate transverse end 452 joist generally along the longitudinal axis of the frame with screws. Typically a reinforced SCP panel could be attached to the frame by screws or adhesive. Afterwards, at the butt-joints and tongue and groove locations of the panels, an adhesive, for example ENERFOAM SF polyurethane foam adhesive manufactured by Flexible Products Company of Canada, Inc., could be applied in the joint.

U.S. Pat. No. 6,691,478 B2 to Daudet et al. discloses another example of a suitable metal flooring system.

Figure 36:
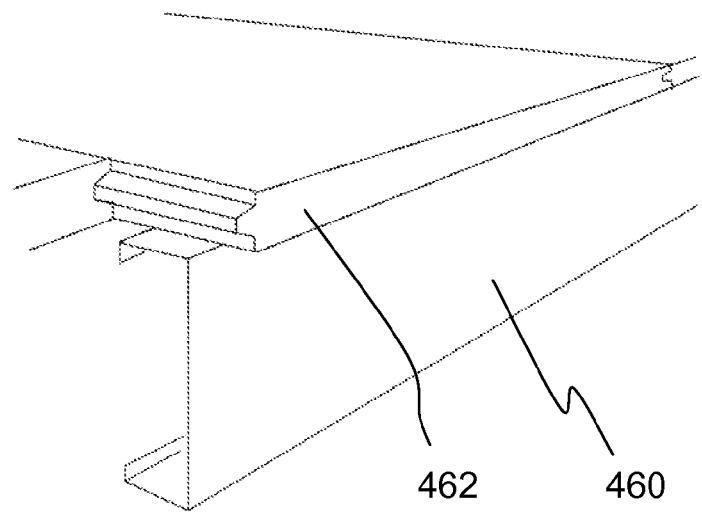
FIG. 36 is a fragmentary schematic vertical section of a single-layer SCP panel 162 supported on metal frame of FIG. 35 in a system of the present invention.

FIG. 36 is a fragmentary schematic vertical section of a single-layer SCP panel 462 supported on metal frame 460 of FIG. 35 in a system of the present invention. If desired a fastener (not shown) may attach the SCP panel to a C-joist of the metal frame 460. In practice the floor may be mechanically or adhesively attached to the C-joist or be not attached to the C-joist (i.e., be floating).

The frames may be wood or any metal, e.g., steel or galvanized steel, framing systems suitable for supporting flooring. Typical metal frames include C-joists having openings therein for passing plumbing and electrical lines there through and headers for supporting the C-joists about the floor perimeter. Preferably the frames are metal to result in a non-combustible system.

Figure 37:
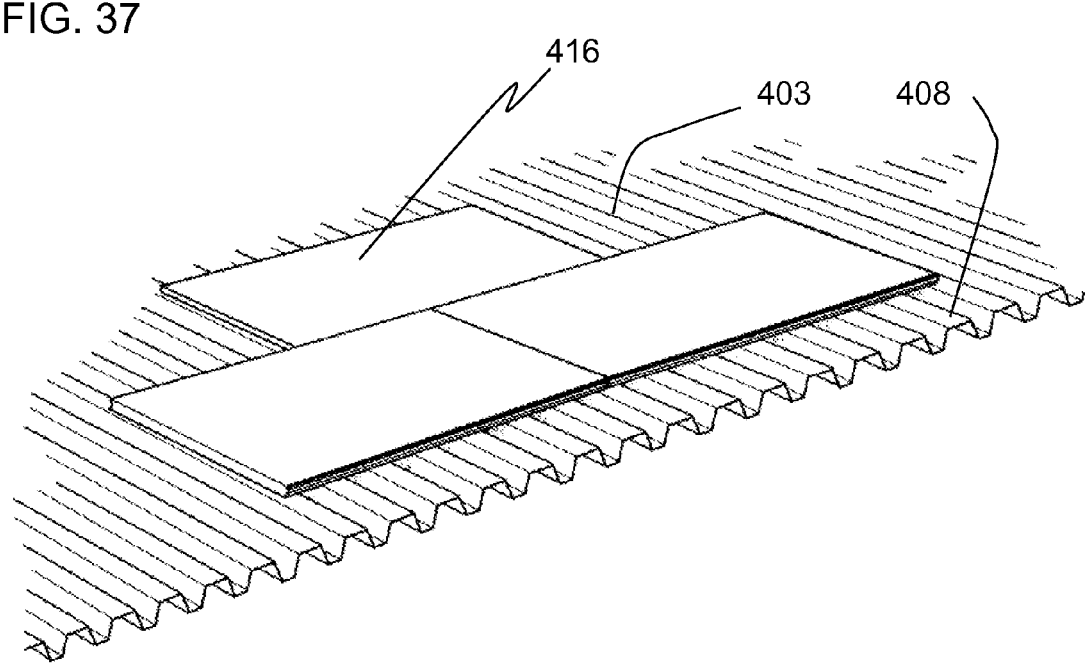
FIG. 37 is a perspective view of SCP panels of FIG. 36 supported on a corrugated sheet in the non-combustible flooring system of the present invention.

FIG. 37 is a perspective view of SCP panels 416 of FIG. 36 supported on a corrugated sheet 403 in the non-combustible flooring system of the present invention.

Figure 38:
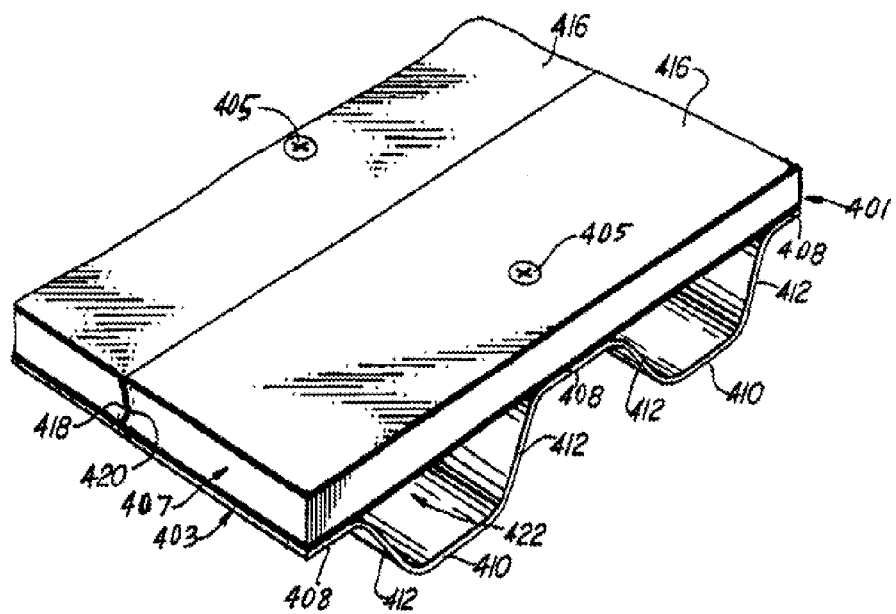
FIG. 38 shows a perspective view of a portion of the embodiment of FIG. 37 wherein SCP panel is attached to corrugated sheet with metal screws.

In FIG. 38 the numeral 401 generally designates a composite flooring deck assembly comprising a corrugated sheet 403 supported from below by a joist (not shown, but which could for example be a C-joist or I-beam or any other suitable joist) and secured from above by mechanical fasteners 405 to a diaphragm 407 of SCP panels 416.

Corrugated sheet 403 typically has flat portions 408 and 410 of substantially equal length joined by connector portions 412 providing straight, parallel, regular, and equally curved ridges and hollows. This configuration has a substantially equal distribution of surface area of the corrugated sheet above and below a neutral axis 414 (as seen in FIG. 38). Optionally the panels 416 have a tongue 418 and groove 420 formed on opposite edges thereof to provide for continuous interlocking of flooring substrate panels 416 to minimize joint movement under moving and concentrated loads.

The embodiment of FIG. 37 involves a design using a system of corrugated steel decking, designed using steel properties provided by the Steel Deck Institute (SDI) applied over steel joists and girders. A ceiling (not shown), such as gypsum drywall mounted on DIETRICH RC DELUXE channels may be attached to the bottoms of the joists or ceiling tiles and grid may be hung from the joists. An alternate is for the bottom surfaces of the steel to be covered with spray fiber or fireproofing materials. The steel joists which support the steel decking are any which can support the system. Typical steel joists may include those outlined by the SSMA (Steel Stud Manufacturer's Association) for use in corrugated steel deck systems, or proprietary systems, such as those sold by Dietrich as TRADE READY Brand joists. Joist spacing of 24 inches (61 cm) is common. However, spans between joists may be greater or less than this. C-joists and open web joists are typical.

In the particular embodiment of the invention illustrated in FIG. 37, SCP panels 416 have sufficient strength to create a structural bridge over the wide rib openings 422. FIG. 38 shows the SCP panels 416 attached to the corrugated sheet 403 by screws 405.

Figure 39:
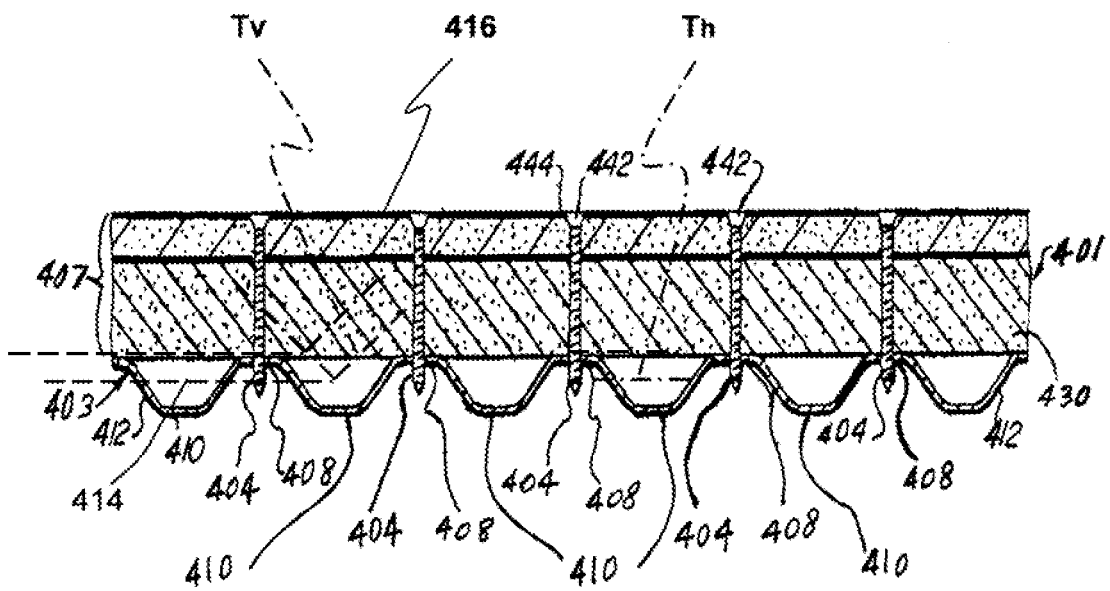
FIG. 39 shows an embodiment of a roofing system using the reinforced SCP panels of the present invention.

As illustrated in FIG. 39, for a roof deck, spaced screws 405, having screw heads 442 are oriented to form a series of generally triangular shaped horizontally disposed trusses (for example, truss $T_h$ shown as the horizontal line between two of the screws 405) and a series of vertically disposed trusses $T_v$ throughout the length and width of spans between spaced joists P (such as that shown in the embodiment of FIG. 40) to increase the resistance to horizontal and vertical planar deflection of the roof deck. SCP panel 416 is described in more detail below. In the form of the invention illustrated in FIG. 39 the diaphragm 407 comprises an SCP panel 416 positioned over a sheet of insulation material 430.

Figure 40:
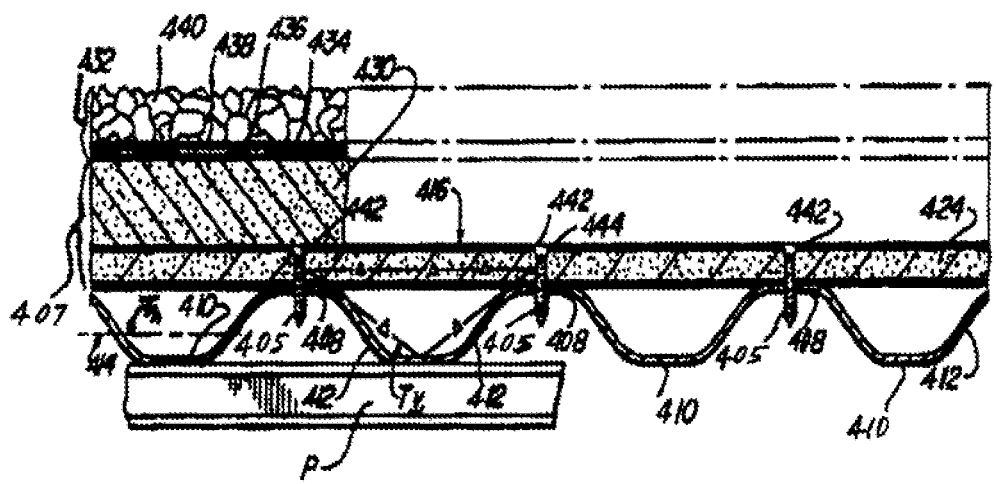
FIG. 40 shows another embodiment of a roofing system using the reinforced SCP panels of the present invention.

FIG. 40 is a cross-sectional view of the SCP panel of FIG. 36 supported on a corrugated sheet of a roofing system wherein the SCP panel 416 is secured over a sheet of insulation material 430 in the non-combustible building system of the present invention. In the form of the invention of FIG. 40 the diaphragm 407 is secured to upper ridge portions 208 of the corrugated sheet 403 by threaded screws 405 having enlarged heads 442.

The form of the system illustrated in FIG. 40 is similar to that of FIG. 39 except that a layer or sheet 430 of thermal insulation material is positioned over the SCP panels 416 to form the diaphragm 407. Sheet 430 of insulation material typically comprises incombustible foamed polystyrene or other suitable insulation material. For example, other insulation material such as polyurethane, fiberglass, cork and the like may be employed in combination with or in lieu of the polystyrene.

Formulation of SCP Panels

The components used to make the shear resistant panels of the invention include hydraulic cement, calcium sulfate alpha hemihydrate, an active pozzolan such as silica fume, lime, ceramic microspheres, alkali-resistant glass fibers, superplasticizer (e.g., sodium salt of polynapthalene sulfonate), and water. Typically, both hydraulic cement and calcium sulfate alpha hemihydrate are present. Long term durability of the composite is compromised if calcium sulfate alpha hemihydrate is not present along with silica fume. Water/moisture durability is compromised when Portland cement is not present. Small amounts of accelerators and/or retarders may be added to the composition to control the setting characteristics of the green (i.e., uncured) material. Typical non-limiting additives include accelerators for hydraulic cement such as calcium chloride, accelerators for calcium sulfate alpha hemihydrate such as gypsum, retarders such as DTPA (diethylene triamine pentacetic acid), tartaric acid or an alkali salt of tartaric acid (e.g., potassium tartrate), shrinkage reducing agents such as glycols, and entrained air.

Panels of the invention will include a continuous phase in which alkali-resistant glass fibers and light weight filler, e.g., microspheres, are uniformly distributed. The continuous phase results from the curing of an aqueous mixture of the reactive powders, i.e., blend of hydraulic cement, calcium sulfate alpha hemihydrate, pozzolan, and lime), preferably including superplasticizer and/or other additives.

Typical weight proportions of embodiments of the reactive powders (inorganic binder), e.g., hydraulic cement, calcium sulfate alpha hemihydrate, pozzolan and lime, in the invention, based on dry weight of the reactive powders, are shown in TABLE 1. TABLE 1A lists typical ranges of reactive powders, lightweight filler, and glass fibers in compositions of the present invention.

TABLE 1

| Reactive Powder | Weight Percent (%) | Typical Weight Percent (%) |
|---|---|---|
| Hydraulic Cement | 20-55 | 25-40 |
| Calcium Sulfate Alpha Hemihydrate | 35-75 | 45-65 |
| Pozzolan | 5-25 | 10-15 |
| Lime | up to 3.5 or from 0.2 to 3.5 | 0.75-1.25 |

TABLE 1A

| SCP Composition (dry basis) | Weight Percent (%) | Typical Weight Percent (%) |
|---|---|---|
| Reactive Powder | 35-70 | 35-68 |
| Lightweight Filler | 20-50 | 23-49 |
| Glass Fibers | 5-20 | 5-17 |

Lime is not required in all formulations of the invention, but it has been found that adding lime provides superior panels and it usually will be added in amounts greater than about 0.2 wt. %. Thus, in most cases, the amount of lime in the reactive powders will be about 0.2 to 3.5 wt. %.

In the first embodiment of an SCP material for use in the invention, the dry ingredients of the composition will be the reactive powders (i.e., blend of hydraulic cement, calcium sulfate alpha hemihydrate, pozzolan, and lime), ceramic microspheres and alkali-resistant glass fibers, and the wet ingredients of the composition will be water and superplasticizer. The dry ingredients and the wet ingredients are combined to produce the panel of the invention. The ceramic microspheres are uniformly distributed in the matrix throughout the full thickness of the panel. Of the total weight of dry ingredients, the panel of the invention is formed from about 49 to 56 wt. % reactive powders, 35 to 42 wt. % ceramic microspheres and 7 to 12 wt. % alkali-resistant glass fibers. In a broad range, the panel of the invention is formed from 35 to 58 wt. % reactive powders, 34 to 49 wt. % lightweight filler, e.g., ceramic microspheres, and 6 to 17 wt. % alkali-resistant glass fibers of the total dry ingredients. The amounts of water and superplasticizer added to the dry ingredients will be sufficient to provide the desired slurry fluidity needed to satisfy processing considerations for any particular manufacturing process. The typical addition rates for water range between 35 to 60% of the weight of reactive powders and those for superplasticizer range between 1 to 8% of the weight of reactive powders.

The glass fibers are monofilaments having a diameter of about 5 to 25 microns (micrometers), preferably about 10 to 15 microns (micrometers). The monofilaments typically are combined in 100 filament strands, which may be bundled into rovings of about 50 strands. The length of the glass fibers will typically be about 0.25 to 1 or 2 inches (6.3 to 25 or 50 mm) or about 1 to 2 inches (25 to 50 mm) and broadly about 0.25 to 3 inches (6.3 to 76 mm). The fibers have random orientation, providing isotropic mechanical behavior in the plane of the panel.

A second embodiment of an SCP material suitable for use in the invention contains a blend of ceramic and glass microspheres uniformly distributed throughout the full thickness of the panel. Accordingly, the dry ingredients of the composition will be the reactive powders (hydraulic cement, calcium sulfate alpha hemihydrate, pozzolan, and lime), ceramic microspheres, glass microspheres, and alkali-resistant glass fibers, and the wet ingredients of the composition will be water and superplasticizer. The dry ingredients and the wet ingredients will be combined to produce the panel of the invention. The volume fraction of the glass microspheres in the panel will typically be in the range of 7 to 15% of the total volume of dry ingredients. Of the total weight of dry ingredients, the panel of the invention is formed from about 54 to 65 wt. % reactive powders, 25 to 35 wt. % ceramic microspheres, 0.5 to 0.8 wt. % glass microspheres, and 6 to 10 wt. % alkali-resistant glass fibers. In the broad range, the panel of the invention is formed from 42 to 68 wt. % reactive powders, 23 to 43 wt. % lightweight fillers, e.g., ceramic microspheres, 0.2 to 1.0 wt. % glass microspheres, and 5 to 15 wt. % alkali-resistant glass fibers, based on the total dry ingredients. The amounts of water and superplasticizer added to the dry ingredients will be adjusted to provide the desired slurry fluidity needed to satisfy the processing considerations for any particular manufacturing process. The typical addition rates for water range between 35 to 70% of the weight of reactive powders, but could be greater than 60% up to 70% (weight ratio of water to reactive powder of 0.6/1 to 0.7/1), preferably 65% to 75%, when it is desired to use the ratio of water-to-reactive powder to reduce panel density and improve cutability. The amount of superplasticizer will range between 1 to 8% of the weight of reactive powders. The glass fibers are monofilaments having a diameter of about 5 to 25 microns (micrometers), preferably about 10 to 15 microns (micrometers). They typically are bundled into strands and rovings as discussed above. The length of the glass fibers typically is about 1 to 2 inches (25 to 50 mm) and broadly about 0.25 to 3 inches (6.3 to 76 mm). The fibers will have random orientation providing isotropic mechanical behavior in the plane of the panel.

A third embodiment of SCP material suitable for use in the invention, contains a multi-layer structure in the panel created where the outer layer(s) have improved nailability (fastening ability)/cutability. This is achieved by increasing the water-to-cement ratio in the outer layer(s), and/or changing the amount of filler, and/or adding an amount of polymer microspheres sufficiently small such that the panel remains non-combustible. The core of the panel will typically contain ceramic microspheres uniformly distributed throughout the layer thickness or alternatively, a blend of one or more of ceramic microspheres, glass microspheres and fly ash cenospheres.

The dry ingredients of the core layer of this third embodiment are the reactive powders (typically hydraulic cement, calcium sulfate alpha hemihydrate, pozzolan, and lime), lightweight filler particles (typically microspheres such as ceramic microspheres alone or one or more of ceramic microspheres, glass microspheres and fly ash cenospheres), and alkali-resistant glass fibers, and the wet ingredients of the core layer are water and superplasticizer. The dry ingredients and the wet ingredients will be combined to produce the core layer of the panel of the invention. Of the total weight of dry ingredients, the core of the panel of the invention preferably is formed from about 49 to 56 wt. % reactive powders, 35 to 42 wt. % hollow ceramic microspheres and 7 to 12 wt. % alkali-resistant glass fibers, or alternatively, about 54 to 65 wt. % reactive powders, 25 to 35 wt. % ceramic microspheres, 0.5 to 0.8 wt. % glass microspheres or fly ash cenospheres, and 6 to 10 wt. % alkali-resistant glass fibers. In the broad range, the core layer of the panel of this embodiment of the present invention is typically formed by about 35 to 58 wt. % reactive powders, 34 to 49 wt. % lightweight fillers, e.g., ceramic microspheres, and 6 to 17 wt. % alkali-resistant glass fibers, based on the total dry ingredients, or alternatively, about 42 to 68 wt. % of reactive powders, 23 to 43 wt. % ceramic microspheres, up to 1.0 wt. %, preferably 0.2 to 1.0 wt. %, other lightweight filler, e.g., glass microspheres or fly ash cenospheres, and 5 to 15 wt. % alkali-resistant glass fibers. The amounts of water and superplasticizer added to the dry ingredients will be adjusted to provide the desired slurry fluidity needed to satisfy the processing considerations for any particular manufacturing process. The typical addition rates for water will range between 35 to 70% of the weight of reactive powders but will be greater than 60% up to 70% when it is desired to use the ratio of water-to-reactive powders to reduce panel density and improve nailability and those for superplasticizer will range between 1 to 8% of the weight of reactive powders. When the ratio of water-to-reactive powder is adjusted, the slurry composition will be adjusted to provide the panel of the invention with the desired properties.

There is generally an absence of polymer microspheres and an absence of polymer fibers that would cause the SCP panel to become combustible.

The dry ingredients of the outer layer(s) of this third embodiment will be the reactive powders (typically hydraulic cement, calcium sulfate alpha hemihydrate, pozzolan, and lime), lightweight filler particles (typically microspheres such as ceramic microspheres alone or one or more of ceramic microspheres, glass microspheres and fly ash cenospheres), and alkali-resistant glass fibers, and the wet ingredients of the outer layer(s) will be water and superplasticizer. The dry ingredients and the wet ingredients are combined to produce the outer layers of the panel of the invention. In the outer layer(s) of the panel of this embodiment of the present invention, the amount of water is selected to furnish good fastening and cutting ability to the panel. Of the total weight of dry ingredients, the outer layer(s) of the panel of the invention preferably are formed from about 54 to 65 wt. % reactive powders, 25 to 35 wt. % ceramic microspheres, 0 to 0.8 wt. % glass microspheres, and 6 to 10 wt. % alkali-resistant glass fibers. In the broad range, the outer layers of the panel of the invention are formed from about 42 to 68 wt. % reactive powders, 23 to 43 wt. % ceramic microspheres, up to 1.0 wt. % glass microspheres (and/or fly ash cenospheres), and 5 to 15 wt. % alkali-resistant glass fibers, based on the total dry ingredients. The amounts of water and superplasticizer added to the dry ingredients are adjusted to provide the desired slurry fluidity needed to satisfy the processing considerations for any particular manufacturing process. The typical addition rates for water range between 35 to 70% of the weight of reactive powders and particularly greater than 60% up to 70% when the ratio of water-to-reactive powders is adjusted to reduce panel density and improve nailability, and typical addition rates for superplasticizer will range between 1 to 8% of the weight of reactive powders. The preferable thickness of the outer layer(s) ranges between 1/32 to 4/32 inches (0.8 to 3.2 mm) and the thickness of the outer layer when only one is used will be less than 3/8 of the total thickness of the panel.

In both the core and outer layer(s) of this embodiment of the present invention, the glass fibers are monofilaments having a diameter of about 5 to 25 microns (micrometers), preferably 10 to 15 microns (micrometers). The monofilaments typically are bundled into strands and rovings as discussed above. The length typically is about 1 to 2 inches (25 to 50 mm) and broadly about 0.25 to 3 inches (6.3 to 76 mm). The fiber orientation will be random, providing isotropic mechanical behavior in the plane of the panel.

A fourth embodiment of SCP material for use in the present invention provides a multi-layer panel having a density of 65 to 90 pounds per cubic foot and capable of resisting shear loads when fastened to framing and comprising a core layer of a continuous phase resulting from the curing of an aqueous mixture, a continuous phase resulting from the curing of an aqueous mixture comprising, on a dry basis, 35 to 70 weight % reactive powder, 20 to 50 weight percent lightweight filler, and 5 to 20 weight % glass fibers, the continuous phase being reinforced with glass fibers and containing the lightweight filler particles, the lightweight filler particles having a particle specific gravity of from 0.02 to 1.00 and an average particle size of about 10 to 500 microns (micrometers); and at least one outer layer of respectively another continuous phase resulting from the curing of an aqueous mixture comprising, on a dry basis, 35 to 70 weight % reactive powder, 20 to 50 weight percent lightweight filler, and 5 to 20 weight % glass fibers, the continuous phase being reinforced with glass fibers and containing the lightweight filler particles, the lightweight filler particles having a particle specific gravity of from 0.02 to 1.00 and an average particle size of about 10 to 500 microns (micrometers) on each opposed side of the inner layer, wherein the at least one outer layer has a higher percentage of glass fibers than the inner layer.

Making a Panel of the Invention

The reactive powders, e.g., blend of hydraulic cement, calcium sulfate alpha hemihydrate, pozzolan, and lime), and lightweight filler, e.g., microspheres, are blended in the dry state in a suitable mixer.

Then, water, a superplasticizer (e.g., the sodium salt of polynapthalene sulfonate), and the pozzolan (e.g., silica fume or metakaolin) are mixed in another mixer for 1 to 5 minutes. If desired, a retarder (e.g., potassium tartrate) is added at this stage to control the setting characteristics of the slurry. The dry ingredients are added to the mixer containing the wet ingredients and mixed for 2 to 10 minutes to form smooth homogeneous slurry.

The slurry is then combined with glass fibers, in any of several ways, with the objective of obtaining a uniform slurry mixture. The cementitious panels are then formed by pouring the slurry containing fibers into an appropriate mold of desired shape and size. If necessary, vibration is provided to the mold to obtain good compaction of material in the mold. The panel is given required surface finishing characteristics using an appropriate screed bar or trowel. The panel may then be embossed to provide indentations and the reinforcement members are inserted into the indentations and attached to the panel. If desired, rather than placing the reinforcement members into indentations, they may be placed on the non-indented surface to protrude from the panel.

One of a number of methods to make multi-layer SCP panels is as follows. The reactive powders, e.g., blend of hydraulic cement, calcium sulfate alpha hemihydrate, pozzolan, and lime), and lightweight filler, e.g., microspheres, are blended in the dry state in a suitable mixer. Then, water, a superplasticizer (e.g., the sodium salt of polynapthalene sulfonate), and the pozzolan (e.g., silica fume or metakaolin) are mixed in another mixer for 1 to 5 minutes. If desired, a retarder (e.g., potassium tartrate) is added at this stage to control the setting characteristics of the slurry. The dry ingredients are added to the mixer containing the wet ingredients and mixed for 2 to 10 minutes to form a smooth homogeneous slurry.

The slurry may be combined with the glass fibers in several ways, with the objective of obtaining a uniform mixture. The glass fibers typically will be in the form of rovings that are chopped into short lengths. In a preferred embodiment, the slurry and the chopped glass fibers are concurrently sprayed into a panel mold. Preferably, spraying is done in a number of passes to produce thin layers, preferably up to about 0.25 inches (6.3 mm) thick, which are built up into a uniform panel having no particular pattern and with a thickness of ¼ to 1 inch (6.3 to 25.4 mm). For example, in one application, a 3×5 ft (0.91×1.52 m) panel was made with six passes of the spray in the length and width directions. As each layer is deposited, a roller may be used to assure that the slurry and the glass fibers achieve intimate contact. The layers may be leveled with a screed bar or other suitable means after the rolling step. Typically, compressed air will be used to atomize the slurry. As it emerges from the spray nozzle, the slurry mixes with glass fibers that have been cut from a roving by a chopper mechanism mounted on the spray gun. The uniform mixture of slurry and glass fibers is deposited in the panel mold as described above.

If desired the outer surface layers of the panel may contain polymer spheres, or be otherwise constituted, in order that the fasteners used to attach the panel to framing can be driven easily. The preferable thickness of such layers will be about 1/32 inches to 4/32 inches (0.8 to 3.2 mm). The same procedure described above by which the core of the panel is made may be used to apply the outer layers of the panel.

Other methods of depositing a mixture of the slurry and glass fibers will occur to those familiar with the panel-making art. For example, rather than using a batch process to make each panel, a continuous sheet may be prepared in a similar manner, which after the material has sufficiently set, can be cut into panels of the desired size. The percentage of fibers relative to the volume of slurry typically constitutes approximately in the range of 0.5% to 3%, for example 1.5%. Typical panels have a thickness of about ¼ to 1½ inches (6.3 to 38.1 mm).

The SCP panels are typically embossed with a pattern sufficiently deep such that the reinforcement when inserted into the pattern has an outer surface flush with the outer surface of the panel. Although, if desired, the embossing may be omitted such that the reinforcement upper surface will protrude from the surface of the SCP panel.

The reinforcement members are preferably at least temporarily affixed to the SCP panel by an adhesive applied to one of the mating major surfaces. Other attachment means of affixing reinforcement members to SCP panel, such as double sided tape, may be employed also. The adhesive may be epoxy or glue, and may be applied by various means such as brushing or spraying, for example. Further, the adhesive may be applied to a portion or portions of one or both of the major surfaces. However, adhesive is preferably spread over the extent of one of the major surfaces of one of either wallboard panel or reinforcement piece and is a water soluble latex based glue. The amount of adhesive applied to adhere the SCP panel and reinforcement piece together is an amount at least sufficient to hold these two members together such that the composite wallboard structure can be handled and constructed into a building wall structure. Thus, the adhesive applied between the SCP panel and reinforcement piece is of sufficient quantity to hold these two members together while the composite structure is being handled, shipped and attached to building wall framing studs or floor framing joists, in typical building construction processes.

The reinforced SCP panel could be made by automated processes. For example, an SCP panel could be manufactured and provided by automated machinery well known in the industry. The SCP panel could continue its processing by spraying one of its surfaces with an adhesive utilizing a spraying device stationed over SCP panel. A reinforcement piece such as a metal strip can thereafter be laid on the adhesive by a robotics mechanism.

Another method of making panels of the present invention is by using the process steps disclosed in U.S. patent application Ser. No. 10/666,294 incorporated herein by reference. U.S. patent application Ser. No. 10/666,294, incorporated herein by reference, discloses after one of an initial deposition of loosely distributed, chopped fibers or a layer of slurry upon a moving web, fibers are deposited upon the slurry layer. An embedment device compacts the recently deposited fibers into the slurry, after which additional layers of slurry, then chopped fibers are added, followed by more embedment. The process is repeated for each layer of the board, as desired. Then the board is typically embossed to have a pattern of indentations and the reinforcement members are inserted into the indentations and attached to the board.

More specifically, U.S. patent application Ser. No. 10/666, 294 discloses a multi-layer process for producing structural cementitious panels, including: (a.) providing a moving web; (b.) one of depositing a first layer of loose fibers and (c.) depositing a layer of settable slurry upon the web; (d.) depositing a second layer of loose fibers upon the slurry; (e.) embedding the second layer of fibers into the slurry; and (f.) repeating the slurry deposition of step (c.) through step (d.) until the desired number of layers of settable fiber-enhanced slurry in the panel is obtained.

Figure 31:
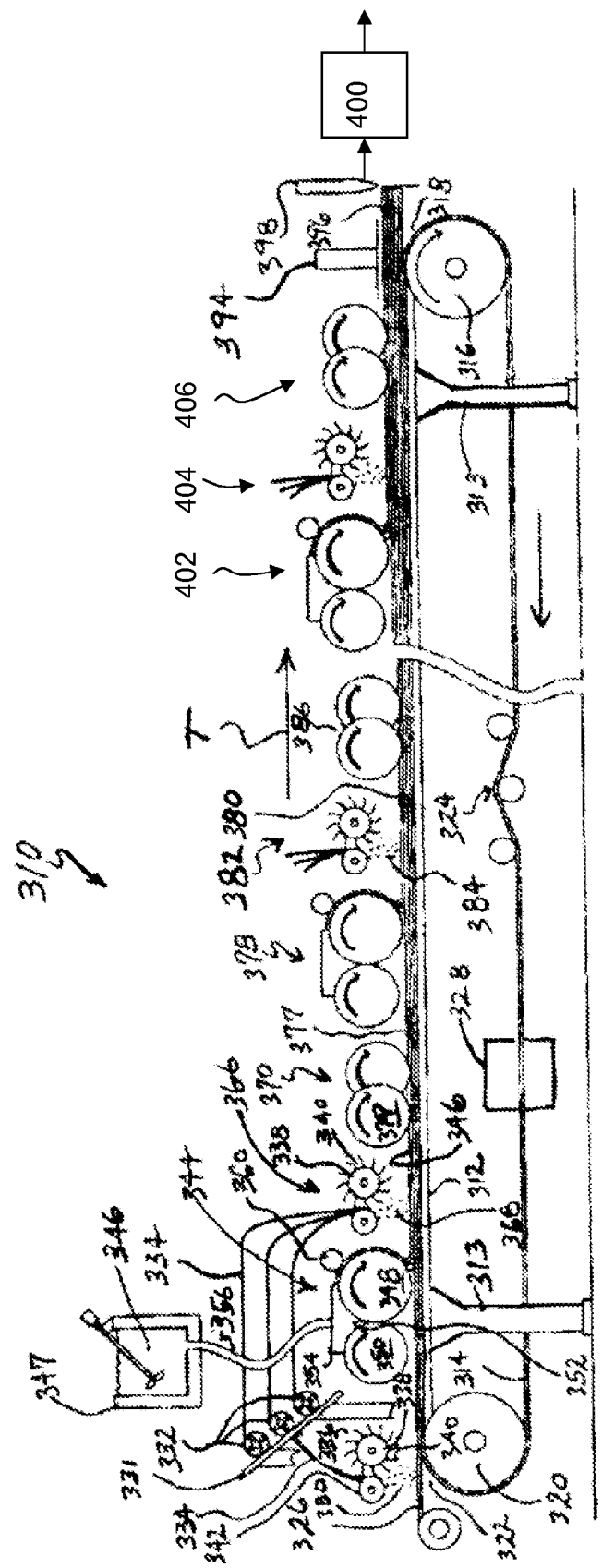
FIG. 31 is an elevation view of an apparatus which is suitable for making the SCP panel of the present invention, except for a downstream embossing station and reinforcement attaching station.

FIG. 31 is a diagrammatic elevational view of an apparatus which is suitable for performing the process of U.S. patent application Ser. No. 10/666,294, but for adding embossing capability to the forming device 394 and adding a reinforcement member attaching station 400.

Referring now to FIG. 31, a structural panel production line is diagrammatically shown and is generally designated 310. The production line 310 includes a support frame or forming table 312 having a plurality of legs 313 or other supports. Included on the support frame 312 is a moving carrier 314, such as an endless rubber-like conveyor belt with a smooth, water-impervious surface, however porous surfaces are contemplated. As is well known in the art, the support frame 312 may be made of at least one table-like segment, which may include designated legs 313. The support frame 312 also includes a main drive roll 316 at a distal end 318 of the frame, and an idler roll 320 at a proximal end 322 of the frame. Also, at least one belt tracking and/or tensioning device 324 is preferably provided for maintaining a desired tension and positioning of the carrier 314 upon the rolls 316, 320.

Also, in the preferred embodiment, a web 326 of Kraft paper, release paper, and/or other webs of support material designed for supporting slurry prior to setting, as is well known in the art, may be provided and laid upon the carrier 314 to protect it and/or keep it clean. However, it is also contemplated that the panels produced by the present line 310 are formed directly upon the carrier 314. In the latter situation, at least one belt washing unit 328 is provided. The carrier 314 is moved along the support frame 312 by a combination of motors, pulleys, belts or chains which drive the main drive roll 316 as is known in the art. It is contemplated that the speed of the carrier 314 may vary to suit the application.

In the apparatus of FIG. 31, structural cementitious panel production is initiated by one of depositing a layer of loose, chopped fibers 330 or a layer of slurry upon the web 326. An advantage of depositing the fibers 330 before the first deposition of slurry is that fibers will be embedded near the outer surface of the resulting panel. A variety of fiber depositing and chopping devices are contemplated by the present line 310, however the preferred system employs at least one rack 331 holding several spools 332 of fiberglass cord, from each of which a cord 334 of fiber is fed to a chopping station or apparatus, also referred to as a chopper 336.

The chopper 336 includes a rotating bladed roll 338 from which project radially extending blades 340 extending transversely across the width of the carrier 314, and which is disposed in close, contacting, rotating relationship with an anvil roll 342. In the preferred embodiment, the bladed roll 338 and the anvil roll 342 are disposed in relatively close relationship such that the rotation of the bladed roll 338 also rotates the anvil roll 342, however the reverse is also contemplated. Also, the anvil roll 342 is preferably covered with a resilient support material against which the blades 340 chop the cords 334 into segments. The spacing of the blades 340 on the roll 338 determines the length of the chopped fibers. As is seen in FIG. 31, the chopper 336 is disposed above the carrier 314 near the proximal end 322 to maximize the productive use of the length of the production line 310. As the fiber cords 334 are chopped, the fibers 330 fall loosely upon the carrier web 326.

Next, a slurry feed station, or a slurry feeder 344 receives a supply of slurry 346 from a remote mixing location 347 such as a hopper, bin or the like. It is also contemplated that the process may begin with the initial deposition of slurry upon the carrier 314. The slurry is preferably comprised of varying amounts of Portland cement, gypsum, aggregate, water, accelerators, plasticizers, foaming agents, fillers and/or other ingredients, and described above and in the patents listed above which have been incorporated by reference for producing SCP panels. The relative amounts of these ingredients, including the elimination of some of the above or the addition of others, may vary to suit the use.

While various configurations of slurry feeders 344 are contemplated which evenly deposit a thin layer of slurry 346 upon the moving carrier 314, the preferred slurry feeder 344 includes a main metering roll 348 disposed transversely to the direction of travel of the carrier 314. A companion or back up roll 350 is disposed in close parallel, rotational relationship to the metering roll 348 to form a nip 352 there between. A pair of sidewalls 354, preferably of non-stick material such as Teflon® brand material or the like, prevents slurry 346 poured into the nip 352 from escaping out the sides of the feeder 344.

The feeder 344 deposits an even, relatively thin layer of the slurry 346 upon the moving carrier 314 or the carrier web 326. Suitable layer thicknesses range from about 0.05 inch to 0.20 inch. However, with four layers preferred in the preferred structural panel produced by the present process, and a suitable building panel being approximately 0.5 inch, an especially preferred slurry layer thickness is approximately 0.125 inch.

Referring now to FIGS. 31 and 32, to achieve a slurry layer thickness as described above, several features are provided to the slurry feeder 344. First, to ensure a uniform disposition of the slurry 346 across the entire web 326, the slurry is delivered to the feeder 344 through a hose 356 located in a laterally reciprocating, cable driven, fluid powered dispenser 358 of the type well known in the art. Slurry flowing from the hose 356 is thus poured into the feeder 344 in a laterally reciprocating motion to fill a reservoir 359 defined by the rolls 348, 350 and the sidewalls 354. Rotation of the metering roll 348 thus draws a layer of the slurry 346 from the reservoir.

Next, a thickness monitoring or thickness control roll 360 is disposed slightly above and/or slightly downstream of a vertical centerline of the main metering roll 348 to regulate the thickness of the slurry 346 drawn from the feeder reservoir 357 upon an outer surface 362 of the main metering roll 348. Also, the thickness control roll 360 allows handling of slurries with different and constantly changing viscosities. The main metering roll 348 is driven in the same direction of travel "T" as the direction of movement of the carrier 314 and the carrier web 326, and the main metering roll 348, the backup roll 350 and the thickness monitoring roll 360 are all rotatably driven in the same direction, which minimizes the opportunities for premature setting of slurry on the respective moving outer surfaces. As the slurry 346 on the outer surface 362 moves toward the carrier web 326, a transverse stripping wire 364 located between the main metering roll 348 and the carrier web 326 ensures that the slurry 346 is completely deposited upon the carrier web and does not proceed back up toward the nip 352 and the feeder reservoir 359. The stripping wire 364 also helps keep the main metering roll 348 free of prematurely setting slurry and maintains a relatively uniform curtain of slurry.

A second chopper station or apparatus 366, preferably identical to the chopper 336, is disposed downstream of the feeder 344 to deposit a second layer of fibers 368 upon the slurry 346. In the preferred embodiment, the chopper apparatus 366 is fed cords 334 from the same rack 331 that feeds the chopper 336. However, it is contemplated that separate racks 331 could be supplied to each individual chopper, depending on the application.

Referring now to FIGS. 31 and 33, next, an embedment device, generally designated 370 is disposed in operational relationship to the slurry 346 and the moving carrier 314 of the production line 310 to embed the fibers 368 into the slurry 346. While a variety of embedment devices are contemplated, including, but not limited to vibrators, sheep's foot rollers and the like, in the preferred embodiment, the embedment device 370 includes at least a pair of generally parallel shafts 372 mounted transversely to the direction of travel "T" of the carrier web 326 on the frame 312. Each shaft 372 is provided with a plurality of relatively large diameter disks 374 which are axially separated from each other on the shaft by small diameter disks 376.

During SCP panel production, the shafts 372 and the disks 374, 376 rotate together about the longitudinal axis of the shaft. As is well known in the art, either one or both of the shafts 372 may be powered, and if only one is powered, the other may be driven by belts, chains, gear drives or other known power transmission technologies to maintain a corresponding direction and speed to the driving roll. The respective disks 374, 376 of the adjacent, preferably parallel shafts 372 are intermeshed with each other for creating a "kneading" or "massaging" action in the slurry, which embeds the fibers 368 previously deposited thereon. In addition, the close, intermeshed and rotating relationship of the disks 372, 374 prevents the buildup of slurry 346 on the disks, and in effect creates a "self-cleaning" action which significantly reduces production line downtime due to premature setting of clumps of slurry.

The intermeshed relationship of the disks 374, 376 on the shafts 372 includes a closely adjacent disposition of opposing peripheries of the small diameter spacer disks 376 and the relatively large diameter main disks 374, which also facilitates the self-cleaning action. As the disks 374, 376 rotate relative to each other in close proximity (but preferably in the same direction), it is difficult for particles of slurry to become caught in the apparatus and prematurely set. By providing two sets of disks 374 which are laterally offset relative to each other, the slurry 346 is subjected to multiple acts of disruption, creating a "kneading" action which further embeds the fibers 368 in the slurry 346.

Once the fibers 368 have been embedded, or in other words, as the moving carrier web 326 passes the embedment device 370, a first layer 377 of the SCP panel is complete. In the preferred embodiment, the height or thickness of the first layer 377 is in the approximate range of 0.05-0.20 inches. This range has been found to provide the desired strength and rigidity when combined with like layers in a SCP panel. However, other thicknesses are contemplated depending on the application.

To build a structural cementitious panel of desired thickness, additional layers are needed. To that end, a second slurry feeder 378, which is substantially identical to the feeder 344, is provided in operational relationship to the moving carrier 314, and is disposed for deposition of an additional layer 380 of the slurry 346 upon the existing layer 377.

Next, an additional chopper 382, substantially identical to the choppers 336 and 366, is provided in operational relationship to the frame 312 to deposit a third layer of fibers 384 provided from a rack (not shown) constructed and disposed relative to the frame 312 in similar fashion to the rack 331. The fibers 384 are deposited upon the slurry layer 380 and are embedded using a second embedment device 386. Similar in construction and arrangement to the embedment device 370, the second embedment device 386 is mounted slightly higher relative to the moving carrier web 314 so that the first layer 377 is not disturbed. In this manner, the second layer 380 of slurry and embedded fibers is created.

Referring now to FIG. 31, with each successive layer of settable slurry and fibers, an additional slurry feeder station 344, 378, 402 followed by a fiber chopper 336, 366, 382, 404 and an embedment device 370, 386, 406 is provided on the production line 310. In the preferred embodiment, four total layers (see for example, the panel 101 of FIG. 29) are provided to form the SCP panel. Upon the disposition of the four layers of fiber-embedded settable slurry as described above, a forming device 394 is preferably provided to the frame 312 to shape an upper surface 396 of the panel. Such forming devices 394 are known in the settable slurry/board production art, and typically are spring-loaded or vibrating plates which conform the height and shape of the multi-layered panel to suit the desired dimensional characteristics.

The panel which is made has multiple layers (see for example layers 22, 24, 26, 28 of panel 101 of FIG. 29) which upon setting form an integral, fiber-reinforced mass. Provided that the presence and placement of fibers in each layer are controlled by and maintained within certain desired parameters as is disclosed and described below, it will be virtually impossible to delaminate the panel.

At this point, the layers of slurry have begun to set, and the respective panels are separated from each other by a cutting device 398, which in the preferred embodiment is a water jet cutter. Other cutting devices, including moving blades, are considered suitable for this operation, provided that they can create suitably sharp edges in the present panel composition. The cutting device 398 is disposed relative to the line 310 and the frame 312 so that panels are produced having a desired length, which may be different from the representation shown in FIG. 31. Since the speed of the carrier web 314 is relatively slow, the cutting device 398 may be mounted to cut perpendicularly to the direction of travel of the web 314. With faster production speeds, such cutting devices are known to be mounted to the production line 310 on an angle to the direction of web travel. Upon cutting, the separated panels 321 are stacked for further handling, packaging, storage and/or shipment as is well known in the art.

Then the reinforcement members are inserted into the pattern downstream of the forming device 394 and adhered with glue or other means to the SCP panel in an insertion and attaching station 400. If desired, the forming device 394 embosses the SCP panel to make indentations in the SCP panels and the reinforcement members are placed into the indentations in the insertion and attaching station 400.

In quantitative terms, the influence of the number of fiber and slurry layers, the volume fraction of fibers in the panel, and the thickness of each slurry layer, and fiber strand diameter on fiber embedment efficiency has been investigated. In the analysis, the following parameters were identified:

$v_T$=Total composite volume
$v_s$=Total panel slurry volume
$v_f$=Total panel fiber volume
$v_{f,I}$=Total fiber volume/layer
$v_{T,I}$=Total composite volume/layer
$v_{s,I}$=Total slurry volume/layer
$N_l$=Total number of slurry layers; Total number of fiber layers
$V_f$=Total panel fiber volume fraction
$d_f$=Equivalent diameter of individual fiber strand
$l_f$=Length of individual fiber strand
t=Panel thickness
$t_I$=Total thickness of individual layer including slurry and fibers
$t_{s,I}$=Thickness of individual slurry layer
$n_{f,I}$, $n_{f1,I}$, $n_{f2,I}$=Total number of fibers in a fiber layer
$s_{f,I}^P$, $s_{f1,I}^P$, $s_{f2,I}^P$=Total projected surface area of fibers contained in a fiber layer
$S_{f,I}^P$, $S_{f1,I}^P$, $S_{f2,I}^P$=Projected fiber surface area fraction for a fiber layer.

Projected Fiber Surface Area Fraction, $S_{f,I}^P$

Assume a panel composed of equal number of slurry and fiber layers. Let the number of these layers be equal to $N_l$, and the fiber volume fraction in the panel be equal to $V_f$.

In summary, the projected fiber surface area fraction, $S_{f,I}^P$ of a layer of fiber network being deposited over a distinct slurry layer is given by the following mathematical relationship:

$$S_{f,I}^P = \frac{4V_f t}{\pi N_l d_f} = \frac{4V_f * t_{s,I}}{\pi d_f(1-V_f)}$$

where, $V_f$ is the total panel fiber volume fraction, t is the total panel thickness, $d_f$ is the diameter of the fiber strand, $N_l$ is the total number of fiber layers and $t_{s,I}$ is the thickness of the distinct slurry layer being used.

Accordingly, to achieve good fiber embedment efficiency, the objective function becomes keeping the fiber surface area fraction below a certain critical value. It is noteworthy that by varying one or more variables appearing in the Equations 8 and 10, the projected fiber surface area fraction can be tailored to achieve good fiber embedment efficiency.

Different variables that affect the magnitude of projected fiber surface area fraction are identified and approaches have been suggested to tailor the magnitude of "projected fiber surface area fraction" to achieve good fiber embedment efficiency. These approaches involve varying one or more of the following variables to keep projected fiber surface area fraction below a critical threshold value: number of distinct fiber and slurry layers, thickness of distinct slurry layers and diameter of fiber strand.

Based on this fundamental work, the typical magnitudes of the projected fiber surface area fraction, $S_{f,I}^P$ have been discovered to be as follows:

Typical projected fiber surface area fraction, $S_{f,I}^P<0.65$

Another range of typical projected fiber surface area fraction, $S_{f,I}^P<0.45$ For a design panel fiber volume fraction, $V_f$, achievement of the aforementioned preferred magnitudes of projected fiber surface area fraction can be made possible by tailoring one or more of the following variables—total number of distinct fiber layers, thickness of distinct slurry layers and fiber strand diameter. In particular, the desirable ranges for these variables that lead to the typical magnitudes of projected fiber surface area fraction are as follows:

Thickness of Distinct Slurry Layers in Multiple Layer SCP panels, $t_{s,I}$

Preferred thickness of distinct slurry layers, $t_{s,I} \leq 0.20$ inches

More Preferred thickness of distinct slurry layers, $t_{s,I} \leq 0.12$ inches

Most preferred thickness of distinct slurry layers, $t_{s,I} \leq 0.08$ inches

Number of Distinct Fiber Layers in Multiple Layer SCP panels, $N_1$

| | |
|---|---|
| Preferred number of distinct fiber layers, $N_l$ | $\geq 4$ |
| Most preferred number of distinct fiber layers, $N_l$ | $\geq 6$ |

Fiber Strand Diameter, $d_f$

| | |
|---|---|
| Preferred fiber strand diameter, $d_f$ | $\geq 30$ tex |
| Most preferred fiber strand diameter, $d_f$ | $\geq 70$ tex |

In using the panels as structural subflooring or flooring underlayment, they preferably will be made with a tongue and groove construction, which may be made by shaping the edges of the panel during casting or before use by cutting the tongue and groove with a router. Preferably, the tongue and groove will be tapered, as shown in FIGS. 3 and 4A-C, the taper providing easy installation of the panels of the invention.

Additional details of variations on the process and the amounts of fibers embedded in typical SCP panels for use in the present invention are provided by the following patents and patent applications:

U.S. Pat. No. 6,986,812, to Dubey et al. entitled SLURRY FEED APPARATUS FOR FIBER-REINFORCED STRUCTURAL CEMENTITIOUS PANEL PRODUCTION, herein incorporated by reference in its entirety; and the following co-pending, commonly assigned, United States patent applications, all herein incorporated by reference in their entirety:

United States Patent Application Publication No. 2005/0064164 A1 to Dubey et al., application Ser. No. 10/666,294, entitled, MULTI-LAYER PROCESS AND APPARATUS FOR PRODUCING HIGH STRENGTH FIBER-REINFORCED STRUCTURAL CEMENTITIOUS PANELS;

United States Patent Application Publication No. 2005/0064055 A1 to Porter, application Ser. No. 10/665,541, entitled EMBEDMENT DEVICE FOR FIBER-ENHANCED SLURRY;

U.S. patent application Ser. No. 11/555,647, entitled PROCESS AND APPARATUS FOR FEEDING CEMENTITIOUS SLURRY FOR FIBER-REINFORCED STRUCTURAL CEMENT PANELS, filed Nov. 1, 2006;

U.S. patent application Ser. No. 11/555,655, entitled METHOD FOR WET MIXING CEMENTITIOUS SLURRY FOR FIBER-REINFORCED STRUCTURAL CEMENT PANELS, filed Nov. 1, 2006;

U.S. patent application Ser. No. 11/555,658, entitled APPARATUS AND METHOD FOR WET MIXING CEMENTITIOUS SLURRY FOR FIBER-REINFORCED STRUCTURAL CEMENT PANELS, filed Nov. 1, 2006;

U.S. patent application Ser. No. 11/555,661, entitled PANEL SMOOTHING PROCESS AND APPARATUS FOR FORMING A SMOOTH CONTINUOUS SURFACE ON FIBER-REINFORCED STRUCTURAL CEMENT PANELS, filed Nov. 1, 2006;

U.S. patent application Ser. No. 11/555,665, entitled WET SLURRY THICKNESS GAUGE AND METHOD FOR USE OF SAME, filed Nov. 1, 2006;

U.S. patent application Ser. No. 11/591,793, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006;

U.S. patent application Ser. No. 11/591,957, entitled EMBEDMENT ROLL DEVICE, filed Nov. 1, 2006.

Properties

The SCP panel and frame systems employing such SCP panels (prior to including reinforcement) preferably have one or more of the properties listed in TABLES 2A-2D. A number of these properties will be improved by reinforcement while others, for example, mold and bacterial resistance are expected to remain substantially the same.

TABLE 2A

| Physical Characteristics | ASTM Test Method | Unit | Preferred Target Value | Typical Range | Notes |
|---|---|---|---|---|---|
| Non-Combustibility | E-136 | Weight Loss | ≦50% | ≦50% | From Sec. 8, E-136 |
| | | Temp Rise | ≦54° F. | ≦54° | From Sec. 8, E-136 |
| | | 30 seconds | No flaming | No flaming | From Sec. 8, E-136 |
| Water Durability Flex. Strength of Sheathing | | | | | |
| Dry | C-947 | psi | ≧1800 | 1400-3500 | |
| Wet | C-947 | psi | ≧1650 | 1300-3000 | |
| AMOE of Sheathing | | | | | |
| Dry | | ksi | ≧700 | 600-1000 | |
| Wet | | ksi | ≧600 | 550-950 | |
| Screw Withdrawal | | | | | (screw size: #8 wire 1⅝ inch screw with 0.25 inch diameter head minimum) |
| ½" Panel-Dry | D-1761 | pounds | 352 | 250-450 | Equiv. to American Plywood Assoc. (APA) S-4 |
| ½" Panel-Wet | D-1761 | pounds | 293 | 200-400 | % of force for SCP relative to OSB 82%; % of force for SCP relative to Plywood 80% |
| ¾" Panel-Dry | D-1761 | pounds | 522 | 450-600 | Equiv. to American Plywood Assoc. (APA) S-4 |
| ¾" Panel-Wet | D-1761 | pounds | 478 | 450-550 | % of force for SCP relative to OSB 82%; % of force for SCP relative to Plywood 80% |

TABLE 2B

| Physical Characteristics | ASTM Test Method | Unit | Preferred Target Value | Typical Range | Notes |
|---|---|---|---|---|---|
| Lateral Screw Resistance | | | | | Screw size: #8 wire 1⅝ inch screw with 0.25 inch diameter head minimum |
| ½" Panel-Dry | D-1761 | pounds | 445 | 350-550 | Equiv. to APA S-4 |
| ½" Panel-Wet | D-1761 | pounds | 558 | 400-650 | % of force for SCP relative to OSB 73; % of force for SCP relative to Plywood 82% |
| ¾" Panel-Dry | D-1761 | pounds | 414 | 400-500 | Equiv. to APA S-4 |
| ¾" Panel-Wet | D-1761 | pounds | 481 | 400-500 | % of force for SCP relative to OSB 73; % of force for SCP relative to Plywood 82% |
| Static & Impact Test (¾ inch thick SCP) Ultimate | | | | | |
| Static | E-661 | pounds | 1286 | 1000-1500 | APA S-1; 16 inch o.c. Span Rating ≧550 lbs. |
| Following Impact Deflection under 200 lb. Load | E-661 | pounds | 2206 | 1500-3000 | APA S-1; 16 inch o.c. Span Rating ≧400 lbs |
| Static | E-661 | inches | 0.014 | 0.010-0.060 | APA S-1; 16 inch o.c. Span Rating ≦0.078" |
| Following Impact Uniform Load | E-661 | inches | 0.038 | 0.020-0.070 | APA S-1; 16 inch o.c. Span Rating ≦0.078" |
| ¾" Panel-Dry | | psf | 330 | 300-450 | 16 inch o.c. Span Rating ≧330 psf |
| Linear Expansion | | | | | |
| ½" to ¾" Panel | APA P-1 | % | ≦0.1 | ≦0.1 | APA P-1 requires ≦0.5% |

TABLE 2C

| Physical Characteristics | ASTM Test Method | Unit | Preferred Target Value | Typical Range | Notes |
|---|---|---|---|---|---|
| Water Absorption | | | | | |
| ½" Panel | APA PRP-108 | % | 11.8 | 7 to 15 | % water absorption of SCP relative to ½ inch thick OSB: 51.5%, % water absorption of SCP relative to ½ inch thick Plywood: 46.2% |
| ¾" Panel | APA PRP-108 | % | 10.8 | 7 to 15 | % water absorption of SCP relative to OSB: 51.3%, % water absorption of SCP relative to Plywood: 48.1% |

TABLE 2C-continued

| Physical Characteristics | ASTM Test Method | Unit | Preferred Target Value | Typical Range | Notes |
|---|---|---|---|---|---|
| Thickness Swell | | | | | |
| ½" Panel | APA PRP-108 | % | 2.3 | 1 to 5 | % water absorption of SCP relative to ½ inch thick OSB: 22.2%, % water absorption of SCP relative to ½ inch thick Plywood: 7.8% |
| ¾" Panel | APA PRP-108 | % | 2.4 | 1 to 5 | % water absorption of SCP relative to OSB: 22.2%, % water absorption of SCP relative to Plywood: 7.8% |
| Mold & Bacteria Resistance | | | | | |
| ½ to ¾" Panel | G-21 | | 1 | 0 to 1 | OSB & Plywood have food source |
| ½ to ¾" Panel | D-3273 | | 10 | 10 | OSB & Plywood have food source |
| Termite Resistance | | | | | |
| ½ to ¾" Panel | | | No food source | No food source | |

TABLE 2D

| Physical Characteristics | ASTM Test Method | Unit | Preferred Target Value | Typical Range | Notes |
|---|---|---|---|---|---|
| Horizontal Design Shear Capacity of the Floor Diaphragm | | | | | |
| ¾" Panel-10'×20' Assembly | E-455 | pounds per linear foot | 487.2 | 300-1000 Typically 400-800 | Performance relates to panel properties, joist depth & spacing and fastener type and spacing |
| System Fire Resistance | | | | | |
| ⅝ to ¾" SCP Panel on one side of metal frame | E-119 | Time | 1 hr and 10 min. | 1 to 1.5 hr | Nominal 4" deep stud, 24" O.C., batt insulation, 1 layer ⅝" FIRECODE Gypsum Board available from USG. |
| ¾" Panel SCP on one side of metal frame | E-119 | Time | 1.5 hr to 2 hr - 9 min | 1 to 2.5 hr or 1 to 2.25 hr | Nominal 10" deep joist, 24" O.C., batt insulation, 1 layer ⅝" FIRECODE Gypsum Board available from USG |
| ¾" Panel SCP on one side of metal frame | E-119 | Time | 1.5 hr to 2 hr - 9 min | 1.5 to 2.5 hr or 1.5 to 2.25 hr | Nominal 10" deep joist, 24" O.C., batt insulation, 2 layer ⅝" FIRECODE Gypsum Board available from USG |

Horizontal Design Shear Capacity in Table 2D provides for a safety factor of 3.

A typical ¾ inch (19 mm) thick panel when tested according to ASTM 661 and APA S-1 test methods over a span of 16 inches (406.4 mm) on centers, has an ultimate load capacity greater than 550 lb (250 kg), under static loading, an ultimate load capacity greater than 400 lb (182 kg) under impact loading, and a deflection of less than 0.078 inches (1.98 mm) under both static and impact loading with a 200 lb (90.9 kg) load.

Typically, the flexural strength of a panel having a dry density of 65 lb/ft³ (1040 kg/m³) to 90 lb/ft³ (1440 kg/m³) or 65 lb/ft³ (1040 kg/m³) to 95 lb/ft³ (1522 kg/m³) after being soaked in water for 48 hours is at least 1000 psi (7 MPa), e.g. 1300 psi (9 MPa), preferably at least 1650 psi (11.4 MPa) more preferably at least 1700 psi (11.7 MPa) as measured by the ASTM C 947 test.

Typically the horizontal shear diaphragm load carrying capacity of the system will not be lessened by more than 25%, preferably not be lessened by more than 20%, when exposed to water in a test wherein a 2 (5.1 cm) inch head of water is maintained over ¾ inch (1.9 cm) thick SCP panels fastened on a 10 foot by 20 foot (305×610 cm) metal frame for a period of 24 hours.

Typically the system will not absorb more than 0.7 pounds per square foot of water when exposed to water in a test wherein a 2 inch head of water is maintained over ¾ inch thick SCP panels fastened on a 10 foot by 20 foot (305×610 cm) metal frame for a period of 24 hours.

Typically an embodiment of the present system having a 10 foot wide by 20 foot (305×610 cm) long by ¾ inch thick diaphragm of the SCP panels attached to a 10 foot by 20 foot (305×610 cm) metal frame will not swell more than 5% when exposed to a 2 inch (5.1 cm) head of water maintained over the SCP panels fastened on the metal frame for a period of 24 hours.

Typically, the present reinforced SCP panel meets ASTM G-21 in which the panel achieves approximately a 1 and meets ASTM D-3273 in which the system achieves approximately a 10. Also, typically the present system supports substantially zero bacteria growth when clean. Also, typically the present system is inedible to termites.

Typically a non-combustible system for construction comprising: a shear diaphragm supported on metal frame, the shear diaphragm comprising the panel of the present invention and the frame comprising metal framing members, wherein the panel has a thickness of ¾ inch and has a racking strength ultimate load measured according to ASTM E72 racking from about 4400 to 7400 lbs. (1996 to 3357 kgs.) for an 8 foot by 8 foot wall assembly. This translates to a nominal wall racking shear strength of about 550 lbs per linear foot to 925 pounds per linear foot. For example, the racking strength ultimate load may be in the range of from about 4600 to about 6000 lbs. (2086 to 2721 kgs.) for an 8 foot by 8 foot wall assembly. This translates to a nominal wall racking shear strength of about 575 lbs per linear foot to 750 pounds per linear foot. The assembly for this ASTM E72 racking measurement is single sided and has 16 gage 3⅝ inch studs, 16 inches on center with fasteners 6 inches on center in the perimeter and 12 inches on center in the field. The panels for this ASTM E72 racking measurement are installed horizontally with no blocking in the cavities. The fasteners were #8-18×1⅝ inch long winged DRILLER BUGEL HEAD screws.

Values for wall racking strength can vary for different gauge studs, different stud spacing or different fastener spacing. Thus, a typical range for wall racking strength ranges from 500-7000 plf, nominal racking shear strength.

Wall Racking Strength is expressed in pounds per lineal foot, the ultimate load for a test specimen can be expressed as the max load on the test specimen as an entire unit, or in an ultimate load expressed in pounds per lineal foot, e.g., the width of the specimen.

Typically, the panel when fastened to wall framing has racking shear strength between 1.1 and 3.0 times the racking shear strength of a similar dimensioned (sized) SCP panel without reinforcing fastened to the same wall framing with the same fasteners.

EXAMPLES

Test Specimen Diaphragm Materials

Prototype ¾" SCP—Structural Cement Panel of the present invention reinforced with fiberglass strands. A "V"-groove and tongue is located along the 8' dimension of the 4'×8' (122×244 cm) sheets. The formulation used in the SCP panel examples of this floor diaphragm test is listed in TABLE 3.

TABLE 3

| Ingredient | Weight Percent (%) |
| --- | --- |
| Reactive Powder Blend | |
| Portland Cement | 29 |
| Calcium Sulfate Alpha Hemihydrate | 58 |
| Silica Fume | 12 |
| Lime | 1 |
| SCP Cementitious Composition | |
| Portland Cement | 12.2 |
| Calcium Sulfate Alpha Hemihydrate | 24.4 |
| Silica Fume | 5.1 |
| Lime | 0.4 |
| Ceramic Microspheres | 27.4 |
| Superplasticizer | 1.9 |
| Water | 24.2 |
| Alkali-Resistant Glass Fibers[1] | 4.4 |

[1]Weight proportion corresponds to 1.8% volume fraction of Alkali Resistant Glass Fibers in the composite.
Length of glass fibers used in the floor diaphragm test - 36 mm.

A total of 5 panels were tested. Each panel consisted of the same framing detail (16 ga 3⅝" (9.2 cm) studs manufactured by Dietrich located 16" (40.6 cm) on center), fastener layout (6" (15.2 cm) on center on the perimeter, 12" (30.5 in the field) and ¾" SCP panels were all installed horizontally with no blocking in the cavities. All of the assemblies were single sided.

Panel 1 is the base case with no additional metal reinforcement added.

Panel 2 had a full sheet (4'×8') (122×244 cm) piece of 22 gauge steel bonded to the back side.

Panel 3 had 8" (20.3 cm) wide strips of 22 gauge steel bonded along the 8' dimension of the panel (similar to the embodiment of FIG. 5). The reinforcements of Panels 3-5 are glued to the surface of the panel to protrude from the panel surface.

Panel 4 had 18"×18" (46×46 cm) gussets bonded to all four corners of each SCP panel (similar to the embodiment of FIG. 10, but the reinforcements protrude and there are no reinforcing members 56).

Panel 5 had 18"×18" (46×46 cm) gussets with folded over edges bonded to all 4 corners of each SCP panel (similar to Panel 4 but the gussets having folded over edges).

The ultimate loads measured according to ASTM E72 racking were as follows (number in square brackets are the correlating indices):

Panel 1—4147 lb (1881 kg) [1]
Panel 2—7651 lb (3470 kg) [1.845]
Panel 3—5641 lb (2558 kg) [1.360]
Panel 4—4712 lb (2137 kg) [1.136]
Panel 5—3828 lb (1736 kg) [0.923]

The failure modes for each panel were as follows:

Panel 1—fastener pull through around the perimeter
Panel 2—fastener pull through/shear around the perimeter. Metal unbonded and buckled on backside.
Panel 3—fastener pull through/shear around the perimeter. Metal unbonded and buckled on backside.
Panel 4—fastener pull through/shear around the perimeter. Metal unbonded and buckled on backside. Adhesive appeared not to be fully cured and still wet to the touch after test.
Panel 5—fastener shear around the perimeter initially then bending pull out of fasteners. Metal unbonded and buckled on backside. It should be noted here that due to the bent portion of the gusset that a 3/16" space was present along the horizontal joint of the assembly. This will adversely affect the performance.

Figure 34:
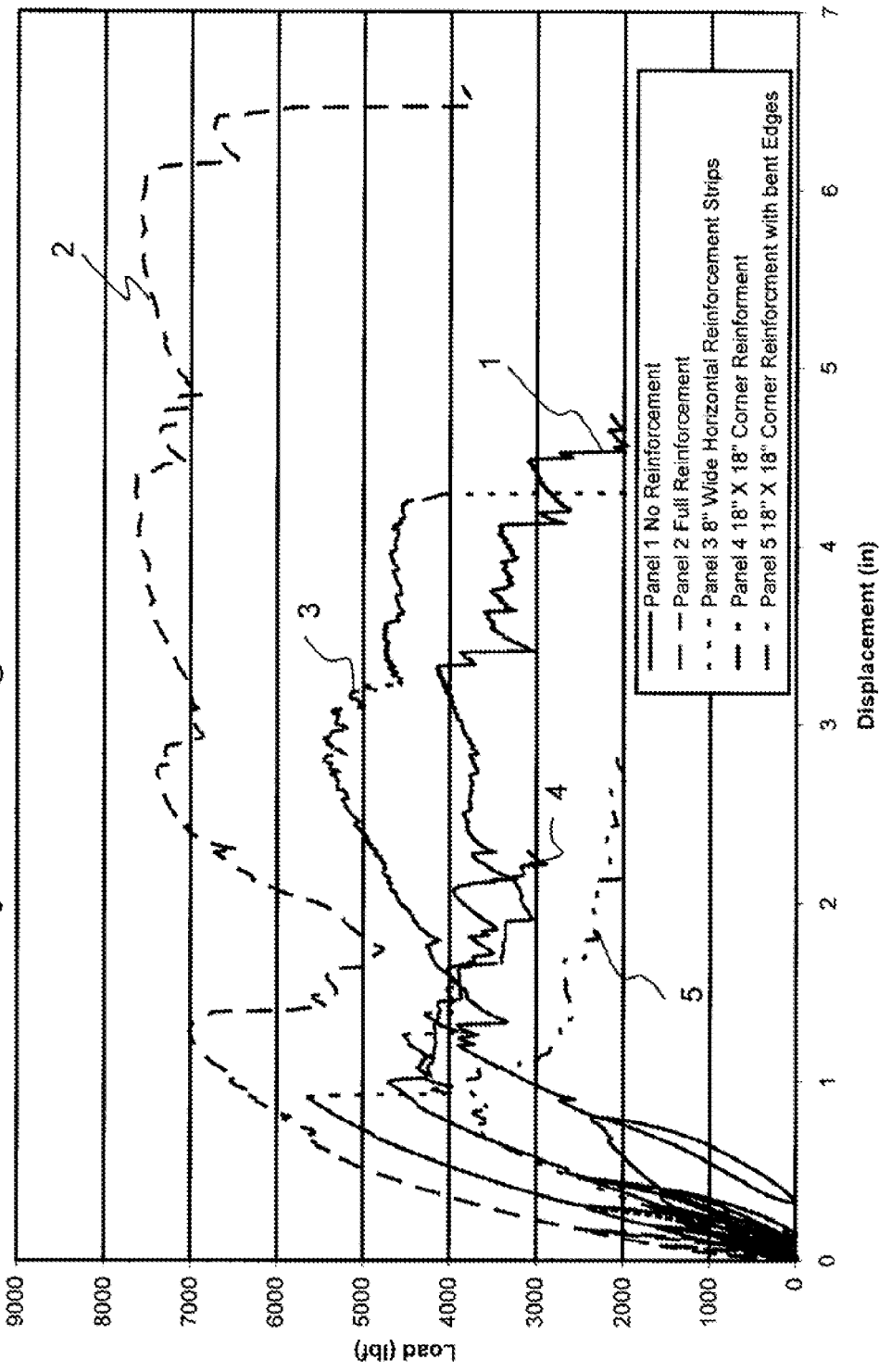
FIG. 34 shows ASTM E72 Racking data of five 8 foot×8 foot (2.16 m×2.16 mm) samples with SCP installed horizontally on 16 gauge 3.624 steel studs at 16 inches on center with fastener layout of 6" (15.2 cm) on center on the perimeter and 12" (30.4 cm) in the field.

FIG. 34 shows ASTM E72 Racking of these five 8 foot×8 foot samples with SCP installed horizontally on 16 gage 3.624 steel studs at 16 inches on center with fastener layout of 6" (15.2 cm) on center on the perimeter and 12" (30.5 cm) in the field.

While a particular embodiment of the system employing a horizontal diaphragm of fiber-reinforced structural cement panels on a metal frame has been shown and described, it will be appreciated by those skilled in the art that changes and modifications may be made thereto without departing from the invention in its broader aspects and as set forth in the following claims.

What is claimed is:

1. A shear panel system, for resisting shear loads when fastened to metal framing, comprising:
   a shear panel consisting of a panel-shaped continuous phase and first and second reinforcing members attached to the continuous phase;
   the shear panel-shaped continuous phase resulting from the curing of an aqueous mixture consisting essentially of water and,
   on a dry basis,
   49 to 68 weight % a blend of reactive powders,
   23 to 43 weight % uniformly distributed lightweight filler particles comprising uniformly distributed ceramic microspheres, and
   5 to 20 weight % alkali-resistant glass fibers, wherein the glass fibers are monofilaments having a diameter of about 5 to 25 microns (micrometers) and a length of about 0.25 to 3 inches, and
   optional superplasticizer,
   the continuous phase being uniformly reinforced with the alkali-resistant glass fibers;
   the lightweight filler particles having a particle specific gravity of from 0.02 to 1.00 and an average particle size of about 10 to 500 microns (micrometers);
   wherein the blend of reactive powders comprises:
   45 to 75 wt % calcium sulfate alpha hemihydrate,
   20 to 40 wt % Portland cement,
   0.2 to 3.5 wt % lime, and
   5 to 25 wt % of an active pozzolan comprising silica fume; and
   the panel-shaped continuous phase having opposed first and second outer surfaces,
   first and second reinforcing members selected from the group consisting of plate and a mesh sheet attached to only the first outer surface of the continuous phase panel, the first reinforcing member and the second reinforcing member each respectively attached to the first surface along the entire length of two opposed edges of the panel covering the portion of the first surface opposite the second surface at the point(s) where the panel is attached to the metal frame with screws with winged drillers, wherein the second surface of the panel opposed to the first surface has no reinforcing members;
   wherein the reinforcing members cover 5 to 90% of the first surface of the panel-shaped continuous phase, and
   metal framing;
   the shear panel is fastened to the metal framing with screws with winged drillers to form a first shear diaphragm, wherein the winged driller is located above the point and below the first thread of the screw and protrudes laterally from a shaft of the screw,
   wherein the shear panel fastened to the metal frame has a racking shear strength between 1.1 and 3.0 times the racking shear strength of a similar structural cement panel without reinforcing that is fastened to the same wall framing with the same screws, and
   a layer of Type X fire rated gypsum wallboard attached to a side of the metal framing opposed to said shear panel to form a second diaphragm, wherein the Type X fire rated gypsum wallboard is only on the one side of the frame opposed to the first shear diaphragm,
   wherein the panel has a thickness of about ½ to 1½ inches (6.3 to 38.11 mm), and
   wherein the shear panel system fastened to the metal frame meets the performance of the 2 hour fire resistance test rating under ASTM E-119, effective 2003.

2. The shear panel system of claim 1 wherein the reinforcing member comprises material selected from the group consisting of steel, aluminum, wood and plastic.

3. The shear panel system of claim 1 wherein the reinforcing member comprises rectangular strips placed in depressions on the outer surface of the continuous phase.

4. The shear panel system of claim 1, wherein the at least one reinforcing member comprises rectangular strips placed in depressions on the outer surface of the continuous phase such that an upper surface of the each respective rectangular strips is substantially flush with a same upper surface of the outer surface of the continuous phase.

5. The shear panel system of claim 1, wherein the at least one reinforcing member comprises separate reinforcing corner pieces and optional reinforcing strips attached the continuous phase of the panel.

6. The shear panel system of claim 1, wherein the at least one reinforcing member comprises a central reinforcing strip and separate reinforcing corner pieces, optionally, the panel is further provided with two reinforcing strips which contact the corner pieces.

7. The shear panel system of claim 1, wherein the at least one reinforcing member comprises a one piece reinforced border having an outer perimeter at or adjacent a perimeter of one of the surfaces of the continuous phase of the panel and an inner perimeter.

8. The shear panel system of claim 1, wherein the at least one reinforcing member comprises a reinforcing border having an outer perimeter at or adjacent a perimeter of one of the surfaces of the continuous phase of the panel and an inner perimeter, wherein the reinforcing border comprises a multi-piece reinforcing border on one of the surfaces of the continuous phase, the reinforcing border comprising corner pieces, longitudinal side pieces and transverse side pieces.

9. The shear panel system of claim 1, wherein the at least one reinforcing member comprises a panel, having perforations, attached to the continuous phase.

10. The shear panel system of claim 1, wherein the ceramic microspheres have a mean particle size from 50 to 250 microns and/or fall within a particle size range of 10 to 500 microns, the ceramic microspheres having a particle density of 0.50 to 0.80 g/mL.

11. The shear panel system of claim 1, wherein the aqueous mixture consists of, on a dry basis,
58 to 68 wt. % reactive powders,
6 to 17 wt. % glass fibers, and
23 to 34 wt. % lightweight filler particles, and optional superplasticizer,
wherein said lightweight filler consists of ceramic microspheres and up to 1.0 wt. % filler particles selected from the group consisting of, glass microspheres, fly ash cenospheres or perlite, each on a dry basis, and
wherein the reactive powders consist of, each on a dry basis,
65 to 75 wt % calcium sulfate alpha hemihydrate,
20 to 25 wt % Portland cement,
0.75 to 1.25 wt % lime, and
10 to 15 wt % of silica fume active pozzolan.

12. The shear panel system of claim 11, wherein the aqueous mixture contains, on a dry basis 7 to 12 wt. % of the glass fibers.

13. The shear panel system of claim 1, wherein the filler also contains uniformly distributed glass microspheres and/or fly ash cenospheres having an average diameter of about 10 to 350 microns (micrometers).

14. The shear panel system of claim 1, wherein the aqueous mixture, consists essentially of water, optional superplasticizer, and, on a dry basis:
54 to 68 wt. % of the reactive powders,
5 to 15 wt. % of the glass fibers,
23 to 33.8 wt. % of ceramic microspheres, and
up to 1.0 wt. % of the glass microspheres,
the ceramic microspheres having a particle density of 0.50 to 0.80 g/mL, and optional superplasticizer.

15. The shear panel system of claim 1, wherein the at least one reinforcing member covers about 20 to 50% of the first surface of the continuous phase panel.

16. A non-combustible system for construction comprising: a shear diaphragm supported on a metal frame,
the shear diaphragm comprising a shear panel for resisting shear loads when fastened to framing,
the shear panel consisting of a panel-shaped continuous phase and first and second reinforcing members;
the shear panel shaped continuous phase resulting from the curing of an aqueous mixture consisting essentially of, on a dry basis,
49 to 68 weight % reactive powder,
23 to 43 weight % lightweight filler particles comprising uniformly distributed ceramic microspheres, and
5 to 20 weight % alkali-resistant glass fibers, wherein the glass fibers are monofilaments having a diameter of about 5 to 25 microns (micrometers) and a length of about 0.25 to 3 inches (6.3 to 76 mm), and
optional superplasticizer,
the continuous phase being uniformly reinforced with the glass fibers;
the lightweight filler particles having a particle specific gravity of from 0.02 to 1.00 and an average particle size of about 10 to 500 microns (micrometers);
wherein the reactive powders comprise
45 to 75 wt % calcium sulfate alpha hemihydrate,
20 to 40 wt % Portland cement,
0.2 to 3.5 wt % lime, and
5 to 25 wt % of an active pozzolan comprising silica fume; and
the panel-shaped continuous phase having opposed first and second outer surfaces,
first and second reinforcing members selected from the group consisting of plate and a mesh sheet attached to only the first outer surface of the continuous phase panel, the first reinforcing member and the second reinforcing member each respectively attached to the first surface along the entire length of two opposed edges of the panel, wherein the reinforcing member(s) cover the portion of the first surface opposite the second surface at the point(s) where the panel is attached to the metal frame with screws with winged drillers, wherein the second surface of the panel opposed to the first surface has no reinforcing members;
wherein the reinforcing members cover 5 to 90% of the first surface of the continuous phase panel,
the frame comprising metal framing members,
wherein the shear panel has a thickness of ¾ inch and has a racking strength ultimate load measured according to ASTM E72 racking from about 4600 to about 6000 lbs for an 8 foot by 8 foot wall assembly, and
wherein the panel is fastened to the metal framing with screws with winged drillers, wherein the winged driller is located above the point and below the first threads of the screw and protrudes laterally from a shaft of the screw,
a layer of Type X fire rated gypsum wallboard attached to a side of the frame opposed to said shear diaphragm to form a second diaphragm, wherein the Type X fire rated gypsum wallboard is only on the one side of the frame opposed to the shear panel; and
wherein the system meets the performance of the 2 hour fire resistance test rating under ASTM E-119, effective 2003.

17. The system of claim 16, wherein the reactive powders consist of, on a dry basis,
65 to 75 wt. % calcium sulfate hemihydrate,
20 to 25 wt. % Portland cement,
0.75 to 1.25 wt. % lime, and
10 to 15 wt. % of silica fume active pozzolan.

18. The system of claim 16, wherein the aqueous mixture consists of water and optional superplasticizer, and, on a dry basis:
58 to 68 wt. % reactive powders,
7 to 12 wt. % glass fibers, and
23 to 34 wt. % lightweight filler particles,
wherein said lightweight filler consists of ceramic microspheres and up to 1.0 wt. % filler particles selected from the group consisting of, glass microspheres, fly ash cenospheres or perlite, each on a dry basis, and
wherein the reactive powders consist of, each on a dry basis,
65 to 75 wt % calcium sulfate alpha hemihydrate,
20 to 25 wt % Portland cement,
0.75 to 1.25 wt % lime, and
10 to 15 wt % of silica fume active pozzolan.

19. The system of claim 16, wherein the aqueous mixture consists of, on a dry basis,
54 to 68 wt. % reactive powders,
5 to 15 wt. % glass fibers, and
23 to 33.8 wt. % ceramic microspheres, and up to 1.0 wt. % of the glass microspheres,
the ceramic microspheres having a particle density of 0.50 to 0.80 g/mL, and optional superplasticizer.

20. The system of claim 16, wherein the at least one reinforcing member covers about 20 to 50% of the first surface of the continuous phase panel.

21. A method of providing a 2 hour fire resistance test rating under ASTM E-119, effective 2003 to a building structure comprising:
    assembling the non-combustible system of claim 16 for construction comprising:
    a first shear diaphragm for the building structure supported on a metal frame, the shear diaphragm comprising a shear panel for resisting shear loads when fastened to the metal frame, said assembling consisting of:
    fastening to the metal frame the shear panel consisting of a panel-shaped continuous phase and first and second metal reinforcements attached to the continuous phase;
    the panel-shaped continuous phase resulting from the curing of an aqueous mixture comprising, on a dry basis,
    49 to 68 weight % of a blend of reactive powder,
    23 to 43 weight % lightweight filler particles consisting of uniformly distributed ceramic microspheres,
    5 to 20 weight % alkali-resistant glass fibers, wherein the glass fibers are monofilaments having a diameter of about 5 to 25 microns (micrometers) and a length of about 0.25 to 3 inches (6.3 to 76 mm), and
    optional superplasticizer,
    the continuous phase being uniformly reinforced with the glass fibers,
    the lightweight filler particles having a particle specific gravity of from 0.02 to 1.00 and an average particle size of about 10 to 500 microns (micrometers);
    wherein the blend of reactive powders comprises:
    45 to 75 wt % calcium sulfate alpha hemihydrate,
    20 to 40 wt % Portland cement,
    0.2 to 3.5 wt % lime, and
    5 to 25 wt % of an active pozzolan comprising silica fume; and
    the panel-shaped continuous phase panel having opposed first and second outer surfaces;
    wherein the first and second reinforcing members selected from the group consisting of plate and a mesh sheet are attached to only a first surface of the continuous phase panel, the first reinforcing member and the second reinforcing member each respectively attached to the first surface along the entire length of two opposed edges of the panel, wherein the second surface of the panel opposed to the first surface has no reinforcing members;
    wherein the reinforcing member(s) cover the portion of the first surface opposite the second surface which is attached to the metal frame with screws with winged drillers screwed through the reinforcing member on the first surface to the second surface which is attached to the metal frame
    wherein the reinforcing members cover 5 to 90% of the first surface of the continuous phase panel,
    the metal frame comprising metal framing members,
    wherein the panel has a thickness of ¾ inch and has a racking strength ultimate load measured according to ASTM E72 racking from about 4400 to 7400 lbs for an 8 foot by 8 foot wall assembly, and
    wherein the shear panel is fastened to the metal framing members with screws with winged drillers, wherein the winged driller is located above the point and below the first threads of the screw and protrudes laterally from a shaft of the screw,
    attaching a layer of Type X fire rated gypsum wallboard to a side of the metal frame opposed to said shear panel to form a second diaphragm, wherein the Type X fire rated gypsum wallboard is only on the one side of the metal frame opposed to the shear diaphragm, and
    wherein the building structure meets the performance of the 2 hour fire resistance test rating under ASTM E-119, effective 2003.

22. The method of claim 21, wherein the aqueous mixture consists of water and, on a dry basis,
    58 to 68 wt. % reactive powders,
    7 to 12 wt. % glass fibers, and
    23 to 34 wt. % ceramic microspheres,
    up to 1.0 wt. % of glass microspheres, and
    optional superplasticizer,
    wherein said lightweight filler consists of ceramic microspheres and up to 1.0 wt. % filler particles selected from the group consisting of, glass microspheres, fly ash cenospheres or perlite, each on a dry basis, and
    wherein the reactive powders consist of:
    65 to 75 wt. % calcium sulfate hemihydrate,
    20 to 25 wt. % Portland cement,
    0.75 to 1.25 wt. % lime, and
    10 to 15 wt. % of a silica fume active pozzolan.

23. The method of claim 22,
    wherein the at least one reinforcing member covers about 20 to 50% of the first surface of the continuous phase panel,
    wherein the ceramic microspheres have a mean particle size from 50 to 250 microns and/or fall within a particle size range of 10 to 500 microns,
    wherein the racking strength ultimate load is in the range of from about 4600 to about 6000 lbs for an 8 foot by 8 foot wall assembly.

24. The method of claim 21, wherein the reactive powders consist of:
    65 to 75 wt. % calcium sulfate hemihydrate,
    20 to 25 wt. % Portland cement,
    0.75 to 1.25 wt. % lime, and
    10 to 15 wt. % of silica fume active pozzolan.

25. The method of claim 21, wherein the aqueous mixture, consists essentially of water, optional superplasticizer, and, on a dry basis:
    54 to 68 wt. % of the reactive powders,
    5 to 15 wt. % of the glass fibers,
    23 to 33.8 wt. % of ceramic microspheres, and
    up to 1.0 wt. % of glass microspheres,
    wherein the at least one reinforcing member covers about 20 to 50% of the first surface of the continuous phase panel,
    wherein the ceramic microspheres have a mean particle size from 50 to 250 microns and/or fall within a particle size range of 10 to 500 microns,
    wherein the panel is fastened to the metal frame by winged self drilling screws, and
    wherein the racking strength ultimate load is in the range of from about 4600 to about 6000 lbs for an 8 foot by 8 foot wall assembly.

\* \* \* \* \*

UNITED STATES PATENT AND TRADEMARK OFFICE
CERTIFICATE OF CORRECTION

PATENT NO. : 7,845,130 B2
APPLICATION NO. : 11/608107
DATED : December 7, 2010
INVENTOR(S) : Tonyan et al.

It is certified that error appears in the above-identified patent and that said Letters Patent is hereby corrected as shown below:

Column 39 line 7, cancel the text beginning with "21. A method of providing" to and ending "effective 2003." in column 40, line 11 and insert the following claim:

--21. A method of providing a 2 hour fire resistance test rating under ASTM E-119, effective 2003 to a building structure comprising:
assembling the non-combustible system of claim 32 for construction comprising:
a first shear diaphragm for the building structure supported on a metal frame, the shear diaphragm comprising a shear panel for resisting shear loads when fastened to the metal frame, said assembling consisting of:
fastening to the metal frame the shear panel consisting of a panel-shaped continuous phase and first and second metal reinforcements attached to the continuous phase;
the panel-shaped continuous phase resulting from the curing of an aqueous mixture comprising, on a dry basis,
49 to 68 weight % of a blend of reactive powder,
23 to 43 weight % lightweight filler particles consisting of uniformly distributed ceramic microspheres,
5 to 20 weight % alkali-resistant glass fibers, wherein the glass fibers are monofilaments having a diameter of about 5 to 25 microns (micrometers) and a length of about 0.25 to 3 inches (6.3 to 76 mm), and optional superplasticizer,
the continuous phase being uniformly reinforced with the glass fibers,
the lightweight filler particles having a particle specific gravity of from 0.02 to 1.00 and an average particle size of about 10 to 500 microns (micrometers);
wherein the blend of reactive powders comprises:
45 to 75 wt % calcium sulfate alpha hemihydrate,
20 to 40 wt % Portland cement,
0.2 to 3.5 wt % lime, and
5 to 25 wt % of an active pozzolan comprising silica fume; and
the panel-shaped continuous phase panel having opposed first and second outer surfaces;

Signed and Sealed this
Twenty-fourth Day of May, 2011

David J. Kappos
*Director of the United States Patent and Trademark Office* wherein the first and second reinforcing members selected from the group consisting of plate and a mesh sheet are attached to only the first surface of the continuous phase panel, the first reinforcing member and the second reinforcing member each respectively attached to the first surface along the entire length of two opposed edges of the panel, wherein the second surface of the panel opposed to the first surface has no reinforcing members;

wherein the reinforcing member(s) cover the portion of the first surface opposite the second surface which is fastened to the metal frame with screws with winged drillers screwed through the reinforcing member on the first surface to the second surface which is fastened to the metal frame, wherein the reinforcing members cover 5 to 90 % of the first surface of the continuous phase panel, the metal frame comprising metal framing members, wherein the panel has a thickness of 3/4 inch and has a racking strength ultimate load measured according to ASTM E72 racking from about 4400 to 7400 lbs for an 8 foot by 8 foot wall assembly, and wherein the shear panel is fastened to the metal framing members with screws with winged drillers,
wherein the winged driller is located above the point and below the first threads of the screw and protrudes laterally from a shaft of the screw, attaching a layer of Type X fire rated gypsum wallboard to a side of the metal frame opposed to said shear panel to form a second diaphragm, wherein the Type X fire rated gypsum wallboard is only on the one side of the metal frame opposed to the shear diaphragm, and wherein the building structure meets the performance of the 2 hour fire resistance test rating under ASTM E-119, effective 2003.--

UNITED STATES PATENT AND TRADEMARK OFFICE
CERTIFICATE OF CORRECTION

PATENT NO. : 7,845,130 B2
APPLICATION NO. : 11/608107
DATED : December 7, 2010
INVENTOR(S) : Timothy D. Tonyan et al.

It is certified that error appears in the above-identified patent and that said Letters Patent is hereby corrected as shown below:

Title Page, correct Item (75) Inventors, to read:

-- (75) Inventors:  Timothy D. Tonyan, Wheaton, IL (US);
James E. Reicherts, Cary, IL (US);
Ashish Dubey, Grayslake, IL (US) --

Signed and Sealed this
Twenty-first Day of April, 2015

Michelle K. Lee
*Director of the United States Patent and Trademark Office*